US009292841B2

(12) United States Patent
Klein, Jr. et al.

(10) Patent No.: US 9,292,841 B2
(45) Date of Patent: Mar. 22, 2016

(54) SYSTEM AND METHOD FOR TRANSFERRING PLAYLISTS

(71) Applicant: Intel Corporation, Santa Clara, CA (US)

(72) Inventors: Eric N. Klein, Jr., Cupertino, CA (US); Joshua D. Hug, Kirkland, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/539,059

(22) Filed: Nov. 12, 2014

(65) Prior Publication Data

US 2015/0074240 A1 Mar. 12, 2015

Related U.S. Application Data

(63) Continuation of application No. 11/501,169, filed on Aug. 7, 2006.

(60) Provisional application No. 60/705,764, filed on Aug. 5, 2005, provisional application No. 60/705,969, filed on Aug. 5, 2005, provisional application No. 60/705,747, filed on Aug. 5, 2005.

(51) Int. Cl.

| G06F 15/16 | (2006.01) |
|---|---|
| G06Q 20/12 | (2012.01) |
| G06F 17/30 | (2006.01) |
| G06F 21/10 | (2013.01) |
| G06Q 20/32 | (2012.01) |

(Continued)

(52) U.S. Cl.
CPC ........ *G06Q 20/123* (2013.01); *G06F 17/30017* (2013.01); *G06F 17/30867* (2013.01); *G06F 21/10* (2013.01); *G06Q 20/12* (2013.01); *G06Q 20/1235* (2013.01); *G06Q 20/322* (2013.01); *G06Q 30/06* (2013.01); *G06Q 30/0635* (2013.01); *G06Q 30/0637* (2013.01); *G11B 27/322* (2013.01); *H04L 63/10* (2013.01); *H04L 65/10* (2013.01); *H04L 65/60* (2013.01); *H04L 67/1095* (2013.01); *H04W 8/20* (2013.01); *H04W 8/245* (2013.01); *G06F 2221/072* (2013.01); *G06F 2221/0704* (2013.01); *G11B 20/00086* (2013.01); *H04L 63/0428* (2013.01); *H04L 2463/101* (2013.01)

(58) Field of Classification Search
CPC .......... H04N 21/6125; H04N 7/17318; H04N 21/2223; G06F 17/30761; G06F 17/30772
See application file for complete search history.

(56) References Cited

U.S. PATENT DOCUMENTS

| 6,987,221 B2 | 1/2006 | Platt |
|---|---|---|
| 7,054,888 B2 | 5/2006 | LaChapelle et al. |

(Continued)

OTHER PUBLICATIONS

Final Office Action received for U.S. Appl. No. 11/501,169, mailed on Apr. 25, 2011, 8 pages.

(Continued)

*Primary Examiner* — Peling Shaw
(74) *Attorney, Agent, or Firm* — Christopher K. Gagne

(57) ABSTRACT

A method, computer program product and computing device for selecting at least one playlist for transfer, the at least one playlist being stored on a first personal media device. The at least one playlist is converted to a common format, thus generating a first common format playlist. Communication is established with a second personal media device. The first common format playlist is transferred to the second personal media device.

14 Claims, 29 Drawing Sheets

(51) Int. Cl.
*G06Q 30/06* (2012.01)
*G11B 27/32* (2006.01)
*H04W 8/20* (2009.01)
*H04L 29/08* (2006.01)
*H04W 8/24* (2009.01)
*G11B 20/00* (2006.01)
*H04L 29/06* (2006.01)

(56) References Cited

U.S. PATENT DOCUMENTS

| | | | |
|---|---|---|---|
| 2002/0091848 A1* | 7/2002 | Agresta et al. | 709/231 |
| 2004/0078357 A1 | 4/2004 | LaChapelle et al. | |
| 2004/0083273 A1* | 4/2004 | Madison et al. | 709/217 |
| 2004/0192383 A1 | 9/2004 | Zacks | |
| 2006/0008256 A1* | 1/2006 | Khedouri et al. | 386/124 |
| 2006/0218613 A1* | 9/2006 | Bushnell | 725/109 |
| 2006/0232449 A1 | 10/2006 | Jain et al. | |
| 2006/0268667 A1 | 11/2006 | Jellison et al. | |

OTHER PUBLICATIONS

Non-Final Office Action received for U.S. Appl. No. 11/501,169, mailed on Aug. 28, 2014, 8 pages.

Non-Final Office Action received for U.S. Appl. No. 11/501,169, mailed on Apr. 26, 2010, 9 pages.

Non-Final Office Action received for U.S. Appl. No. 11/501,169, mailed on Oct. 14, 2010, 7 pages.

Response to Non-Final Office Action received for U.S. Appl. No. 11/501,169, filed Feb. 14, 2011, 9 pages.

Response to Non-Final Office Action received for U.S. Appl. No. 11/501,169, filed on Jul. 26, 2010, 12 pages.

Response to Non-Final Office Action received for U.S. Appl. No. 11/501,169, filed on Dec. 2, 2014, 10 pages.

Response to Non-Final Office Action received for U.S. Appl. No. 11/501,169, filed on Aug. 11, 2011, 11 pages.

Notice of Allowance mailed Apr. 29, 2015 in U.S. Appl. No. 11/501,169 (11 pages).

\* cited by examiner

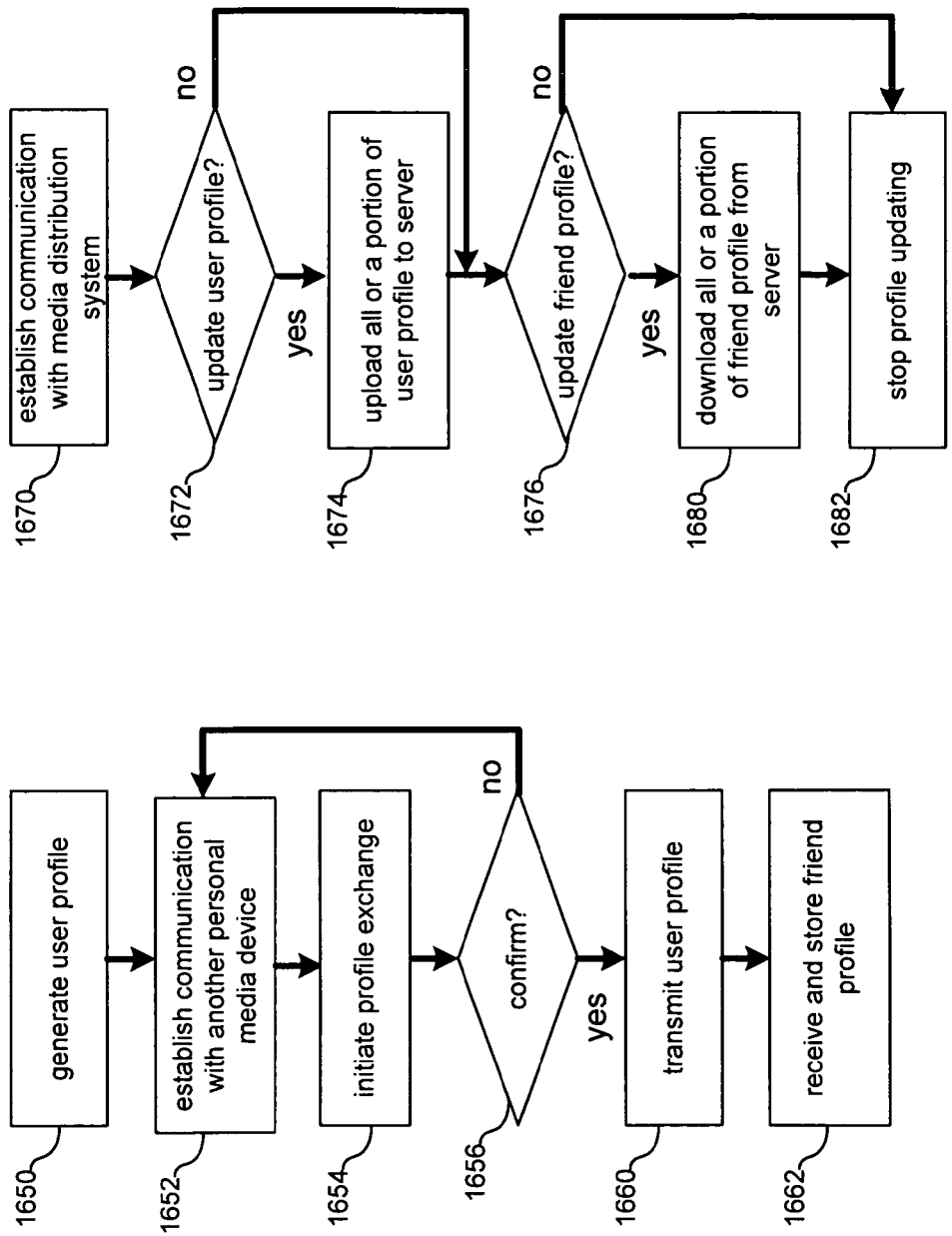

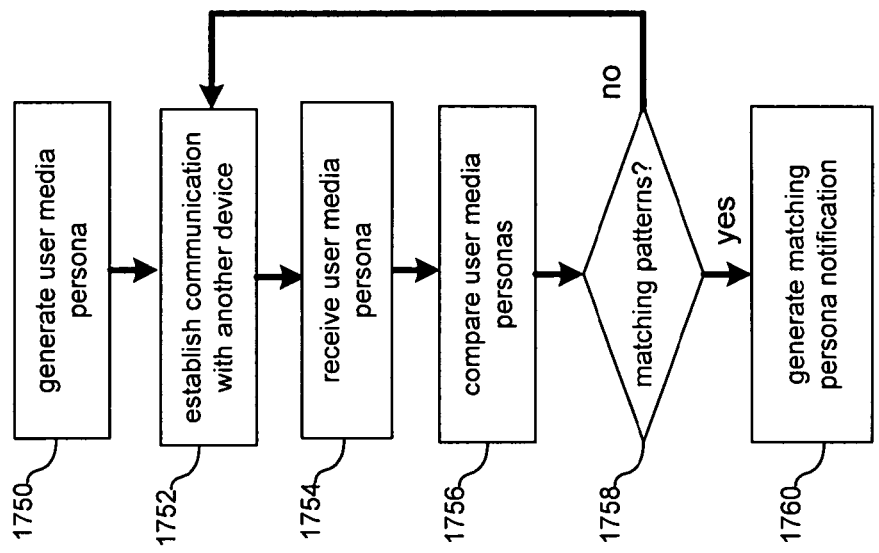

SYSTEM AND METHOD FOR TRANSFERRING PLAYLISTS

CROSS-REFERENCE TO RELATED APPLICATIONS

This application is a continuation of prior co-pending U.S. patent application Ser. No. 11/501,169, filed 7 Aug. 2006, which claims the benefit of prior U.S. Provisional Application No. 60/705,764, filed 5 Aug. 2005, and also claims the benefit of prior U.S. Provisional Application No. 60/705,969, filed 5 Aug. 2005, and also claims the benefit of prior U.S. Provisional Application No. 60/705,747, filed 5 Aug. 2005. Each of these prior Applications is hereby incorporated herein by reference in its entity and for all purposes.

TECHNICAL FIELD

This disclosure relates to transferring playlists and, more particularly, to transferring playlists between personal media devices.

BACKGROUND

Media distribution systems (e.g., the Rhapsody™ service offered by RealNetworks, Inc of Seattle, Wash.) may distribute media content (e.g., audio files, video files, and audio/video files) from a media server to a client electronic device (e.g., an MP3 player). A media distribution system may distribute media content by allowing a user to download media data files and/or receive and process media data streams.

Users of a media distribution system may use playlists to organize the media content stored on client electronic devices. Unfortunately, as various client electronic devices may use different e.g., operating systems, memory architectures, and hardware, the playlist from a first client electronic device may not be usable on a second client electronic device.

SUMMARY OF DISCLOSURE

In a first implementation, a method selects at least one playlist for transfer, the at least one playlist being stored on a first personal media device. The at least one playlist is converted to a common format, thus generating a first common format playlist. Communication is established with a second personal media device. The first common format playlist is transferred to the second personal media device.

The details of one or more implementations are set forth in the accompanying drawings and the description below. Other features and advantages will become apparent from the description, the drawings, and the claims.

BRIEF DESCRIPTION OF THE DRAWINGS

FIG. 31 is a flow chart illustrating a method of exchanging user profiles between personal media devices;

FIG. 32 is a flow chart illustrating a method of dynamically updating user profiles;

FIG. 34 is a flow chart illustrating a method of comparing user media personas on a personal media device.

DETAILED DESCRIPTION OF THE PREFERRED EMBODIMENTS

Figure 1:
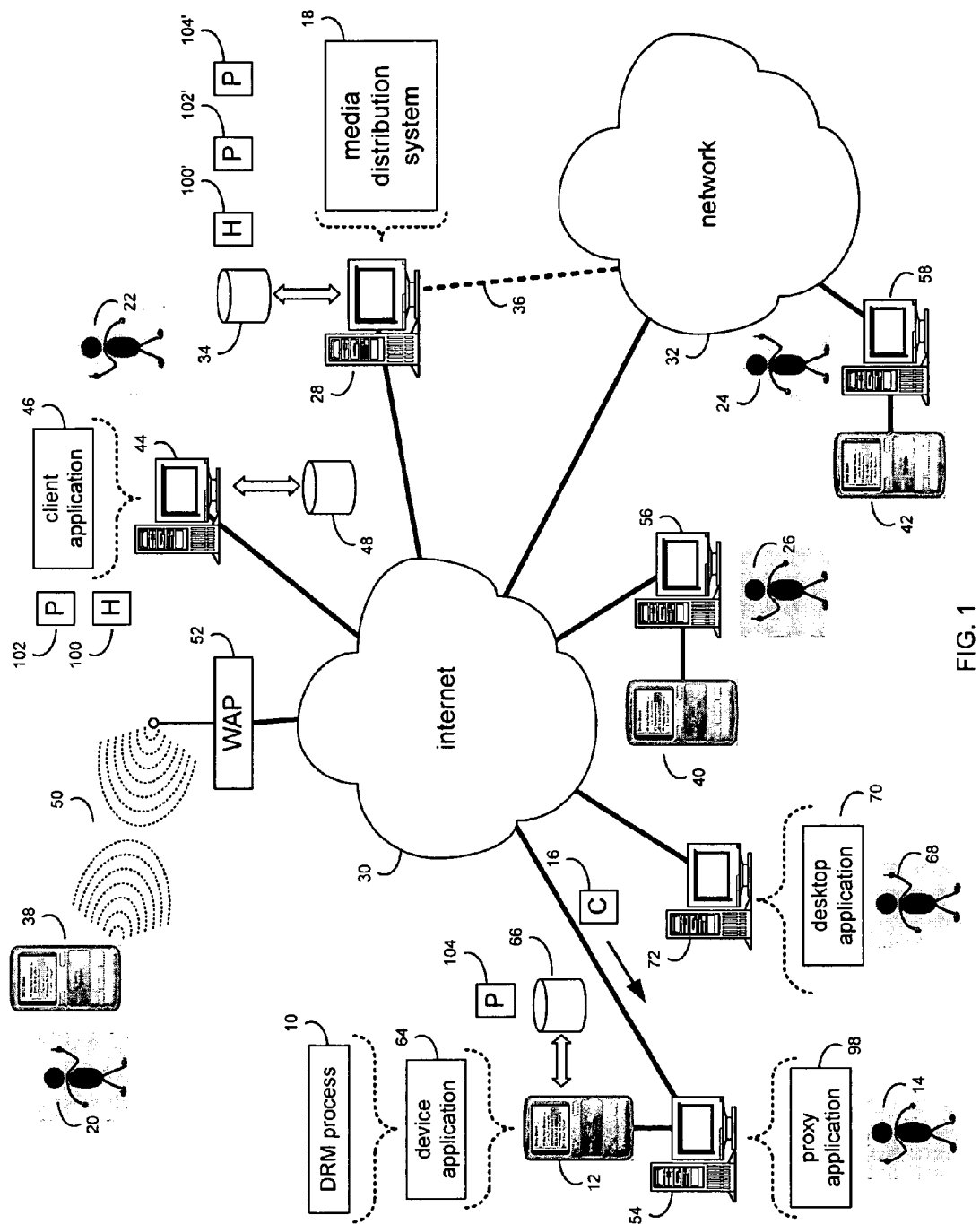
FIG. 1 is a diagrammatic view of a DRM process, a media distribution system, a client application, a proxy application, and a personal media device coupled to a distributed computing network.

System Overview:

Referring to FIG. 1, there is shown a DRM (i.e., digital rights management) process 10 that is resident on and executed by personal media device 12. As will be discussed below in greater detail, DRM process 10 allows a user (e.g., user 14) of personal media device 12 to manage media content resident on personal media device 12. Personal media device 12 typically receives media content 16 from media distribution system 18.

As will be discussed below in greater detail, examples of the format of the media content 16 received from media distribution system 18 may include: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when media content is streamed from e.g., computer 28 to personal media device 12, a copy of the media content is not permanently retained on personal media device 12. In addition to media distribution system 18, media content may be obtained from other sources, examples of which may include but are not limited to files ripped from music compact discs.

Examples of the types of media content 16 distributed by media distribution system 18 include: audio files (examples of which may include but are not limited to music files, audio news broadcasts, audio sports broadcasts, and audio recordings of books, for example); video files (examples of which may include but are not limited to video footage that does not include sound, for example); audio/video files (examples of which may include but are not limited to a/v news broadcasts, a/v sports broadcasts, feature-length movies and movie clips, music videos, and episodes of television shows, for example); and multimedia content (examples of which may include but are not limited to interactive presentations and slideshows, for example).

Media distribution system 18 typically provides media data streams and/or media data files to a plurality of users (e.g., users 14, 20, 22, 24, 26). Examples of such a media distribution system 18 include the Rhapsody™ service and Rhapsody-To-Go™ service offered by RealNetwork™ of Seattle, Wash.

Media distribution system 18 is typically a server application that resides on and is executed by computer 28 (e.g., a server computer) that is connected to network 30 (e.g., the Internet). Computer 28 may be a web server running a network operating system, examples of which may include but are not limited to Microsoft Windows 2000 Server™, Novell Netware™, or Redhat Linux™.

Typically, computer 28 also executes a web server application, examples of which may include but are not limited to Microsoft IIS™, Novell Webserver™, or Apache Webserver™, that allows for HTTP (i.e., HyperText Transfer Protocol) access to computer 28 via network 30. Network 30 may be connected to one or more secondary networks (e.g., network 32), such as: a local area network; a wide area network; or an intranet, for example.

The instruction sets and subroutines of media distribution system 18, which are typically stored on a storage device 34 coupled to computer 28, are executed by one or more processors (not shown) and one or more memory architectures (not shown) incorporated into computer 28. Storage device 34 may include but are not limited to a hard disk drive, a tape drive, an optical drive, a RAID array, a random access memory (RAM), or a read-only memory (ROM).

Users 14, 20, 22, 24, 26 may access media distribution system 18 directly through network 30 or through secondary network 32. Further, computer 28 (i.e., the computer that executes media distribution system 18) may be connected to network 30 through secondary network 32, as illustrated with phantom link line 36.

Users 14, 20, 22, 24, 26 may access media distribution system 18 through various client electronic devices, examples of which may include but are not limited to personal media devices 12, 38, 40, 42, client computer 44, personal digital assistants (not shown), cellular telephones (not shown), televisions (not shown), cable boxes (not shown), internet radios (not shown), or dedicated network devices (not shown), for example.

The various client electronic devices may be directly or indirectly coupled to network 30 (or network 32). For example, client computer 44 is shown directly coupled to network 30 via a hardwired network connection. Further, client computer 44 may execute a client application 46 (examples of which may include but are not limited to Microsoft Internet Explorer™, Netscape Navigator™, RealRhapsody™ client, RealPlayer™ client, or a specialized interface) that allows e.g., user 22 to access and configure media distribution system 18 via network 30 (or network 32). Client computer 44 may run an operating system, examples of which may include but are not limited to Microsoft Windows™, or Redhat Linux™.

The instruction sets and subroutines of client application 46, which are typically stored on a storage device 48 coupled to client computer 44, are executed by one or more processors (not shown) and one or more memory architectures (not shown) incorporated into client computer 44. Storage device 48 may include but are not limited to a hard disk drive, a tape drive, an optical drive, a RAID array, a random access memory (RAM), or a read-only memory (ROM).

As discussed above, the various client electronic devices may be indirectly coupled to network 30 (or network 32). For example, personal media device 38 is shown wireless coupled to network 30 via a wireless communication channel 50 established between personal media device 38 and wireless access point (i.e., WAP) 52, which is shown directly coupled to network 30. WAP 52 may be, for example, an IEEE 802.11a, 802.11b, 802.11g, Wi-Fi, and/or Bluetooth device that is capable of establishing the secure communication channel 50 between personal media device 38 and WAP 52. As is known in the art, all of the IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

In addition to being wirelessly coupled to network 30 (or network 32), personal media devices may be coupled to network 30 (or network 32) via a proxy computer (e.g., proxy computer 54 for personal media device 12, proxy computer 56 for personal media device 40, and proxy computer 58 for personal media device 42, for example).

Figure 2:
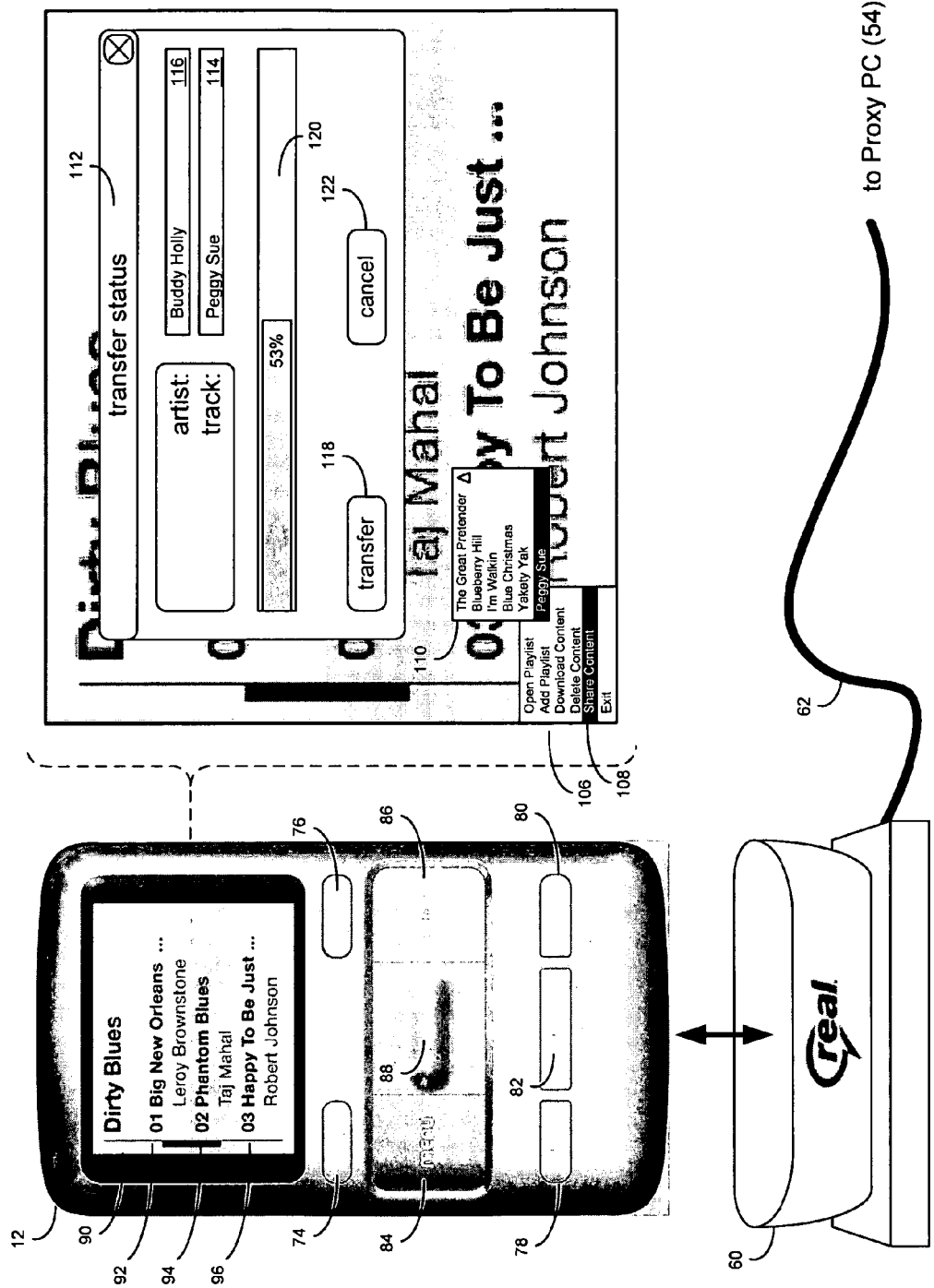
FIG. 2 is an isometric view of the personal media device of FIG. 1.

Personal Media Device:

For example and referring also to FIG. 2, personal media device 12 may be connected to proxy computer 54 via a docking cradle 60. Typically, personal media device 12 includes a bus interface (to be discussed below in greater detail) that couples personal media device 12 to docking cradle 60. Docking cradle 60 may be coupled (with cable 62) to e.g., a universal serial bus (i.e., USB) port, a serial port, or an IEEE 1394 (i.e., FireWire) port included within proxy computer 54. For example, the bus interface included within personal media device 12 may be a USB interface, and docking cradle 60 may function as a USB hub (i.e., a plug-and-play interface that allows for "hot" coupling and uncoupling of personal media device 12 and docking cradle 60).

Proxy computer 54 may function as an Internet gateway for personal media device 12. Accordingly, personal media device 12 may use proxy computer 54 to access media distribution system 18 via network 30 (and network 32) and obtain media content 16. Specifically, upon receiving a request for media distribution system 18 from personal media device 12, proxy computer 54 (acting as an Internet client on behalf of personal media device 12), may request the appropriate web page/service from computer 28 (i.e., the computer that executes media distribution system 18). When the requested web page/service is returned to proxy computer 54, proxy computer 54 relates the returned web page/service to the original request (placed by personal media device 12) and forwards the web page/service to personal media device 12. Accordingly, proxy computer 54 may function as a conduit for coupling personal media device 12 to computer 28 and, therefore, media distribution system 18.

Further, personal media device 12 may execute a device application 64 (examples of which may include but are not limited to RealRhapsody™ client, RealPlayer™ client, or a specialized interface). Personal media device 12 may run an operating system, examples of which may include but are not limited to Microsoft Windows CE™, Redhat Linux™, Palm OS™, or a device-specific (i.e., custom) operating system.

DRM process 10 is typically a component of device application 64 (examples of which may include but are not limited to an embedded feature of device application 64, a software plug-in for device application 64, or a stand-alone application called from within and controlled by device application 64). The instruction sets and subroutines of device application 64 and DRM process 10, which are typically stored on a storage device 66 coupled to personal media device 12, are executed by one or more processors (not shown) and one or more memory architectures (not shown) incorporated into personal media device 12. Storage device 66 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card, for example.

An administrator 68 typically accesses and administers media distribution system 18 through a desktop application 70 (examples of which may include but are not limited to Microsoft Internet Explorer™, Netscape Navigator™, or a specialized interface) running on an administrative computer 72 that is also connected to network 30 (or network 32).

The instruction sets and subroutines of desktop application 70, which are typically stored on a storage device (not shown) coupled to administrative computer 72, are executed by one or more processors (not shown) and one or more memory architectures (not shown) incorporated into administrative computer 72. The storage device (not shown) coupled to administrative computer 72 may include but are not limited to a hard disk drive, a tape drive, an optical drive, a RAID array, a random access memory (RAM), or a read-only memory (ROM).

Figure 3:
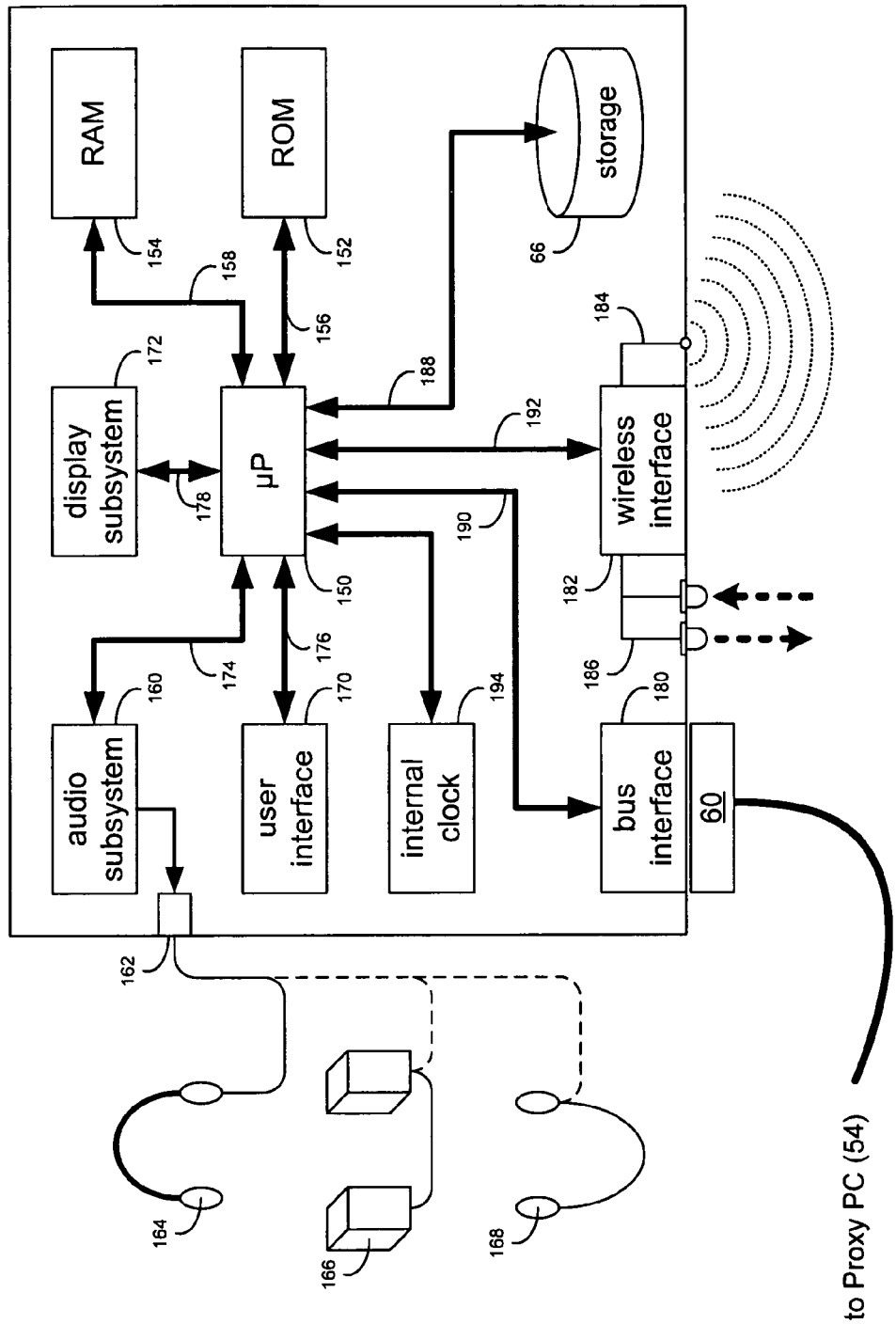
FIG. 3 is a diagrammatic view of the personal media device of FIG. 1.

Referring also to FIG. 3, a diagrammatic view of personal media device 12 is shown. Personal media device 12 typically includes microprocessor 150, non-volatile memory (e.g., read-only memory 152), and volatile memory (e.g., random access memory 154); each of which is interconnected via one or more data/system buses 156, 158. Personal media device 12 may also include an audio subsystem 160 for providing e.g., an analog audio signal to an audio jack 162 for removable engaging e.g., a headphone assembly 164, a remote speaker assembly 166, or an ear bud assembly 168, for example. Alternatively, personal media device 12 may be configured to include one or more internal audio speakers (not shown).

Personal media device 12 may also include a user interface 170 and a display subsystem 172. User interface 170 may receive data signals from various input devices included within personal media device 12, examples of which may include (but are not limited to): rating switches 74, 76; backward skip switch 78; forward skip switch 80; play/pause switch 82; menu switch 84; radio switch 86; and slider assembly 88, for example. Display subsystem 172 may provide display signals to display panel 90 included within personal media device 12. Display panel 90 may be an active matrix liquid crystal display panel, a passive matrix liquid crystal display panel, or a light emitting diode display panel, for example.

Audio subsystem 160, user interface 170, and display subsystem 172 may each be coupled with microprocessor 150 via one or more data/system buses 174, 176, 178 (respectively).

During use of personal media device 12, display panel 90 may be configured to display e.g., the title and artist of various pieces of media content 92, 94, 96 stored within personal media device 12. Slider assembly 88 may be used to scroll upward or downward through the list of media content stored within personal media device 12. When the desired piece of media content is highlighted (e.g., "Phantom Blues" by "Taj Mahal"), user 14 may select the media content for rendering using play/pause switch 82. User 14 may skip forward to the next piece of media content (e.g., "Happy To Be Just . . . " by "Robert Johnson") using forward skip switch 80; or skip backward to the previous piece of media content (e.g., "Big New Orleans . . . " by "Leroy Brownstone") using backward skip switch 78. Additionally, user 14 may rate the media content as they listen to it by using rating switches 74, 76.

As discussed above, personal media device 12 may include a bus interface 180 for interfacing with e.g., proxy computer 54 via docking cradle 60. Additionally and as discussed above, personal media device 12 may be wireless coupled to network 30 via a wireless communication channel 50 established between personal media device 12 and e.g., WAP 52. Accordingly, personal media device 12 may include a wireless interface 182 for wirelessly-coupling personal media device 12 to network 30 (or network 32) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device (such as personal media device 40). Further and as discussed above, personal media device 12 may include a storage device 66 for storing the instruction sets and subroutines of device application 64 and DRM process 10. Additionally, storage device 66 may be used to store media data files downloaded from media distribution system 18 and to temporarily store media data streams (or portions thereof) streamed from media distribution system 18.

Storage device 66, bus interface 180, and wireless interface 182 may each be coupled with microprocessor 150 via one or more data/system buses 188, 190, 192 (respectively).

As discussed above, media distribution system 18 distributes media content to users 14, 20, 22, 24, 26, such that the media content distributed may be in the form of media data streams and/or media data files.

Accordingly, media distribution system 18 may be configured to only allow users to download media data files. For example, user 14 may be allowed to download, from media distribution system 18, media data files (i.e., examples of which may include but are not limited to MP3 files or AAC files), such that copies of the media data file are transferred from computer 28 to personal media device 12 (being stored on storage device 66).

Alternatively, media distribution system 18 may be configured to only allow users to receive and process media data streams of media data files. For example, user 22 may be allowed to receive and process (on client computer 44) media data streams received from media distribution system 18. As discussed above, when media content is streamed from e.g., computer 28 to client computer 44, a copy of the media data file is not permanently retained on client computer 44.

Further, media distribution system 18 may be configured to allow users to receive and process media data streams and download media data files. Examples of such a media distribution system include the Rhapsody™ and Rhapsody-to-Go™ services offered by RealNetworks™ of Seattle, Wash. Accordingly, user 14 may be allowed to download media data files and receive and process media data streams from media distribution system 18. Therefore, copies of media data files may be transferred from computer 28 to personal media device 12 (i.e., the received media data files being stored on storage device 66); and streams of media data files may be received from computer 28 by personal media device 12 (i.e., with portions of the received stream temporarily being stored on storage device 66). Additionally, user 22 may be allowed to download media data files and receive and process media data streams from media distribution system 18. Therefore, copies of media data files may be transferred from computer 28 to client computer 44 (i.e., the received media data files being stored on storage device 48); and streams of media data files may be received from computer 28 by client computer 44 (i.e., with portions of the received streams temporarily being stored on storage device 48).

Typically, in order for a device to receive and process a media data stream from e.g., computer 28, the device must have an active connection to computer 28 and, therefore, media distribution system 18. Accordingly, personal media device 38 (i.e., actively connected to computer 28 via wireless channel 50), and client computer 44 (i.e., actively connected to computer 28 via a hardwired network connection) may receive and process media data streams from e.g., computer 28.

As discussed above, proxy computers 54, 56, 58 may function as a conduit for coupling personal media devices 12, 40, 42 (respectively) to computer 28 and, therefore, media distribution system 18. Accordingly, when personal media devices 12, 40, 42 are coupled to proxy computers 54, 56, 58 (respectively) via e.g., docking cradle 60, personal media devices 12, 40, 42 are actively connected to computer 28 and, therefore, may receive and process media data streams provided by computer 28.

User Interfaces:

As discussed above, media distribution system 18 may be accessed using various types of client electronic devices, which include but are not limited to personal media devices 12, 38, 40, 42, client computer 44, personal digital assistants (not shown), cellular telephones (not shown), televisions (not shown), cable boxes (not shown), internet radios (not shown), or dedicated network devices (not shown), for example. Typically, the type of interface used by the user (when configuring media distribution system 18 for a particular client electronic device) will vary depending on the type of client electronic device to which the media content is being streamed/downloaded.

For example, as the embodiment shown (in FIG. 2) of personal media device 12 does not include a keyboard and the display panel 90 of personal media device 12 is compact, media distribution system 18 may be configured for personal media device 12 via proxy application 98 executed on proxy computer 54.

The instruction sets and subroutines of proxy application 98, which are typically stored on a storage device (not shown) coupled to proxy computer 54, are executed by one or more processors (not shown) and one or more memory architectures (not shown) incorporated into proxy computer 54. The storage device (not shown) coupled to proxy computer 54 may include but are not limited to a hard disk drive, a tape drive, an optical drive, a RAID array, a random access memory (RAM), or a read-only memory (ROM).

Additionally and for similar reasons, personal digital assistants (not shown), cellular telephones (not shown), televisions (not shown), cable boxes (not shown), internet radios (not shown), and dedicated network devices (not shown) may use proxy application 98 executed on proxy computer 54 to configure media distribution system 18.

Further, the client electronic device need not be directly connected to proxy computer 54 for media distribution system 18 to be configured via proxy application 98. For example, assume that the client electronic device used to access media distribution system 18 is a cellular telephone. While cellular telephones are typically not physically connectable to e.g., proxy computer 54, proxy computer 54 may still be used to remotely configure media distribution system 18 for use with the cellular telephone. Accordingly, the configuration information (concerning the cellular telephone) that is entered via e.g., proxy computer 54 may be retained within media distribution system 18 (on computer 28) until the next time that the user accesses media distribution system 18 with the cellular telephone. At that time, the configuration information saved on media distribution system 18 may be downloaded to the cellular telephone.

For systems that include keyboards and larger displays (e.g., client computer 44), client application 46 may be used to configure media distribution system 18 for use with client computer 44.

Figure 4:
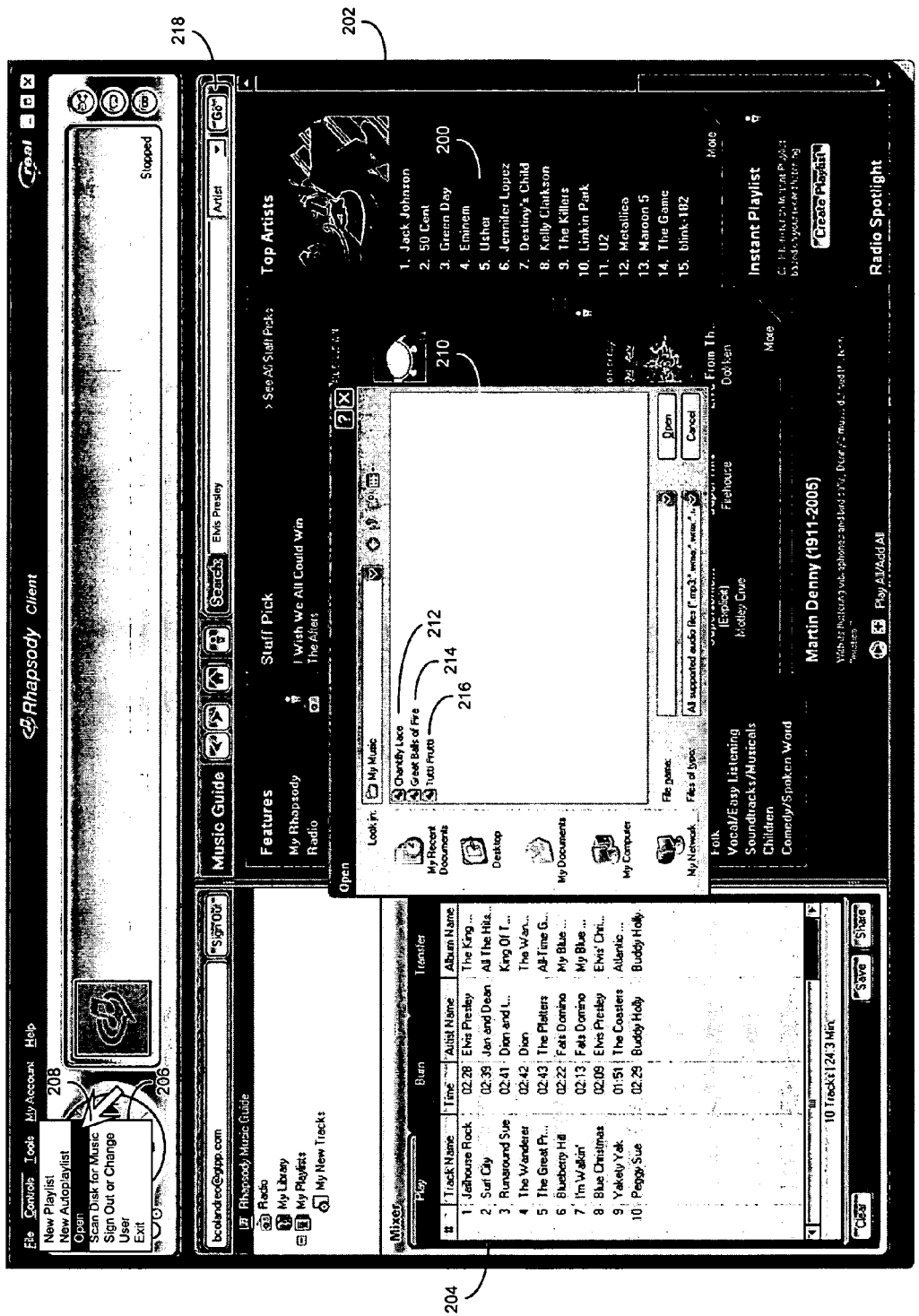
FIG. 4 is a display screen rendered by the client application of FIG. 1.

Referring also to FIG. 4, when using client application 46 to access media distribution system 18, user 22 may be presented with an information display screen 200 rendered by client application 46. Client application 46 typically includes a user interface 202 (e.g., a web browser) for interfacing with media distribution system 18 and viewing information display screen 200.

When e.g., user 22 streams/downloads media content from e.g., computer 28, media distribution system 18 may monitor the media content streamed/downloaded to the user's client electronic device (e.g., client computer 44, for example), resulting in the generation of a media history file 100 for that user. While media history file 100 is typically maintained locally (e.g., maintained on client computer 44), media history file 100 may alternatively/additionally be maintained remotely (e.g., maintained on computer 28) as a remote media history file 100'.

The user (e.g., user 22) may save this media history file (or portions thereof) as a playlist. A playlist is typically a group of tracks (examples of which may include, but are not limited to, songs, videos, news broadcasts, sports broadcasts, etc) that media distribution system 18 will render in sequence. This, in turn, allows the user to compile custom music compilations (in the form of multiple playlists).

A history window 204 may be rendered by client application 46 that itemizes the information contained within media history file 100. In this example, history window 204 itemizes ten (10) media data streams (e.g., "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue"), thus indicating that user 22 had previously listened to those ten (10) media data streams.

In addition to media data streams (i.e., media data streams received from a remote device e.g., computer 28), client application 46 allows user 12 to render local media data files. As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example. These local media data files are typically stored locally on e.g., storage device 48 coupled to client computer 44.

If user 22 wishes to render a local media data file (i.e., a file stored on client computer 44), user 22 may e.g., select the file(s) to be rendered using client application 46. Accordingly, user 22 may select the dropdown "File" menu 206 using screen pointer 208, which is controllable by a pointing device (e.g., a computer mouse, not shown). Selecting the "Open" command may result in client application 46 rendering file management window 210, which allows user 22 to select local media data files for playback.

In this example, file management window 210 defines three (3) local media data files, namely: "Chantilly Lace" 212; "Great Balls of Fire" 214; and "Tutti Frutti" 216, all of which are stored within the folder "My Music". User 22 may select any (or all) of these files for playback on client application 46.

A search window 218 allows a user (e.g., user 22) to search for media content. For example, user 22 may enter search terms (e.g., "Elvis Presley"), select the appropriate term type (e.g., artist), and execute a query. In the event that multiple artists satisfy the query, a result set is generated from which user 22 may select e.g., the appropriate artist. Once the appropriate artist is selected, user 22 may review the various albums released by the selected artist (or that include tracks by the selected artist). User 22 may then render one or more of the various tracks included within any of the albums. Once a track is rendered, identifying information concerning the track rendered is added to local media history file 100 and/or remote media history file 100' and is included in history window 204. In addition to being able to search for media content by artist, user 14 may also be able to search for media content by e.g., keyword, track, album and/or composer.

Figure 5:
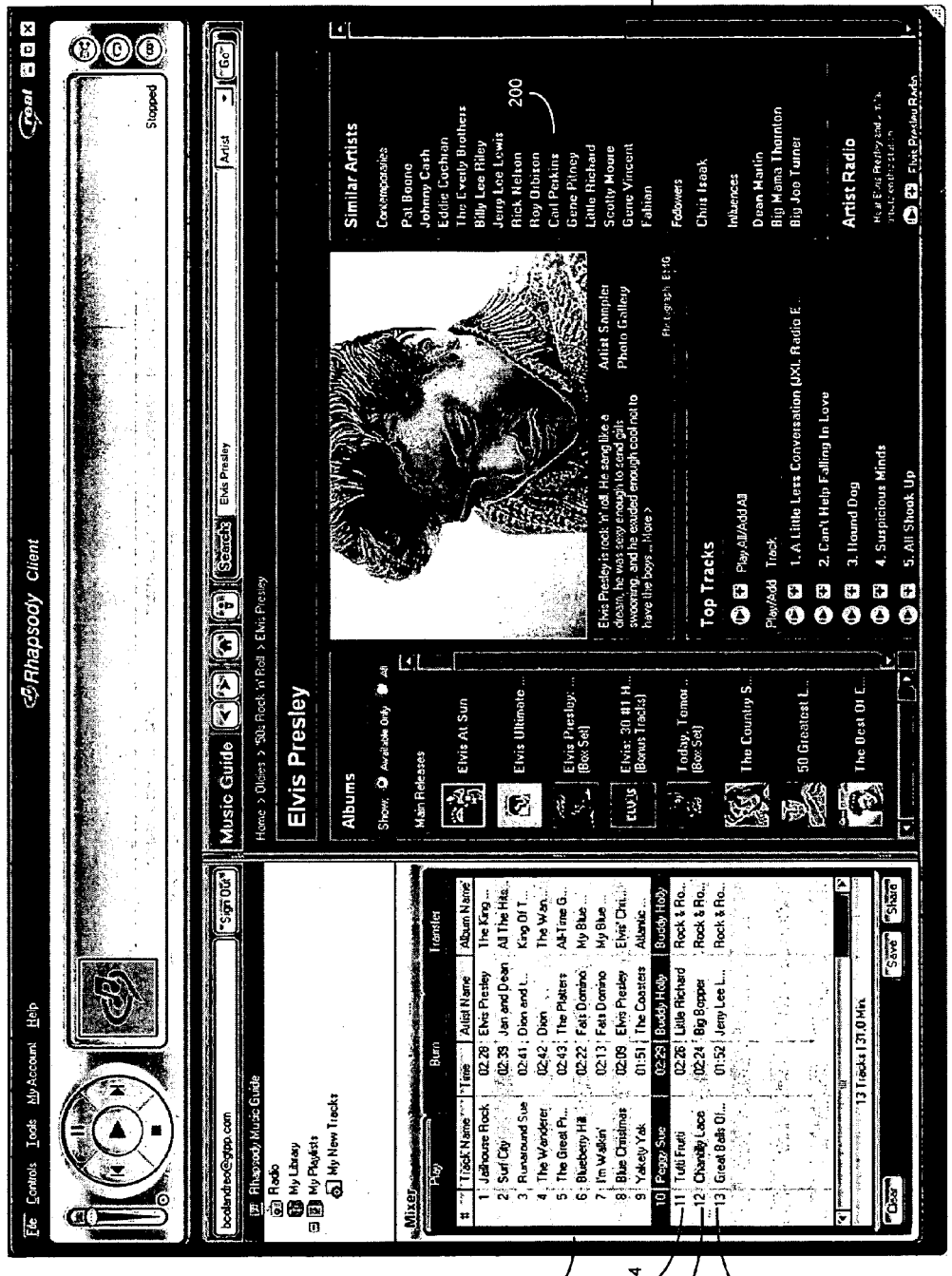
FIG. 5 is a display screen rendered by the client application of FIG. 1.

Referring also to FIG. 5 and assuming that user 22 selects all three local media data files for playback, media history file 100 is amended to include three additional entries, namely one for "Chantilly Lace"; one for "Great Balls of Fire"; and one for "Tutti Frutti". Accordingly, as history window 204 itemizes the information contained within media history file 100, history window 204 will include three additional entries (i.e., entries 220, 222, 224), which correspond to local media data file "Chantilly Lace" 212; local media data file "Great Balls of Fire" 214; and local media data file "Tutti Frutti" 216.

Assuming that user 22 wishes to save this collection of music for future playback, user 22 may save the current media history file 100 (or a portion thereof) as a playlist 102 (FIG. 1). While playlist 102 is typically maintained locally (e.g., maintained on client computer 44), playlist 102 may alternatively/additionally be maintained remotely (e.g., maintained on computer 28) as a remote playlist 102'.

Figure 6:
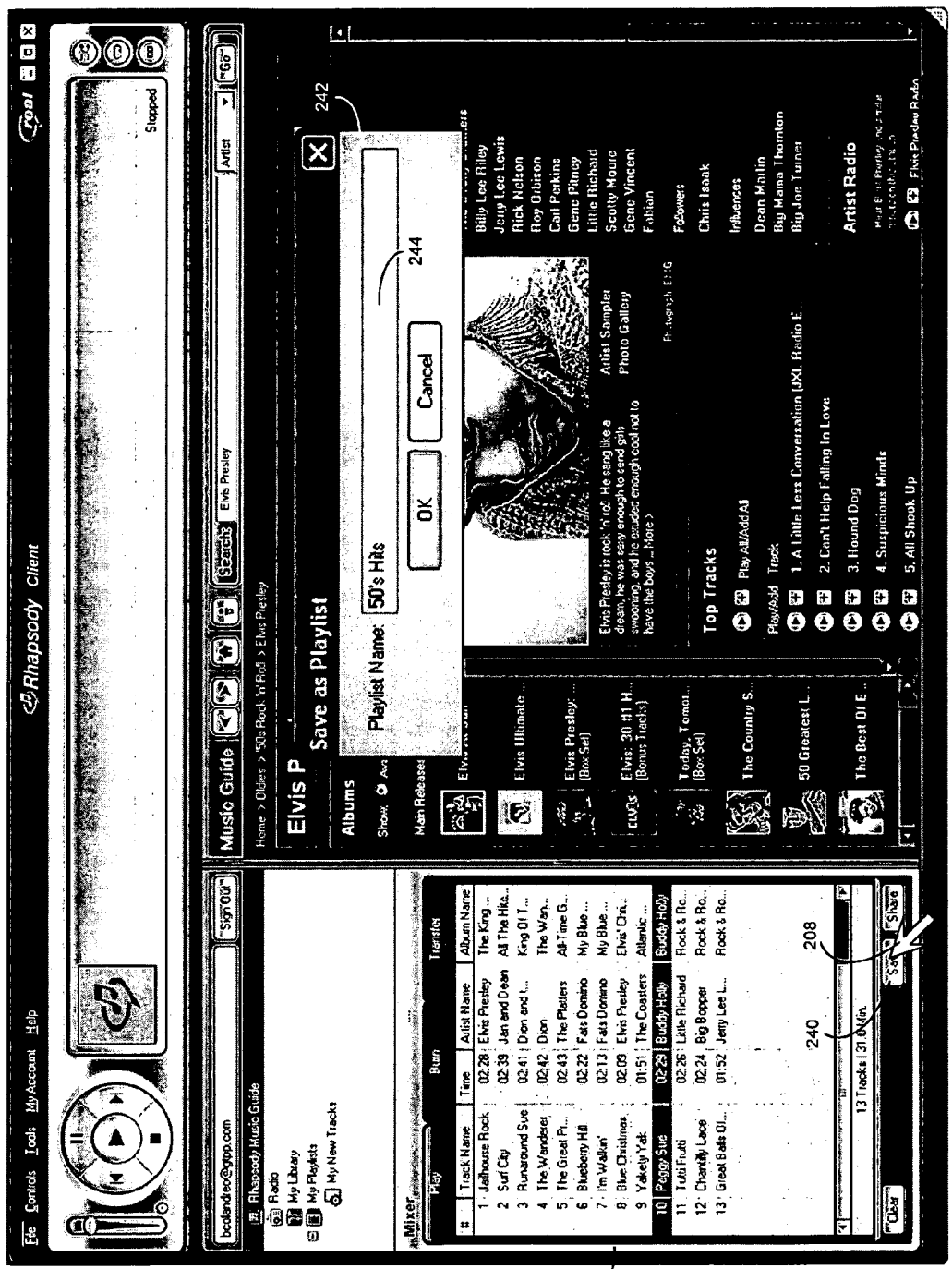
FIG. 6 is a display screen rendered by the client application of FIG. 1.

Referring also to FIG. 6, user 22 may select the "save" button 240 (using screen pointer 208). Once the "save" button 240 is selected, a playlist naming window 242 is rendered (by client application 46) that allows user 22 to specify a unique name for playlist 102 within the name field 244 of playlist naming window 242.

Assuming that user 22 selects "50's Hits" as a playlist name, playlist 102 is saved (i.e., as "50's Hits") and defines the location of all of the pieces of media content itemized within history window 204.

Figure 7:
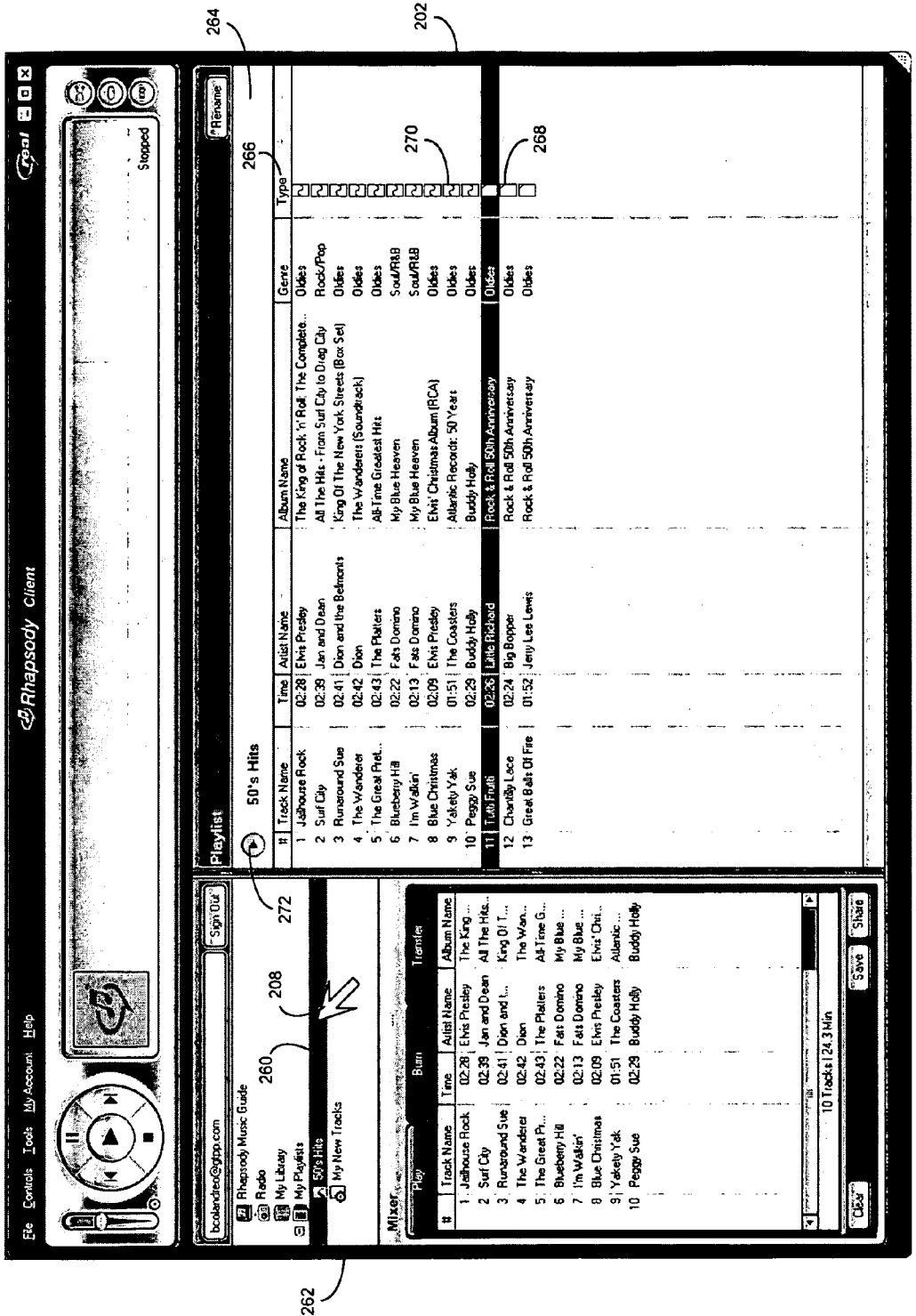
FIG. 7 is a display screen rendered by the client application of FIG. 1.

Referring also to FIG. 7, once playlist 102 is stored, a link 260 to playlist 102 (e.g., "50's Hits") appears in directory window 262. User 22 may then select link 260 using screen pointer 208. Once selected, the tracks included within playlist 102 (e.g., "50's Hits") are itemized within a playlist window 264 (e.g., a web page) viewable via user interface 202. As discussed above, ten of these entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") define the location of media data streams and three of these entries (namely "Tutti Frutti"; "Chantilly Lace"; and "Great Balls of Fire") define the location of media data files.

Typically, playlist window 264 includes hyperlinks that locate (i.e., provide addresses for) the streams/files associated with the individual entries itemized within playlist 102. This location information is stored within playlist 102. For example, the following table correlates the track name of an entry in playlist 102 with an address for the stream/file associated with that track name:

| Track Name | Address |
| --- | --- |
| Jailhouse Rock | www.musicshop.com\songs\jailhouse_rock.ram |
| Surf City | www.musicshop.com\songs\surf_city.ram |
| Runaround Sue | www.musicshop.com\songs\runaround_sue.ram |
| The Wanderer | www.musicshop.com\songs\the_wanderer.ram |
| The Great Pretender | www.musicshop.com\songs\the_great_pretender.ram |
| Blueberry Hill | www.musicshop.com\songs\blueberry_hill.ram |
| I'm Walkin' | www.musicshop.com\songs\im_walkin.ram |
| Blue Christmas | www.musicshop.com\songs\blue_christmas.ram |
| Yakety Yak | www.musicshop.com\songs\yakety_yak.ram |
| Peggy Sue | www.musicshop.com\songs\peggy_sue.ram |
| Tutti Frutti | c:\my music\tutti_frutti.mp3 |
| Chantilly Lace | c:\my music\chantilly_lace.mp3 |
| Great Balls of Fire | c:\my music\great_balls_of_fire.mp3 |

As the first ten entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") identify media data streams, the address provided for each entry points to a media stream available from e.g., media distribution system 18. Further, as the last three entries (namely "Tutti Frutti"; "Chantilly Lace"; and "Great Balls of Fire") identify media data files, the address provided for each entry points to a media data file available from e.g., client computer 44.

Playlist window 264 is typically tabular and may include a column 266 identifying a media type (i.e., media data stream or media data file, for example) for each entry within playlist window 264. Typically, column 266 includes icons that identify the media type (e.g., icon 268 identifies a media data file and icon 270 identifies a media data stream). User 22 may select the "play" button 272 to render playlist 102.

As discussed above, media distribution system 18 typically provides media data streams and/or media data files to users (e.g., user 22). Typically, metadata is associated with each media data stream provided by media distribution system 18. This metadata may include (but is not limited to) an artist identifier, an album identifier, a track identifier, an album cover image, and a music genre identifier, for example.

Accordingly, whenever e.g., user 12 renders a remote media data stream, media distribution system 18 may compile and save this metadata (on a per-user basis) to track e.g., listening trends and musical preferences of individual users, for example.

As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example.

If the purchased download and/or the subscription download were provided by media distribution system 18, these local media data files would typically also include the metadata described above. Accordingly, when these purchased/ subscription downloads are rendered by e.g., user 22, the metadata concerning these purchased/subscription downloads may be transmitted from computer 44 to computer 28, such that the metadata is compiled and saved (on a per user basis) to track e.g., listening trends and musical preferences, for example.

However, for media data files that were e.g., extracted from music compact discs, these data files may not include the above-described metadata. As discussed above, media data files (i.e., files stored on client computer 44) may be rendered using client application 46 and added to playlists (e.g., playlist 102). Accordingly, whenever user 22 attempts to add a media data file (that does not include metadata) to a playlist (e.g., playlist 102), user 22 may be prompted to provide metadata concerning that media data file.

Figure 8:
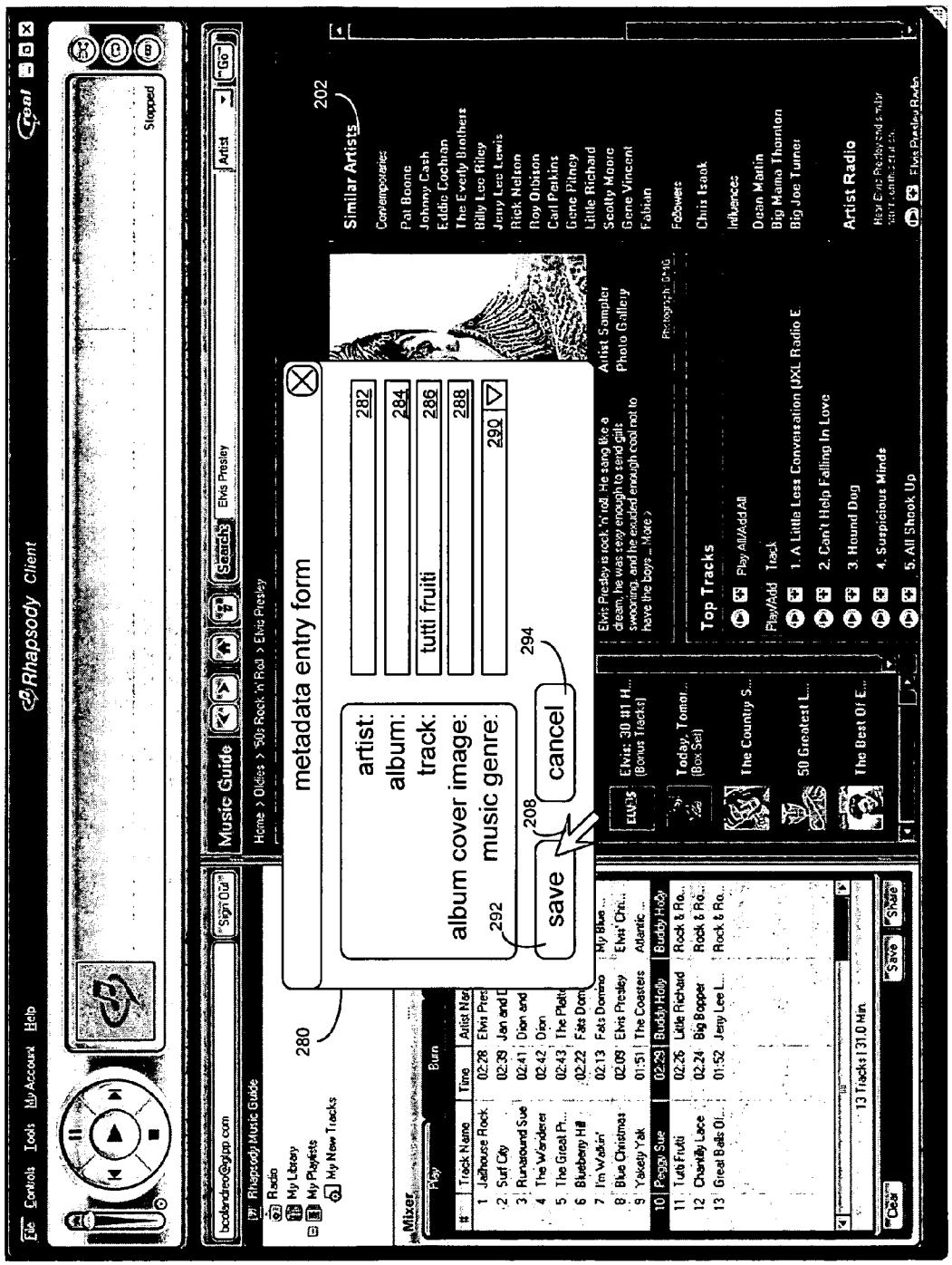
FIG. 8 is a display screen rendered by the client application of FIG. 1.

Referring also to FIG. 8 and continuing with the above-stated example, if user 22 attempts to save a playlist (e.g., playlist 102) that includes three local media data files (namely "Tutti Frutti"; "Chantilly Lace"; and "Great Balls of Fire"), assuming that these three local media data files do not include metadata, client application 46 may render a metadata entry form 280 that allows user 22 to enter metadata concerning each of the three media data files.

In this example, metadata entry form 280 includes five user-editable fields, namely an artist field 282, an album field 284, a track field 286, an album cover image field 288, and a music genre field 290. Album cover image field 288 may allow user 22 to define a drive, a path, and a filename for an album cover image. Music genre field 290 may be a drop-down menu (operable via screen pointer 208) that allows user 22 to select a music genre from a number of predefined music genres (not shown).

Typically, if the title of the media data file is descriptive of the track name, the track field 286 may be automatically-populated with what client application 46 suspects is the track title. As the first local media data file is named "tutti frutti", track field 286 would typically be populated with the suspected name "tutti frutti". User 22 may populate the remaining fields and select the save button 292 (using screen pointer 208) or alternatively select the cancel button 294.

In order to further automate the metadata generation process, client application 44 may interface with a remote metadata database (not shown) served by e.g., media distribution system 18 or a third party (not shown). This metadata database may define metadata for various tracks and albums. An example of such a database is the CDDB™ database maintained by Gracenote™ of Emeryville, Calif. (www.gracenote.com). For example, if user 22 ripped each track from an entire compact disc, the metadata database may be accessed by client application 44 and a query may be structured that defines e.g., the total number of tracks included on the compact disc, the length of each track included on the compact disc, and the total length of the compact disc. Assuming that a definitive result is produced by this query, the metadata for each track ripped from the compact disc would be produced. In the event that an indefinite result set (i.e., one that identifies multiple possible compact discs) is generated, user 22 may be prompted to select the appropriate compact disc from a list of possible matches (not shown).

As discussed above, the type of interface used by the user (when configuring media distribution system 18 for a client electronic device) may vary depending on the type and the capabilities of the client electronic device to which the media content is being streamed/downloaded. Accordingly and as discussed above, media distribution system 18 may be configured for personal media device 12 via proxy application 98 executed on proxy computer 54.

Proxy application 98 may be automatically executed upon personal media device 12 being placed into docking cradle 60 by e.g., user 14. Alternatively, proxy application 98 may be fully or partially loaded upon boot up of proxy computer 54. Proxy application 98 may then operate in the background until personal media device 12 is placed into docking cradle 60, at which time proxy application 98 may be fully loaded and/or moved to the foreground for execution. Further, proxy application 98 may be manually executed by user 14. As will be discussed below in greater detail, proxy application 98 (once executed) may be used to e.g., configure personal media device 12 and transfer media data files to and remove media data files from personal media device 12, for example.

Figure 9:
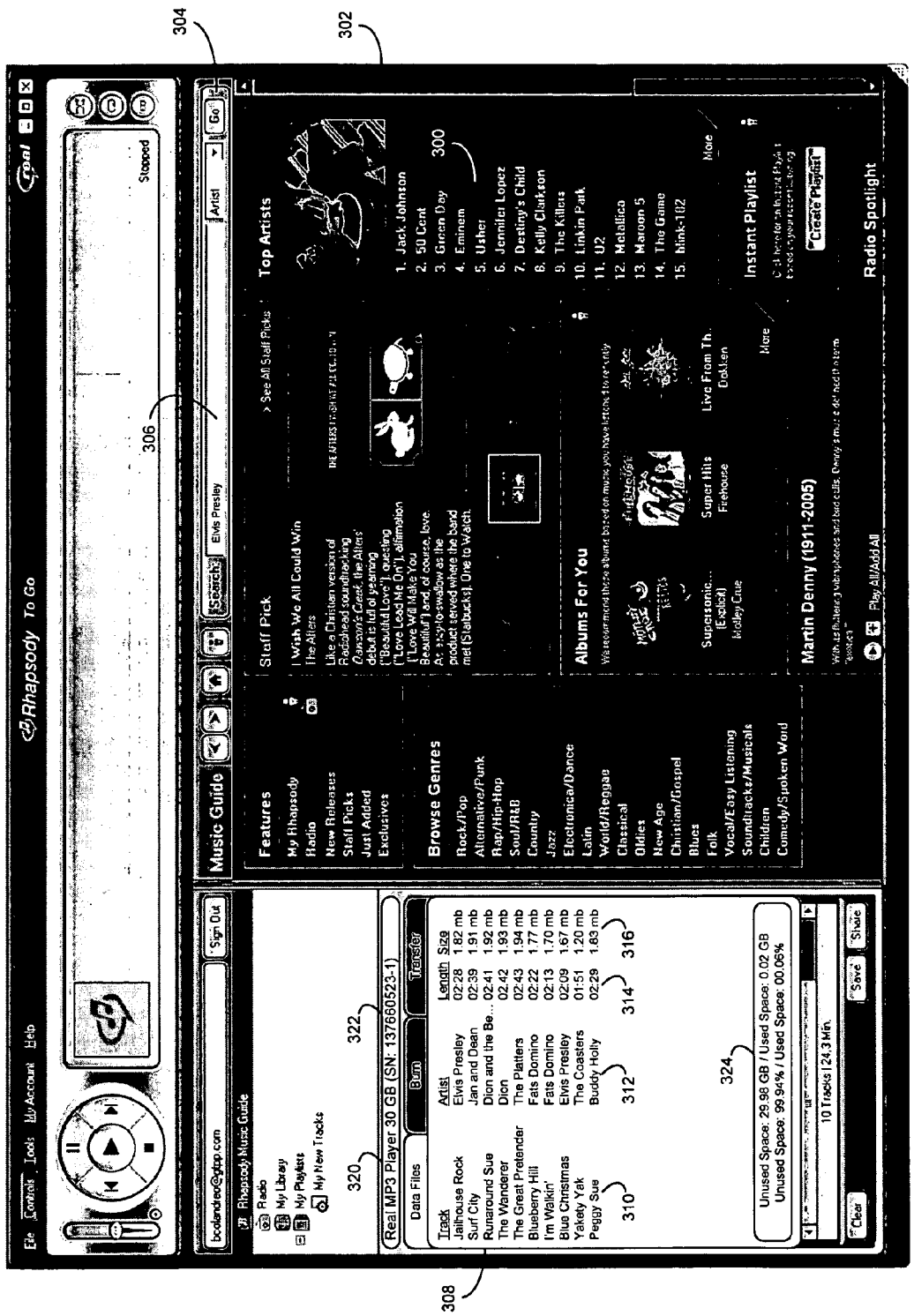
FIG. 9 is a display screen rendered by the proxy application of FIG. 1.

Referring also to FIG. 9, when using proxy application 98 to access media distribution system 18, user 14 may be presented with a information display screen 300 rendered by proxy application 98. Proxy application 98 typically includes a user interface 302 (e.g., a web browser) for interfacing with media distribution system 18 and viewing information display screen 300.

A search window 304 allows a user (e.g., user 14) to search for media content. For example, user 14 may enter search terms (e.g., "Elvis Presley") into search field 306, select the appropriate term type (e.g., artist), and execute a query. In the event that multiple artists satisfy the query, a result set is generated from which user 14 may select e.g., the appropriate artist. Once the appropriate artist is selected, user 14 may review the various albums released by the selected artist (or that include tracks by the selected artist). User 14 may then download (for use on personal media device 12) one or more of the various tracks included within any of the albums. In addition to being able to search for media content by artist, user 14 may also be able to search for media content by e.g., keyword, track, album and/or composer.

Additionally, in a fashion similar to that of client application 46, proxy application 98 may be configured to allow user 12 to render (via proxy computer 54) one or more of the various tracks included within any of the albums of the selected artist.

A content window 308 may be rendered by proxy application 98 that allows user 14 to review the contents of personal media device 12. As discussed above, personal media device 12 is coupled to proxy computer 54 via e.g., a USB port, serial port, or FireWire port. Upon or during execution of proxy application 98, proxy application 98 may poll personal media device 12 to retrieve information concerning the media content currently on device 12. This polling may occur in a fashion similar to the manner in which the content of a USB hard drive is determined. In this particular example, content window 308 includes ten (10) entries, namely: "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue", thus indicating that ten (10) media data files had been previously downloaded to personal media device 12, which are typically stored on storage device 66 of personal media device 12.

Content window 308 may be tabular and itemize various pieces of information concerning the downloaded files, including the track 310, the artist 312, the track length 314 and the track size 316. Additionally, proxy application 98 may poll personal media device 14 to retrieve device identification information, which is rendered within a device type field 320 and a device serial number field 322 included within content window 308. Further, content window 308 may include a summary information field 324 concerning the current capacity of device 12, including one or more of e.g., "Unused Space" in gigabytes; "Used Space" in gigabytes; "Unused Space" in percentage of total capacity; and "Used Space" in percentage of total capacity, for example.

Figure 10:
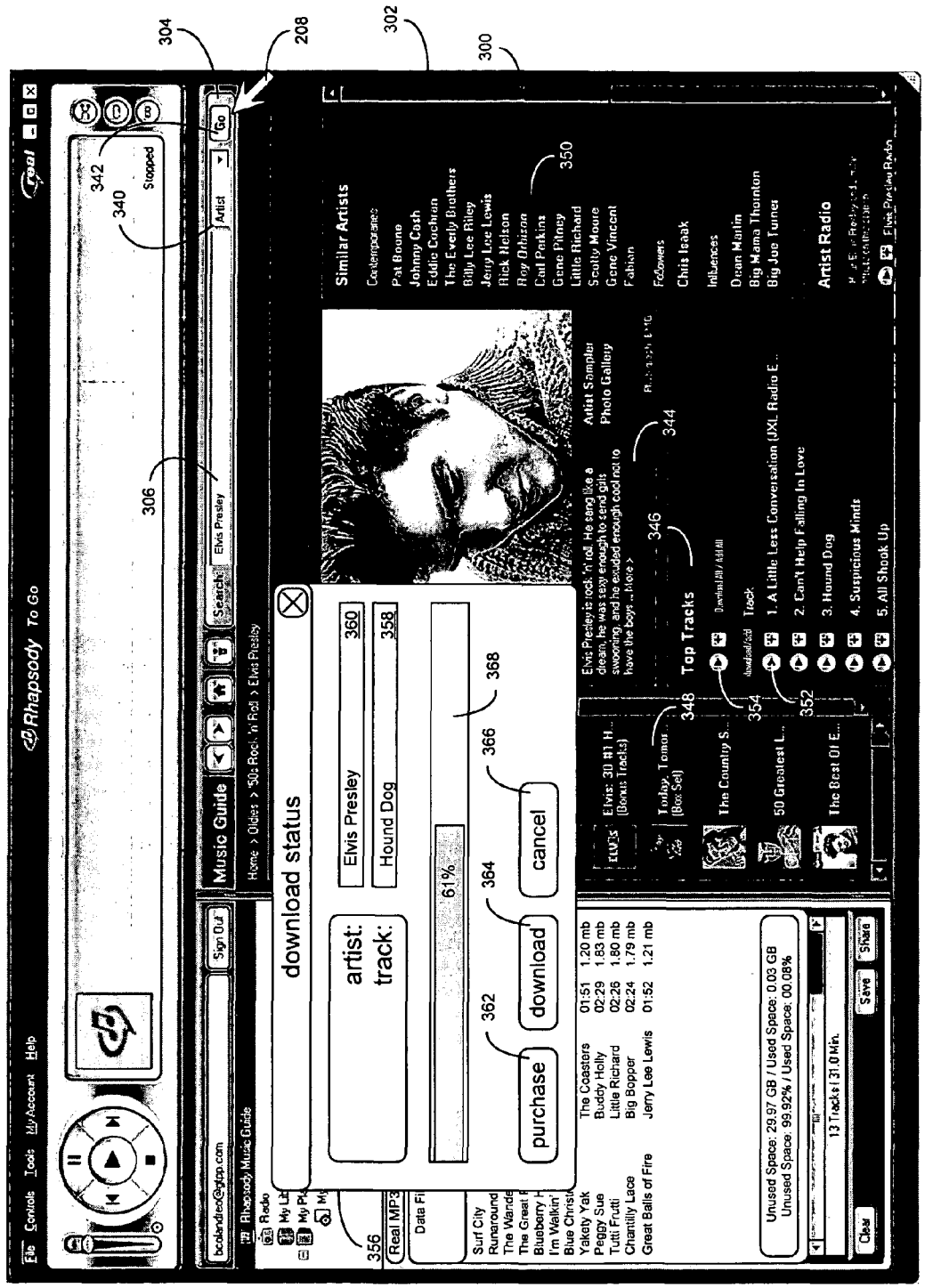
FIG. 10 is a display screen rendered by the proxy application of FIG. 1.

Referring also to FIG. 10 and continuing with the above-stated example, assume that user 14 enters the search term "Elvis Presley" into search field 306 of search window 304, selects the term type "artist" via dropdown menu 340, and executes the query by selecting the "Go" button 342 with screen pointer 208.

Assuming that no other artist satisfies the query, information screen 300 may be presented to user 14 with information concerning Elvis Presley, which may include: an artist information screen 344, a top track list 346, an album list 348, and a similar artist list 350, for example.

User 14 may download media data files from media distribution system 18 for use on personal media device 12 by selecting the download button 352 corresponding to the track to be downloaded. Additionally, user 14 may download groups of tracks (e.g., each track included within top track list 346, or all tracks included within an single album) by selecting the download all button 354 corresponding to the tracks to be downloaded.

Once user 14 selects a track for downloading, proxy application 98 may render a download window 356 that e.g., includes a track title field 358 that identifies the title of the track being downloaded and an artist field 360 that identifies the artist of the track being downloaded.

As discussed above, files may be downloaded from media distribution system 18 as purchased downloads (i.e., media content licensed to e.g., user 14 for use in perpetuity), or subscription downloads (i.e., media content licensed to e.g., user 14 for use while a valid subscription exists with media distribution system 18). Provided user 14 has a current subscription with media distribution system 18, there is typically no additional fee charged for each subscription download, as the downloaded media content is only renderable while the user has a valid subscription. However, a user typically must pay a fee (e.g., 79¢, 89¢, or 99¢, for example) for each purchased download, as the media content is renderable regardless of the status of the user's subscription.

Accordingly, download window 356 may include a purchase button 362 and a download button 364, both of which are selectable via screen pointer 208. In this example, if user 14 selects purchase button 362 with screen pointer 208, a media data file for "Hound Dog" by "Elvis Presley" will be transferred from computer 28 to personal media device 12. Typically, user 14 will be charged e.g., a one-time download fee for downloading this media data file. However, as this is a purchased download, the media data file received is renderable regardless of the status of the user's subscription with media distribution system 18.

Alternatively, if user 14 selects download button 364 with screen pointer 208, a media data file for "Hound Dog" by "Elvis Presley" will be transferred from computer 28 to personal media device 12. Typically, user 14 will not be charged a fee for downloading this media data file. However, as this is a subscription download, the media data file received is only renderable while user 14 has a valid subscription with media distribution system 18.

Download window 356 typically also includes a cancel button 366 for allowing user 14 to cancel the download and close download window 356.

If user 14 selects either purchase button 362 or download button 364, the download of the selected media data file will be initiated. Download window 356 may include a download status indicator 368 for indicating the progress of the download of e.g., "Hound Dog" by "Elvis Presley".

Figure 11:
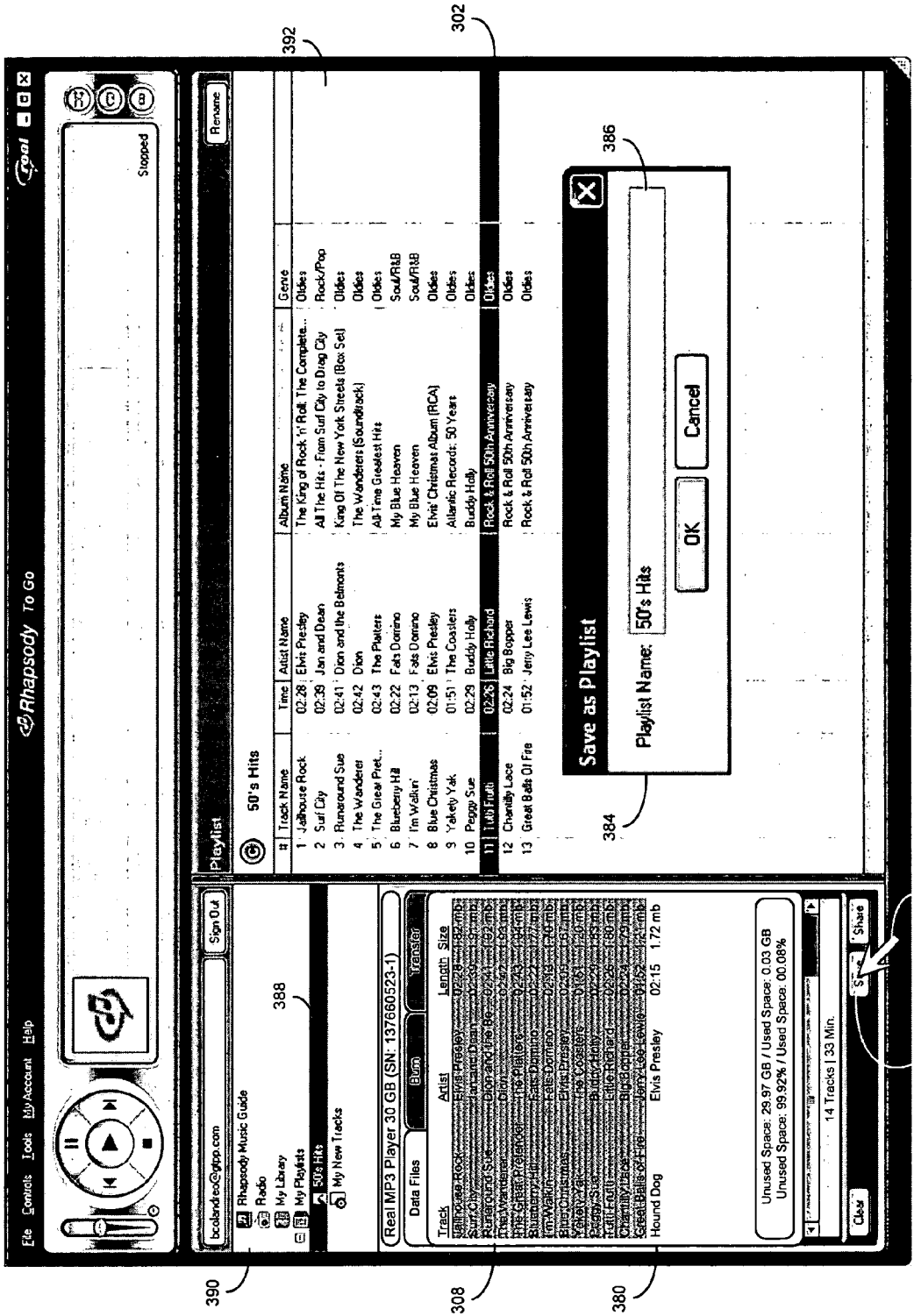
FIG. 11 is a display screen rendered by the proxy application of FIG. 1.

Referring also to FIG. 11, once the download of the media data file for "Hound Dog" by "Elvis Presley" is completed, content window 308 will be updated to include an entry 380 for "Hound Dog" by "Elvis Presley", indicating that "Hound Dog" by "Elvis Presley" was successfully downloaded from media distribution system 18 to personal media device 12.

In a fashion similar to that described above concerning client application 46, user 14 may use proxy application 98 to define playlists concerning various media data files stored on personal media device 12. For example, assume that user 14 wished to save the first thirteen tracks (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; "Peggy Sue"; "Tutti Frutti"; "Chantilly Lace"; and "Great Balls of Fire") as a playlist, user 14 would highlight the desired selection of tracks (using screen pointer 208) and select the save button 382 using screen pointer 208. A playlist naming window 384 may be rendered (by proxy application 98) that allows user 14 to specify a unique name for the playlist within the name field 386 of playlist naming window 384.

Assuming that user 14 selects "50's Hits" as a playlist name, playlist 104 (FIG. 1) named "50's Hits" is defined that locates (within personal media device 12) all of the pieces of media content itemized within playlist 104. Once playlist 104 is stored, a link 388 to playlist 104 (e.g., "50's Hits") appears in directory window 390. User 14 may then select link 388 using screen pointer 208.

Once selected, the tracks included within playlist 104 (e.g., "50's Hits") are typically itemized within a playlist window 392 (e.g., a web page) viewable via user interface 302.

As with the playlists described above as being generated using client application 44, playlists generated using proxy application 98 are typically maintained locally (e.g., maintained on personal media device 12). However and as discussed above, playlists may alternatively/additionally be maintained remotely (e.g., maintained on computer 28) as remote playlist 104'.

Device Initialization:

Media distribution system 18 is typically a subscription-based service, in that e.g., user 14 subscribes to media distribution system 18 and pays e.g., a monthly subscription fee to be granted access to media distribution system 18. Once user 14 subscribes to media distribution system 18, user 14 may obtain media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when accessing media distribution system 18, user 14 must provide user "credentials" that identify the user (e.g., user 14) and/or the device (e.g., device 12) to media distribution system 18. Upon receiving these credentials, media distribution system 18 may attempt to verify the credentials and, if verified, grant user 14 and/or device 12 access to media subscription system 18. The credentials received and verified by media distribution system 18 may include, but are not limited to, a user name, a user password, a user key, a device name, a device password, a device key, and/or one or more digital certificates.

Typically, upon personal media device 12 being placed into docking cradle 60, personal media device 12 establishes a connection with media distribution system 18 via proxy computer 54. As discussed above, proxy computer 54 may function as an Internet gateway for personal media device 12 and, therefore, allow personal media device 12 to access computer 28 and media distribution system 18.

Once a connection is establish with media distribution system 18, DRM process 10 may be initiated. DRM process 10 is typically executed at the time personal media device 12 is initially configured (i.e., the first time personal media device 12 establishes a connection with media distribution system 18). As will be discussed below in greater detail, DRM process 10 may be systematically and repeatedly executed to verify that device 12 (and/or user 14) are active subscribers of media distribution system 18.

Figure 12:
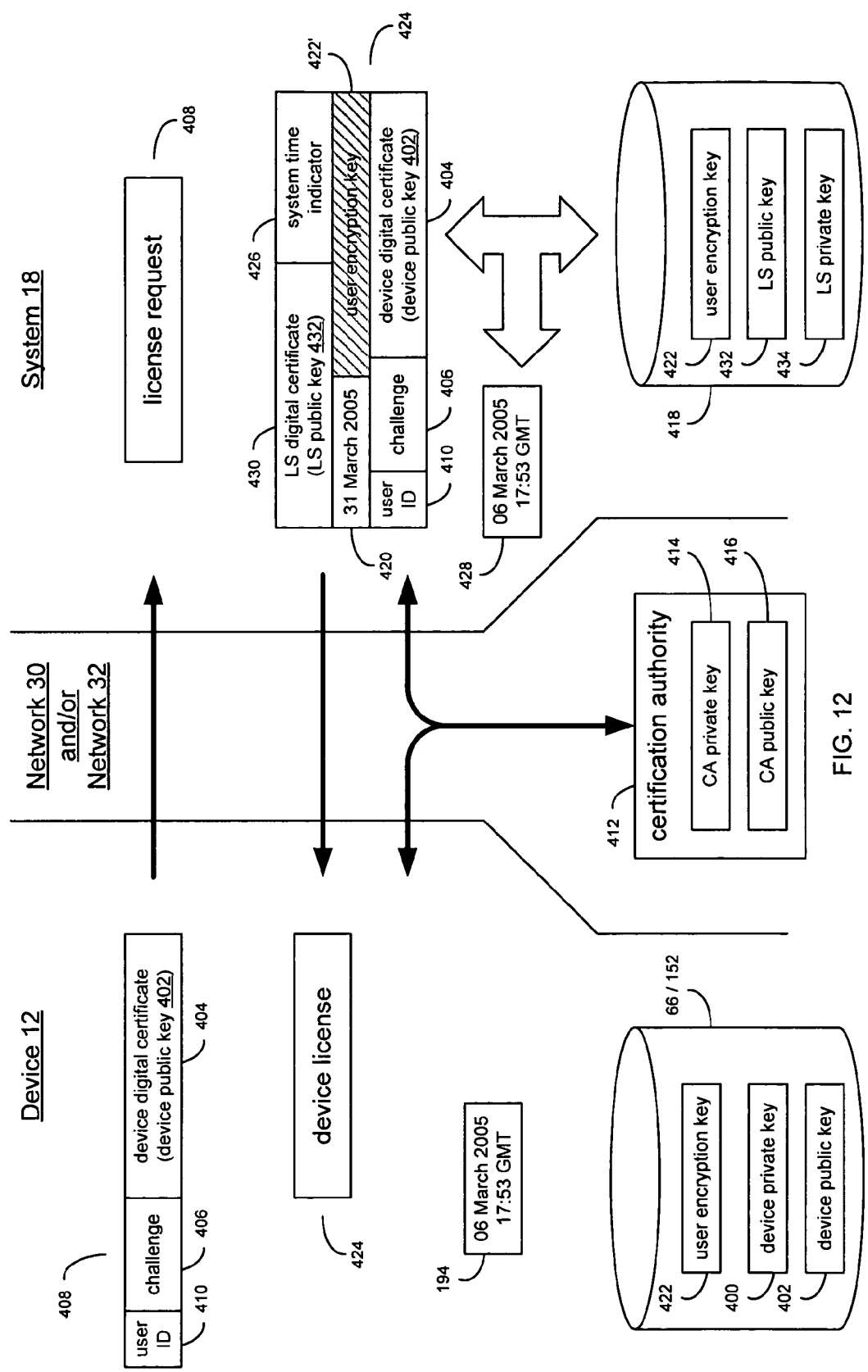
FIG. 12 is a diagrammatic view of the media distribution system, personal media device, and distributed computing network of FIG. 1.

Referring also to FIG. 12, at the time of manufacture, personal media device 12 may include a private encryption key (e.g., device private key 400) and a public encryption key (e.g., device public key 402) stored in non-volatile memory (e.g., ROM 152 and/or storage device 66). Keys 400, 402 may be 1024-bit asymmetric encryption keys and may be referred to as DRM (i.e., digital rights management) keys.

As is known in the art, a private key/public key encryption methodology allows users of an unsecure network (e.g., the Internet) to securely exchange data through the use of a pair of encryption keys, namely the private encryption key (e.g., device private key 400) and the public encryption key (e.g., device public key 402). The private key/public key encryption methodology is typically referred to as an asymmetric encryption methodology, in that the key used to encrypt a message is different than the key used to decrypt the message.

In private key/public key encryption, the private encryption key (e.g., device private key 400) and the public encryption key (e.g., device public key 402) are typically created simultaneously using the same algorithm (e.g., the RSA algorithm created by Ron Rivest, Adi Shamir, and Leonard Adlemana, for example). Device private key 400 is typically given only to the requesting party and device public key 402 is typically made publicly available (e.g., as part of digital certificate 404). Typically, device private key 400 is not shared and is maintained securely within e.g., personal media device 12.

Accordingly, when a secure message is to be sent from a sender to a recipient, the public key (e.g., device public key 402) of the recipient (which is readily accessible to the sender) is used to encrypt the message. Once encrypted, the message is sent to the recipient and can only be decrypted using the recipient's private key (e.g., device private key 400). As private key 400 is maintained securely by the recipient, only the recipient can decrypt the encrypted message.

In addition to encrypting and decrypting messages, a sender may authenticate their identity by using their private key (e.g., device private key 400) to encrypt a digital certificate, which is then sent to a recipient (i.e., the person to which they are authenticating their identity). Accordingly, when the digital certificate is received by the recipient, the recipient can decrypt the encrypted digital certificate using the sender's public key (e.g., device public key 402), thus verifying that the digital certificate was encrypted using the sender's private key (e.g., device private key 400) and, therefore, verifying the identity of the sender.

DRM process 10 may generate a challenge 406, which is typically a random number generated by a random number generation process (not shown) included within personal media device 12. Once generated, challenge 406 is paired with device digital certificate 404 (which typically includes device public key 402), to form a license request 408. Device digital certificate 404, which may be referred to as a DRM digital certificate, may include additional information such as a device serial number (e.g., 137660523-1 from device serial number field 322, FIG. 9), for example.

As discussed above, proxy application 98 allows the owner of device 12 (e.g., user 14) to: configure device 12 for use with media distribution system 18; and configure media distribution system 18 for use with device 12. Typically, when proxy application 98 is configured on proxy computer 54, user 14 may be required to provide user credentials that identify the user (e.g., user 14) and define a valid subscription that would allow user 14, device 12, and proxy application 98 to access media distribution system 18. Alternatively or additionally, personal media device 12 may be configured to allow the user (e.g., user 14) to directly enter the user credentials (via device 12) when device 12 is initially configured.

DRM process 10 may provide license request 408 (via network 30 and/or network 32) to media distribution system 18. Additionally, if defined within personal media device 12, a user ID 410 (e.g., enumerating the user credentials described above) may also be included within license request 408. As discussed above, the user credentials (i.e., included within user ID 410) may include, but are not limited to, a user name, a user password, a user key, a device name, a device password, a device key, and/or one or more digital certificates. Prior to being provided to media distribution system 18, DRM process 10 may digitally sign license request 408 using device private key 400.

A digital signature is an electronic signature that uses the private key/public key encryption methodology (described above) and allows a sender of a message to authenticate their identity and the integrity of message sent. A digital signature may be used with both encrypted and non-encrypted messages and does not impede the ability of the receiver of the message to read the message.

For example, assume that DRM process 10 digitally signed license request 408 prior to providing license request 408 to media distribution system 18. When digitally signing license request 408, a mathematical function is typically performed on the content of license request 408. For example, a message hash of license request 408 may be calculated by personal media device 12, such that a message hash is the mathematical output of a known one-way hash function that transforms a string of characters (e.g., license request 408) into a usually shorter fixed-length value that represents the original string of characters. As the hashing function is a one-way mathematical function, once a message hash is generated, the original message cannot be retrieved by processing the message hash. DRM process 10 may then encrypt the message hash (using device private key 400) to create the digital signature (not shown). This digital signature may then be attached to license request 408. Accordingly, while the digital signature is encrypted, the original message (i.e., license request 408) need not be. Therefore, license request 408 may be processed by media distribution system 18 even if the digital signature is not processed.

Continuing with the above-stated example, license request 408 and the digital signature may be received by media distribution system 18, and media distribution system 18 may use the same hash function to generate a message hash of license request 408. Media distribution 408 will also decrypt the digital signature received from personal media device 12 using device public key 402 (included within device digital certificate 404) to recreate the message hash calculated by personal media device 12. Media distribution system 18 may then compare the decrypted digital signature to the message hash calculated by the media distribution system 18. If the message hashes match, the integrity of license request 408 and the identity of personal media device 12 are both validated.

Additionally, the integrity of device digital certificate 404 (and, therefore, device public key 402) may be verified when license request 408 is received from personal media device 12. Digital certificates are typically issued and digitally signed by e.g., certification authority 412 using CA private key 414. Accordingly, device digital certificate 404 may be verified by obtaining the CA public key 416 to verify the digital signature of device digital certificate 404.

Once challenge 406, device digital certificate 404, and user ID 410 (i.e., license request 408) are received by media distribution system 18, media distribution system 18 may access data store 418 to retrieve subscription information concerning user 14 (i.e., the user defined within user ID 410) and determine e.g., the date at which the current subscription of user 14 will expire. Data store 418 may be maintained on storage device 34 coupled to computer 28.

Assume, for illustrative purposes, that media distribution system 18 is configured to automatically bill each subscriber on the first of each month for the subscription fee for the upcoming month. Accordingly, on 1 Mar. 2005, user 14 will be billed for the cost of their March 2005 subscription. Therefore, if media distribution system 18 retrieves subscription information concerning user 14 on 6 Mar. 2005, the subscription information retrieved will indicate that user 14 has a valid subscription until 31 Mar. 2005.

Accordingly and continuing with the above-stated example, when license request 408 is received, media distribution system 18 may retrieve subscription information concerning user 14. In this example, the subscription information will indicate that user 14 is a valid subscriber (to media distribution system 18) through 31 Mar. 2005.

Media distribution system 18 may generate a timeout indicator 420, which indicates e.g., the user's subscription information and the expiration date of the user's current subscription. In this example, timeout indicator 420 will indicate e.g., that the subscription of user 14 will expire on 31 Mar. 2005. Media distribution system 18 may obtain user encryption key 422 (i.e., the encryption key for user 14) from data store 418. Media distribution system 18 may then encrypt user encryption key 422, using device public key 402, to generate encrypted user encryption key 422' (shown with a hash fill). Timeout indicator 420, challenge 406, device digital certificate 404 (including device public key 402), user ID 410, and encrypted user encryption key 422' may be combined (by media distribution system 18) to form device license 424.

Device license 418 may further include a system time indicator 426, which indicates the system time as defined by media distribution system 18. System time indicator 426 may be used to synchronize a system clock 194 (FIG. 3) included within personal media device 12 with a system clock 428 included within media distribution system 18.

Device license 424 may further include a licensing service (i.e., LS) digital certificate 430, which typically includes a licensing service (i.e., LS) public key 432.

Media distribution system 18 may digitally sign device license 424 using licensing service (i.e., LS) private key 434 (of media distribution system 18) and provide device license 424 to personal media device 12. Licensing system private key 434 may be stored on data store 418.

When device license 424 is received from media distribution system 18, DRM process 10 may verify the integrity of LS digital certificate 430 (and, therefore, LS public 432). As discussed above, digital certificates are typically issued and digitally signed by e.g., certification authority 412 using CA private key 414. Accordingly, LS digital certificate 430 may be verified by obtaining the CA public key 416 to verify the digital signature of LS digital certificate 430.

DRM process 10 may use LS public key 432 (included within LS digital certificate 430) to verify device license 424 (which was digitally signed using LS private key 434). DRM process 10 may additionally verify challenge value 406, device public key 402, and the device serial number (included within device digital certificate 404) to ensure that device license 424 is intended for personal media device 12. DRM process 10 may then decrypt, with device private key 400, encrypted user encryption key 422' (that was encrypted using device public key 402) to generate user encryption key 422 (which may be stored in non-volatile memory, examples of which include ROM 152 (FIG. 3) and/or storage device 66 (FIG. 3). User ID 410, user encryption key 422, and timeout indicator 420 may be saved on e.g., non-volatile memory, examples of which include ROM 152 (FIG. 3) and/or storage device 66 (FIG. 3), for use when personal media device 12 renders media content downloaded from media distribution system 18. Additionally, as will discussed below in greater detail, DRM process 10 may retain a copy of device license 424 for use when transferring media content between personal media device 12 and e.g., personal media device 40.

Obtaining Media Content:

As discussed above, once user 14 subscribes to media distribution system 18, user 14 may obtain from media distribution system 18 media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example.

Figure 13:
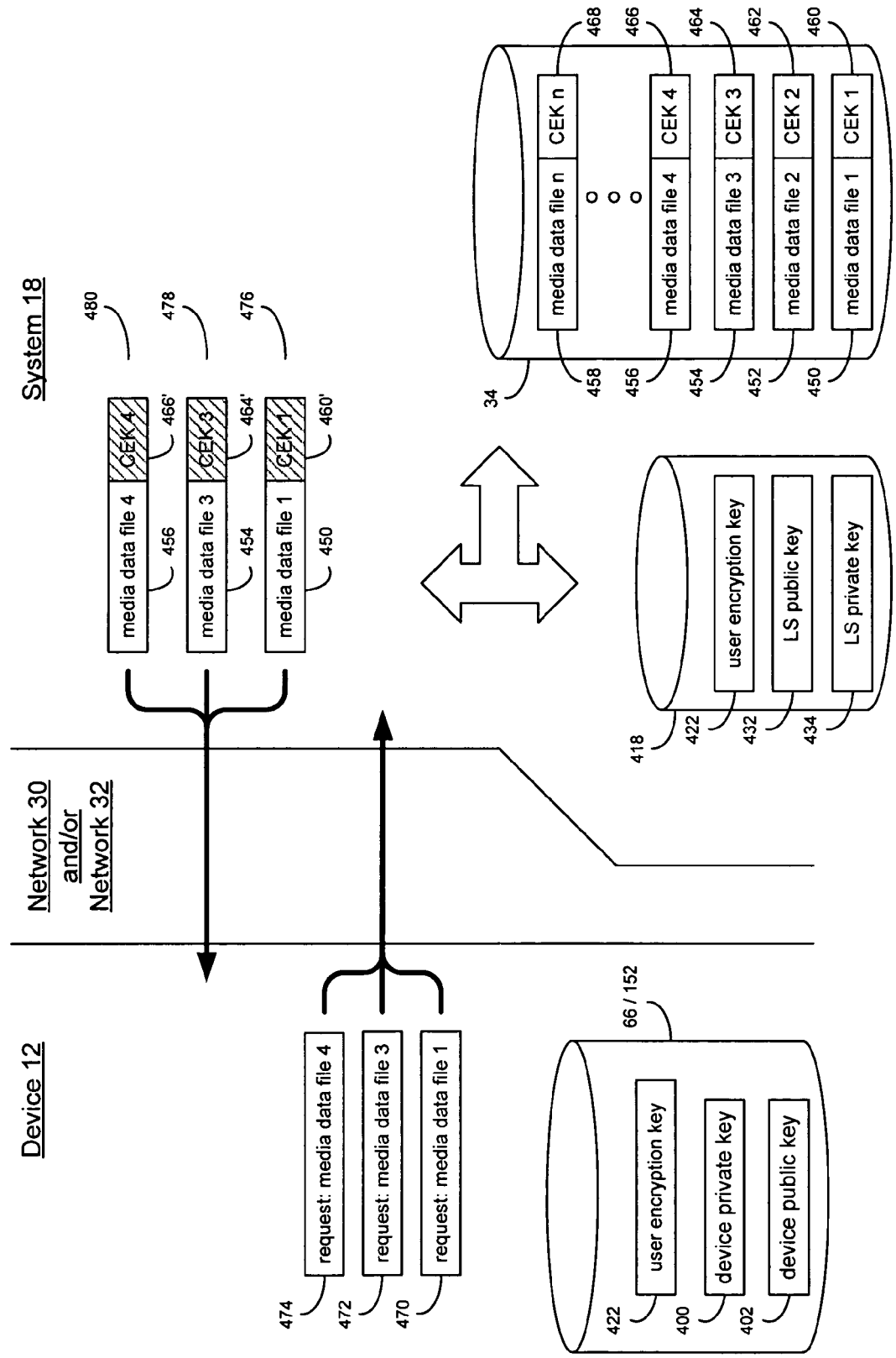
FIG. 13 is a diagrammatic view of the media distribution system, personal media device, and distributed computing network of FIG. 1.

Referring also to FIG. 13, each media data file 450, 452, 454, 456, 458 downloadable from media distribution system 18 may be encrypted using a unique CEK (i.e., content encryption key) 460, 462, 464, 466, 468 respectively. For example, if media distribution system 18 includes 1,000,000 media data files available for downloading to e.g., personal media device 12, media distribution system 18 will encrypt each media data file using a unique encryption key. Accordingly, for 1,000,000 media data files, 1,000,000 unique CEK's will be required, each of which is bound to the media data file to which the CEK is related. Accordingly, CEK 460 is bound to media data file 450, and CEK 462 is bound to media data file 452, for example.

Each CEK (e.g., keys 460, 462, 464, 466, 468) may be a symmetric encryption key, in that the key used to encrypt a media data file may also be used to decrypt the same media data file. Additionally, each media data file may be stored on e.g., storage device 34 attached to computer 28.

As discussed above, search window 304 (FIG. 10) of proxy application 98, may allow user 14 to search for media data files. Additionally, user 14 may download media data files from media distribution system 18 for use on personal media device 12 by selecting the download button 352 (FIG. 10) corresponding to the media data file to be downloaded.

Once the download of a media data file is initiated, personal media device 12 may submit the appropriate request(s) to media distribution system 18. For example, assume that user 14 wished to download three media data files, namely media data files 450, 454, 456. DRM process 10 would submit requests 470, 472, 474 respectively, each of which requests the desired file. For security and authentication purposes, requests 470, 472, 474 may be e.g., encrypted by personal media device 12 (using e.g., LS public key 432) and/or digitally signed by personal media device 12 (using e.g., device private key 400). Accordingly, if a request is encrypted (using e.g., LS public key 432), the encrypted request may subsequently be decrypted by media distribution system 18 using LS private key 434. Further, if a request is digitally signed (using e.g., device private key 400), the signed request may subsequently be verified by media distribution system 18 using device public key 402.

Once e.g., requests 470, 472, 474 are received and processed by media distribution system 18, media distribution system 18 may retrieve the requested media data files 450, 454, 456 from e.g., storage device 34. As discussed above, each media data file is currently encrypted using a unique CEK, such that the CEK is bound to the media data file.

Prior to being downloaded to personal media device 12, each media data file to be downloaded is bound to the user (e.g., user 14) who requested the download. As discussed above, during device initialization, personal media device 12 provides license request 408 to media distribution system 18. Media distribution system 18 in turn processes license 408 and obtains current subscription information concerning the user associated with license request 408 (e.g., user 14). As discussed above, this initialization process may occur periodically and, therefore, may occur at the time that personal media device 12 is placed into docking cradle 60 (FIG. 2). Accordingly and for this example, assume that personal media device 12 has provided the required user credentials to properly access media distribution system 18. As discussed above, the user credentials provided to media distribution system 18 may include, but are not limited to, a user name, a user password, a user key, a device name, a device password, a device key, and/or one or more digital certificates.

Once media distribution system 18 retrieves the requested media data files 450, 454, 456 from e.g., storage device 34, media distribution system 18 binds the retrieved media distribution files 450, 454, 456 to user 14 e.g., the user requesting the media data files, thus creating bound media data files 476, 478, 480. Accordingly, the content encryption key (e.g., CEK 460) associated with each media data file (e.g., media data file 450) is encrypted using the encryption key (e.g., user encryption key 422) of the user requesting the media data files (e.g., user 14). Accordingly, CEK 460 is encrypted to generate CEK 460', CEK 464 is encrypted to generate CEK 464', and CEK 466 is encrypted to generate CEK 466'. Once encrypted, bound media data files 476, 478, 480 (including encrypted CEK's 460', 464', 466' respectively) are provided to personal media device 12. As the CEK of each bound media data files 476, 478, 480 is encrypted using e.g., user encryption key 422, bound media data files 476, 478, 480 may only be processed (e.g., rendered) by a personal media device in possession of user encryption key 422. As discussed above, a copy of user encryption key 422 is stored on non-volatile memory within personal media device 12. Once bound media data files 476, 478, 480 are received by personal media device, they may be stored on e.g., storage device 66 within personal media device 12.

Media Content Playback:

As discussed above, user ID 410, user encryption key 422, and timeout indicator 420 may be saved for use when personal media device 12 renders media content downloaded from media distribution system 18.

Continuing with the above-stated example, if user 14 wishes to render one of bound media data files 476, 478, 480, user 14 may select the appropriate media data file via the controls (e.g., backward skip switch 78; forward skip switch 80; play/pause switch 82; menu switch 84; radio switch 86; and slider assembly 88, for example) and display panel 90 of personal media device 12. Once one or more media data files are selected for playback, the appropriate file(s) are retrieved from e.g., storage device 66. As discussed above, prior to each media data file being provided to personal media device 12, the CEK of each media data file may be encrypted (by media distribution system 18) using user encryption key 422. As discussed above, user encryption key 422 may be a symmetric encryption key and, therefore, the key used to e.g., encrypt CEK 460 may also be used to decrypt encrypted CEK 460'.

Once the appropriate bound media data files are retrieved from e.g., storage device 66, DRM process 10 may decrypt the appropriate CEK (using user encryption key 422) so that the media data file can be processed and rendered on personal media device 12. For example, if user 14 wished to render bound media data files 476, 478, personal media device 12 would decrypt encrypted CEK 460' to generate CEK 460. CEK 460 may then be used by DRM process 10 to decrypt media data file 450 for playback by personal media device 12. Further, DRM process 10 would decrypt encrypted CEK 464' to generate CEK 464. CEK 464 may then be used by DRM process 10 to decrypt media data file 454 for playback by personal media device 12.

Typically, prior to processing and rendering e.g., bound media data files 476, 478, DRM process 10 will verify that e.g., user 14 has sufficient rights to process and render the bound media data files.

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18.

Assuming that bound media data files 476, 478, 480 are subscription downloads (as opposed to purchased downloads that are licensed in perpetuity for use by user 14), prior to rendering and/or processing bound media data files 476, 478, 480, DRM process 10 may obtain timeout indicator 420, which as discussed above may be stored on e.g., non-volatile memory, examples of which include ROM 152 (FIG. 3) and/or storage device 66 (FIG. 3). DRM process 10 may then compare the expiration date (e.g., 31 Mar. 2005) defined within timeout indicator 420 to the date and/or time defined within system clock 194 to determine if e.g., user 14 is still allowed to render bound media data files 476, 478, 480. In this example, as user 14 has a valid subscription through 31 Mar. 2005 and the current date and time (as defined by system clock 194) is 17:53 GMT on 6 Mar. 2005, the subscription of user 14 (with respect to media distribution system 18) is valid and current. Accordingly, bound media data files 476, 478, 480 may be processed for playback.

Device-to-Device Media Content Transfer:

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18. Accordingly, since the rights associated with a subscription download are based upon the existence of a valid subscription with media distribution system 18, subscription downloads may be transferred from a first personal media device to a second media device, as long as a valid subscription exists concerning the second personal media device.

Figure 14:
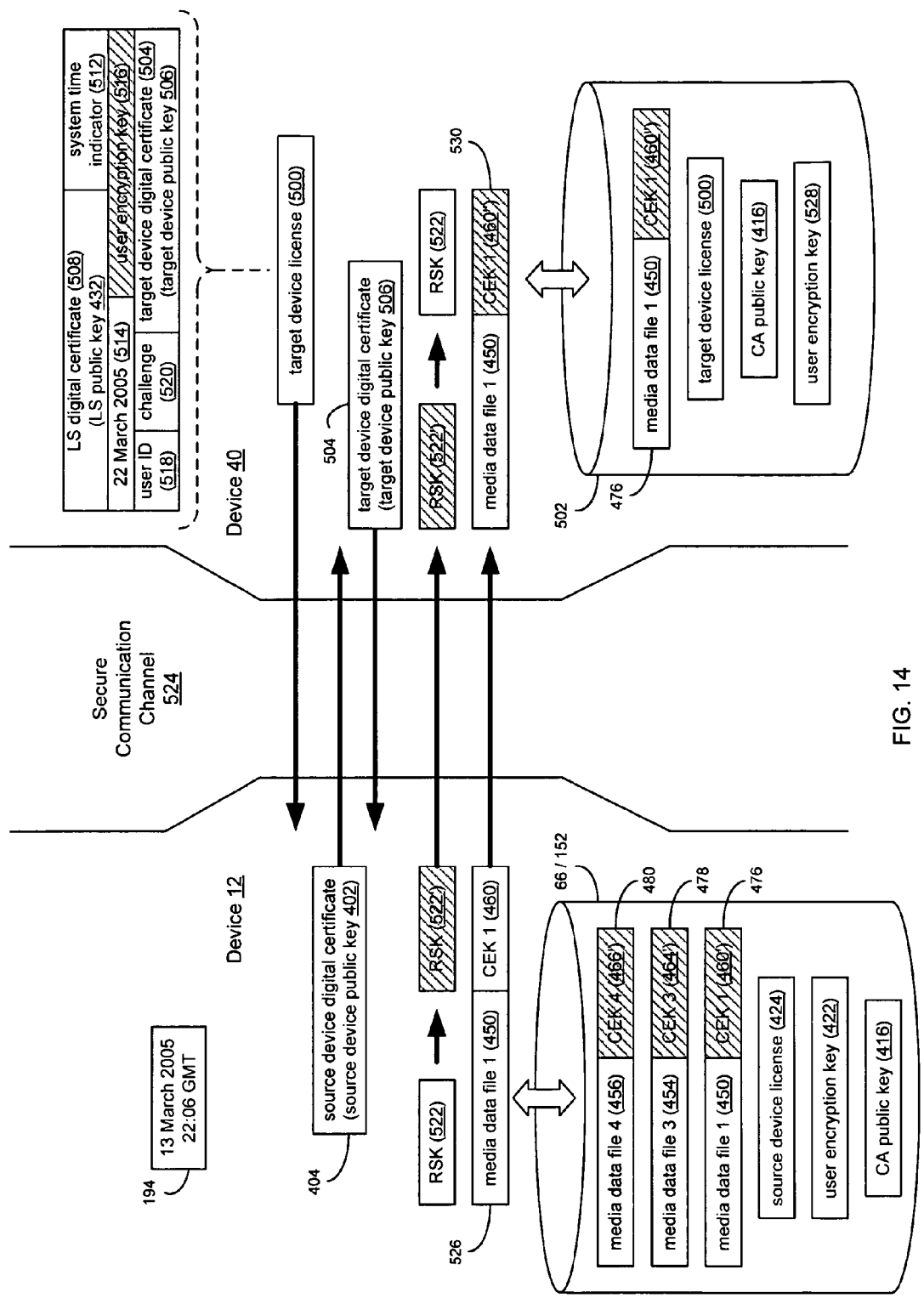
FIG. 14 is a diagrammatic view of the two personal media devices coupled to each other with a secure communication channel.

Referring also to FIG. 14 and continuing with the above-stated example, assume that user 14 has downloaded bound media data files 476, 478, 480 which are stored on e.g., storage device 66 within personal media device 12. Further, assume that user 26 wishes to obtain a copy of bound media data file 476 for playback on personal media device 40. As discussed above, when a device is initialized, a copy of a device license is transferred to and retained on the personal media device for use when transferring media content between personal media devices. Accordingly, personal media device 12 includes source device license 424 and personal media device 40 includes target device license 500.

Typically, a device-to-device content transfer is initiated by the user of the source device. In the above-stated example, personal media device 12 is the source device and personal media device 40 is the target device. Accordingly, user 14 may initiate the transfer of bound media data file 476 from personal media device 12 to personal media device 40.

Referring again to FIG. 2, if e.g., user 14 wishes to transfer a media data file to another personal media device, user 14 may depress menu switch 84, resulting in the generation of e.g., pop-up menu 106. Using slider assembly 88, user 14 may select the "Share Content" command 108 from pop-up menu 106, resulting in the generation of content window 110. From content window 110, user 14 may select the appropriate file for transfer. Assume that user 14 selects "Peggy Sue", which corresponds to bound media data file 476. Once user 14 selects the track for transfer, device application 64 may render a transfer window 112 that e.g., includes a track title field 114 that identifies the title of the track being transferred and an artist field 116 that identifies the artist of the track being transferred.

Transfer window 112 may include a transfer button 118 (selectable via slider assembly 88) for initiating the transfer of bound media data file 476 to e.g., personal media device 40. In this example, if user 14 selects transfer button 118 with slider assembly 88, the transfer of bound media data file 476 (i.e., "Peggy Sue" from "Buddy Holly") from personal media device 12 to (in this example) personal media device 40 is initiated. Transfer window 112 may include a transfer status indicator 120 for indicating the progress of the transfer of e.g., "Peggy Sue" by "Buddy Holly". Transfer window 112 may further include a cancel button 122 for allowing user 14 to cancel the file transfer and close download window 112.

Referring again to FIG. 14, once the transfer of bound media data file 476 is initiated, the devices may exchange device digital certificates for authentication purposes. For example, DRM process 10 may provide source device digital certificate 404 (which includes source device public key 402) to device personal media device 40 for authentication. As discussed above, the integrity of source device digital certificate 404 (and, therefore, source device public key 402) may be verified (by personal media device 40) via CA public key 416 (a copy of which is typically stored in non-volatile memory 502 of personal media device 40), as source device digital certificate 404 was issued and digitally signed by e.g., certification authority 412 (FIG. 12) using CA private key 414 (FIG. 12).

Further, personal media device 40 may provide target device digital certificate 504 (which includes target device public key 506) to device personal media device 12 for authentication. The integrity of target device digital certificate 504 (and, therefore, target device public key 506) may be verified by DRM process 10 via CA public key 416 (a copy of which is typically stored in non-volatile memory 66/152 of personal media device 12), as target device digital certificate 504 would typically also have been issued and digitally signed by e.g., certification authority 412 (FIG. 12) using CA private key 414 (FIG. 12).

As discussed above and as illustrated in FIG. 3, personal media devices (e.g., personal media device 12) may include a wireless interface 182 for wirelessly-coupling personal media device 12 to network 30 (or network 32) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device (such as personal media device 40). Accordingly, communication between personal media devices 12, 40 may occur wirelessly via RF communication and/or infrared communication. Additionally, an external connector (not shown) may be included within each personal media device that allows for the hardwired-interconnection of multiple personal media devices.

Once certificates 404 and 504 are verified, personal media device 40 provides target device license 500 to personal media device 12. As with device license 424 (FIG. 11), target device license 500 may include: LS digital certificate 508 (which includes LS public key 432), system time indicator 512, timeout indicator 514 (i.e., for the subscription of user 26), encrypted user encryption key 516 (i.e., for user 26), user ID 518 (i.e., for user 26), challenge 520, and target device digital certificate 502 (which includes a copy of target device public key 504).

Upon receiving target device license 500 from personal media device 40, DRM process 10 may verify the integrity of target device license 500. Accordingly, DRM process 10 may verify the integrity of LS digital certificate 508 (and, therefore, LS public key 432). As discussed above, digital certificates are typically issued and digitally signed by e.g., certification authority 412 (FIG. 12) using CA private key 414 (FIG. 12). Accordingly, LS digital certificate 508 may be verified by DRM process 10 using CA public key 416.

DRM process 10 may use LS public key 432 (included within LS digital certificate 508) to verify target device license 500 (which was digitally signed using LS private key 434 (FIG. 12)). DRM process 10 may additionally verify that user 26 has a valid subscription to media distribution system 18 by comparing timeout indicator 514 to system clock 194. For example, as user 26 has a valid subscription through 22 Mar. 2005 (as defined by timeout indicator 514) and the current date and time (as defined by system clock 194) is 22:06 GMT on 13 Mar. 2005, the subscription of user 26 (with respect to media distribution system 18) is valid and current.

Assuming that the integrity of target device license 500 is verified, the transfer of bound media data file 476 may begin. Depending on the manner in which DRM process 10 is configured, user 26 may be required to have a valid and current subscription (with media distribution system 18) prior to initiating the transfer of any media data files to personal media device 40. However and as discussed above, since the personal media device checks for the existence of a valid and current subscription prior to rendering media data files, even is the transfer was effectuated while user 26 did not have a valid and current subscription with media distribution system 18, user 26 would be prohibited from rendering the transferred media data files.

In order to effectuate the media data file transfer, DRM process 10 generates a random session key (i.e., RSK) 522, which is encrypted using target device public key 504 (included within target device digital certificate 504) to generate encrypted RSK 522'. DRM process 10 provides encrypted RSK 522' to personal media device 40, which is decrypted (using target device private key (not shown)) to retrieve RSK 522. RSK 522 may be a 1024-bit symmetric encryption key.

As personal media device 12 and personal media device 40 each contain a copy of RSK 522, a secure communication channel 524 may be established between devices 12, 40, in which all data transmitted across secure communication channel 524 is encrypted (using RSK 522) prior to transmission and decrypted (using RSK 522) upon receipt. Secure communication channel 524 may be a wireless communication channel (using e.g., RF communication and/or infrared communication), or a wired communication channel (using an external connector (not shown) on devices 12, 40).

DRM process 10 may retrieve (from e.g., storage device 66) bound media data file 476 for transmission to personal media device 40. However and as discussed above, as CEK 460' of bound media data file 476 was encrypted using the encryption key of user 12 (e.g., user encryption key 422), bound media data file 476 will not be accessible (in its current form) by user 26. Therefore, bound media data file 476 must be unbound from user 12 and bound to user 26. Accordingly, DRM process 10 obtains bound media data file 476 from e.g., storage device 66 and decrypts CEK 460' (using user encryption key 422) to obtain CEK 460. Unbound media data file 526 may be transferred (via secure communication channel 524) from personal media device 12 to personal media 40. Upon receipt, personal media device 40 may encrypt CEK 460 of unbound media data file 526, using the encryption key of user 26 (i.e., user encryption key 528) to generate bound media data file 530, which includes encrypted CEK 460". Personal media device 40 may store bound media data file 530 for subsequent rendering in non-volatile memory 502.

User encryption key 422 is described above as typically being a symmetric encryption key, in that the same key that is used to encrypt a CEK may also be used to decrypt the encrypted version of the CEK. Further and as described above, the same user encryption key 422 is used to encrypt all CEK's. Therefore, if one-hundred bound media data files are downloaded to and stored upon personal media device 12, the same user encryption key 422 may be used to decrypt each of the one-hundred encrypted CEKs. However, other configurations of user encryption key 422 are possible.

Figure 15:
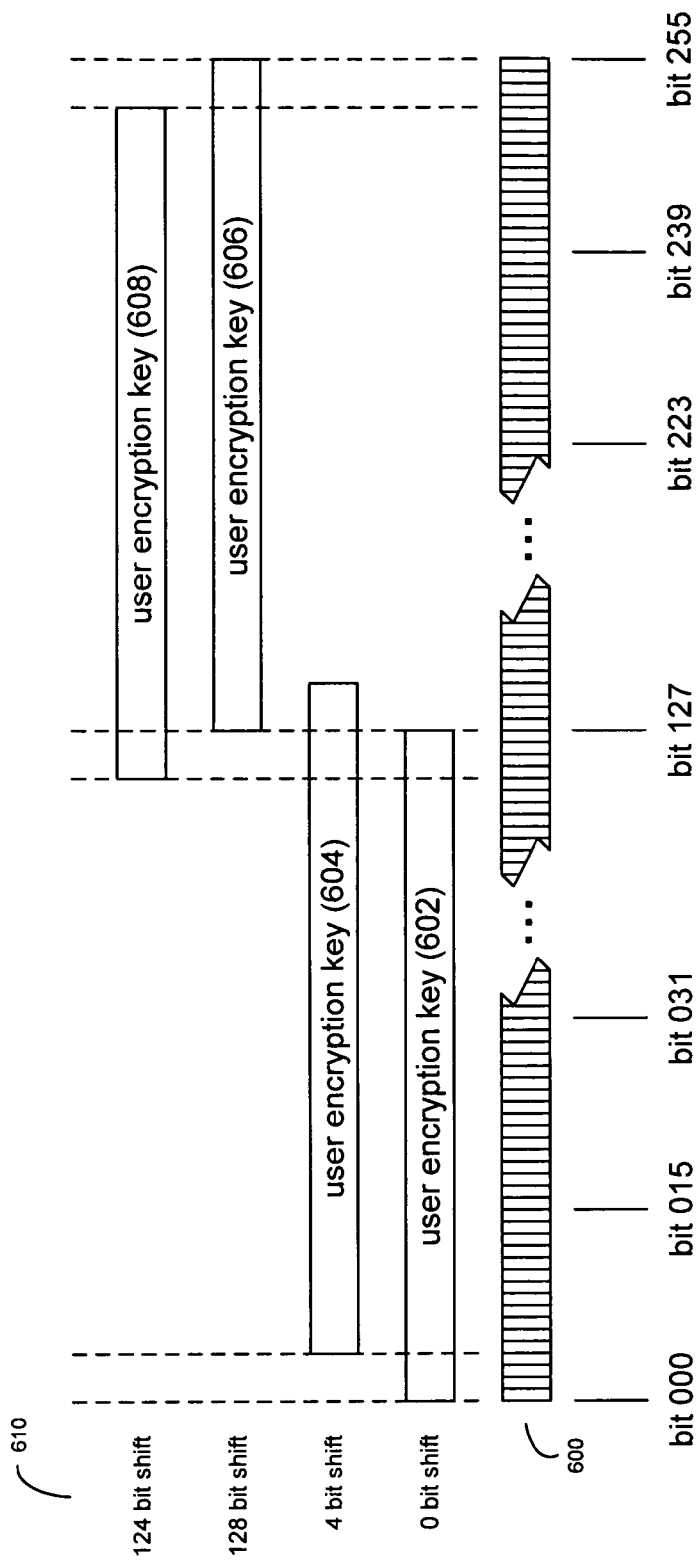
FIG. 15 is a diagrammatic view of an asymmetric key block.

For example, user encryption key 422 may be a symmetric key block, as opposed to a single symmetric key. Referring also to FIG. 15, there is shown a 32-byte (i.e., 256-bit) symmetric key block 600. Assume for this example that a 16-byte (i.e., 128-bit) key is used to encrypt and decrypt each encrypted CEK. Through the use of one e.g., 256-bit symmetric key block 600, multiple 128-bit symmetric keys (e.g., user encryption keys 602, 604, 606, 608 may be defined. For example, a first user encryption key 602 may be defined as bits 000-127 of symmetric key block 600. A second user encryption key 604 may be defined as bits 004-131 of symmetric key block 600. A third user encryption key 606 may be defined as bits 128-255 of symmetric key block 600. And a fourth user encryption key 608 may be defined as bits 124-251 of symmetric key block 600. Accordingly, a plurality of unique symmetric user encryption keys may be defined using a single symmetric key block 600. Accordingly, to properly define the individual user encryption keys, in this particular example, a bit shift parameter 610 is defined for each user encryption key 602, 604, 606, 608, which defines the starting point of the respective key. For example, user encryption key 602 starts at bit-0 of symmetric key block 600 and, therefore, has a bit shift 610 of 0-bits. As user encryption key 604 starts at bit-4 of symmetric key block 600, user encryption key 604 has a bit shift 610 of 4-bits. As user encryption key 606 starts at bit-128 of symmetric key block 600, user encryption key 606 has a bit shift 610 of 128-bits. As user encryption key 608 starts at bit-124 of symmetric key block 600, user encryption key 608 has a bit shift 610 of 124-bits.

While various user encryption keys are defined within symmetric key block 600 by shifting the starting point of each individual user encryption key, other configurations are possible. For example, keys may be defined using only odd or even bits in conjunction with a bit shift. Additionally and/or alternatively, keys may be defined within symmetric key block 600 algorithmically, in that an algorithm is used to define the individual bits used (within symmetric key block 600) to define a unique user encryption key.

Various systems and methods of using a personal media device are described below. Each of these systems and methods may be implemented on a personal media device 12 and in connection with a media distribution system 18, for example, as described above. The systems and methods may be implemented using one or more processes executed by personal media device 12, proxy computer 54 and/or server computer 28, for example, in the form of software, hardware, firmware or a combination thereof. Each of these systems and methods may be implemented independently of the other systems and methods described herein. As described above, personal media device 12 may include a dedicated personal media device (e.g., an MP3 player), a personal digital assistant (PDA), a cellular telephone, or other portable electronic device capable of rendering digital media data.

Figure 16:
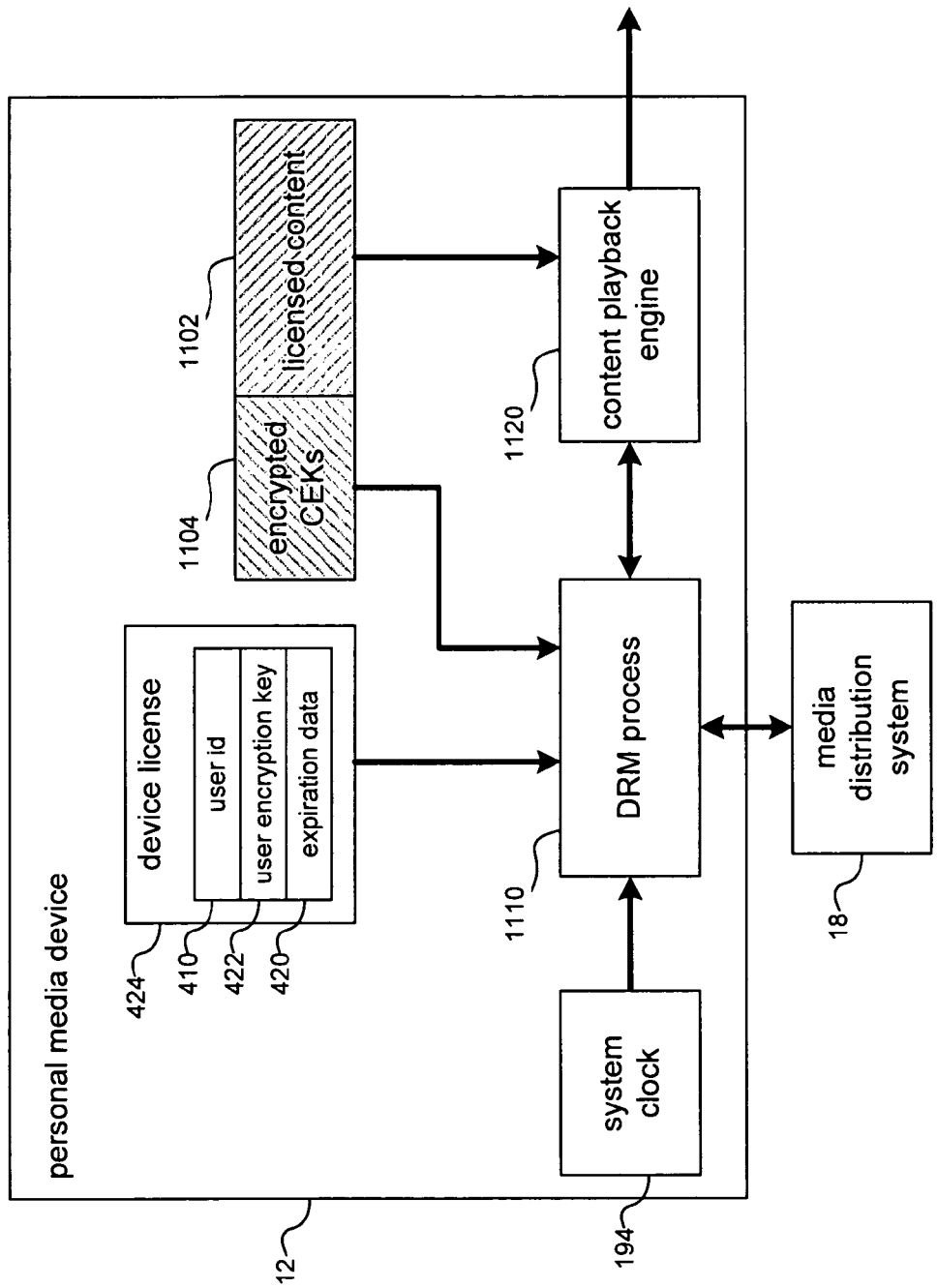
FIG. 16 is a diagrammatic view of a system for subscription based digital rights management (DRM) on a personal media device.
Figure 17:
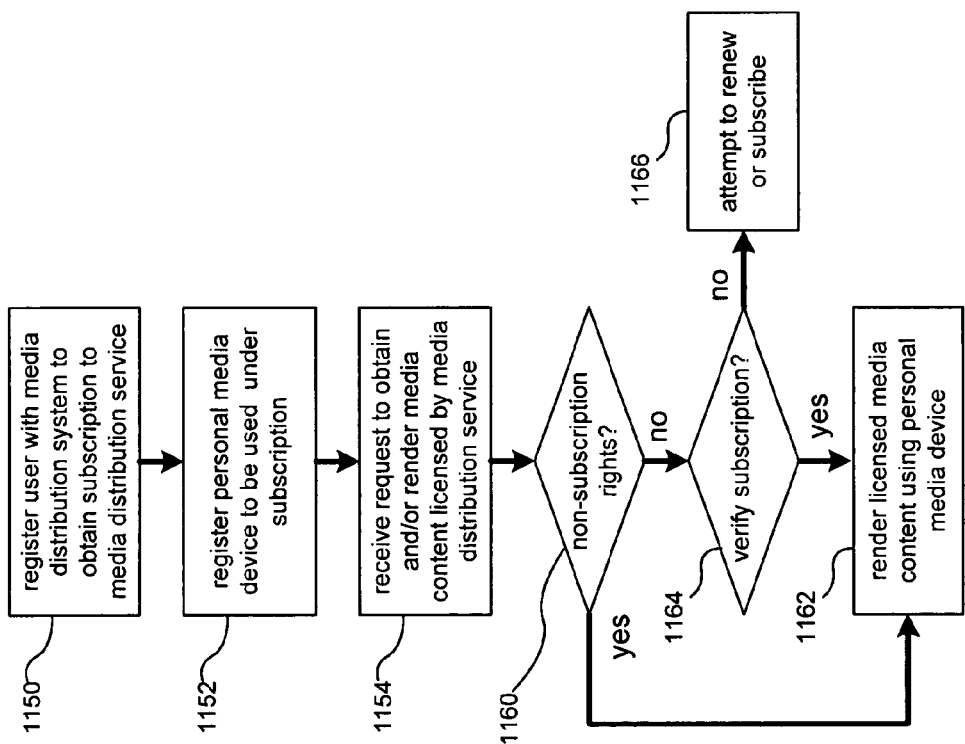
FIG. 17 is a flow chart illustrating a method of subscription based digital rights management on a personal media device.

Subscription-Based Digital Rights Management:

Referring to FIGS. 16 and 17, there is shown a system and method for providing subscription-based digital rights management (DRM) on personal media device 12. According to subscription-based DRM, personal media device 12 is licensed or registered to a user and content rights associated with licensed media content 1102 are bound to the user of personal media device 12 under a subscription to a media distribution system 18. Thus, a user is able to obtain and/or render licensed media content 1102 on personal media device 12 provided that personal media device 12 maintains a valid license under a user subscription.

Licensed media content 1102 may be provided as one or more media data files pre-loaded on, downloaded to, or transferred to personal media device 12. As described above, licensed media content 1102 may include media data files such as audio files (e.g., music), video files, audio/video files, and multimedia content. Licensed media content 1102 may be arranged and presented as individual media content items (e.g., musical tracks) that may be individually and selectively rendered (e.g., subscription content or purchased content) or as multiple content items (e.g., a series of musical tracks) that may only be played in a defined sequence in compliance with performance complement requirements and with limited or no user interaction (e.g., non-interactive content).

Media content 1102 licensed by media distribution system 18 may have different content rights associated with different media data files. Content rights may include, for example: non-subscription rights (e.g., purchased content rights) that allow content to be rendered and/or copied (e.g., burned to CD) by the licensed user indefinitely independent of a valid subscription; and subscription-based rights that allow content to be streamed, downloaded, rendered and/or transferred by the licensed user for a limited period of time under a valid subscription. Content rights associated with a particular media data file may be defined in a content license associated with the media data file (e.g., embedded in the media data file or in a separate content license database).

To protect licensed media content 1102, media data files may be encrypted with associated content encryption keys 1104. To bind the licensed content 1102 to a user, content encryption keys 1104 may be encrypted with user encryption key 422, for example, as described above. User encryption key 422 may be included in device license 424 with other "user credentials" such as user ID 410 and expiration data 420 (e.g., a timeout indicator) used to verify the user's subscription.

DRM process 1110 may be resident on and executed by personal media device 12 to perform the core functions and/or processes associated with digital rights management (e.g., as described above). Content playback engine 1120 may be resident on and executed by personal media device 12 to perform the core functions and/or processes associated with rendering media content such as processing media data files. Although content playback engine 1120 and DRM process 1110 are shown as separate functional components, DRM process 1110 may be incorporated within content playback engine 1120. DRM process 1110 and content playback engine 1120 may be components of device application 64 (FIG. 1), for example, as an embedded feature, software plug-in, or stand-alone application. The instruction sets and subroutines of DRM process 1110 and content playback engine 1120 may be executed by one or more processors (not shown) and one or more memory architectures (not shown) incorporated into personal media device 12.

An exemplary method of subscription-based DRM is illustrated in FIG. 17 and is described below. A user may be registered 1150 with media distribution system 18 to obtain a subscription to the media distribution system, for example, during the device initialization process (as described above). The user may also register 1150 to obtain the subscription before the device initialization process. Personal media device 12 may be registered 1152 with media distribution system 18 under the user subscription, for example, during the device initialization process (as described above). DRM process 1110 on personal media device 12, for example, may perform the core functions and/or processes associated with the user registration and/or device registration during device initialization. As a result of a user registration 1150 and device registration 1152, device license 424 may be generated and stored on personal media device 12.

During use, personal media device 12 may receive 1154 a request by the user to obtain and/or render licensed media content 1102 licensed by media distribution system 18. Upon receiving a request to obtain and/or render a content item, personal media device 12 may determine 1160 e.g., if the content rights associated with the corresponding media data file are non-subscription rights or subscription rights. DRM process 1110 and/or content playback engine 1120, for example, may access the content license associated with the media data file. If the content rights are non-subscription rights, personal media device 12 may obtain and/or render 1162 the media content regardless of the subscription status. DRM process 1110 and/or content playback engine 1120, for example, may retrieve, decrypt and process the media data file associated with the selected non-subscription content item without having to verify device license 424.

If the content rights are subscription rights, personal media device 12 may verify 1164 the subscription associated with the personal media device 12. DRM process 1110 on personal media device 12, for example, may access device license 424 to determine if the subscription is valid and may compare expiration data 420 to system clock 194 to determine if the content has expired. If the subscription cannot be verified (e.g., the content expired or the subscription is invalid or never existed), personal media device 12 may attempt to renew 1166 an existing subscription or initiate a new subscription. If the subscription can be verified, personal media device 12 may obtain and/or render 1162 the licensed media content item. DRM process 1110 and/or content playback engine 1120 on personal media device 12, for example, may retrieve, decrypt and process the media data file associated with the selected subscription content item.

Accordingly, a subscription-based DRM system and method allows a user to render media content under a user subscription on a licensed personal media device 12 without having to track content licenses associated with each media data file individually.

Figure 18:
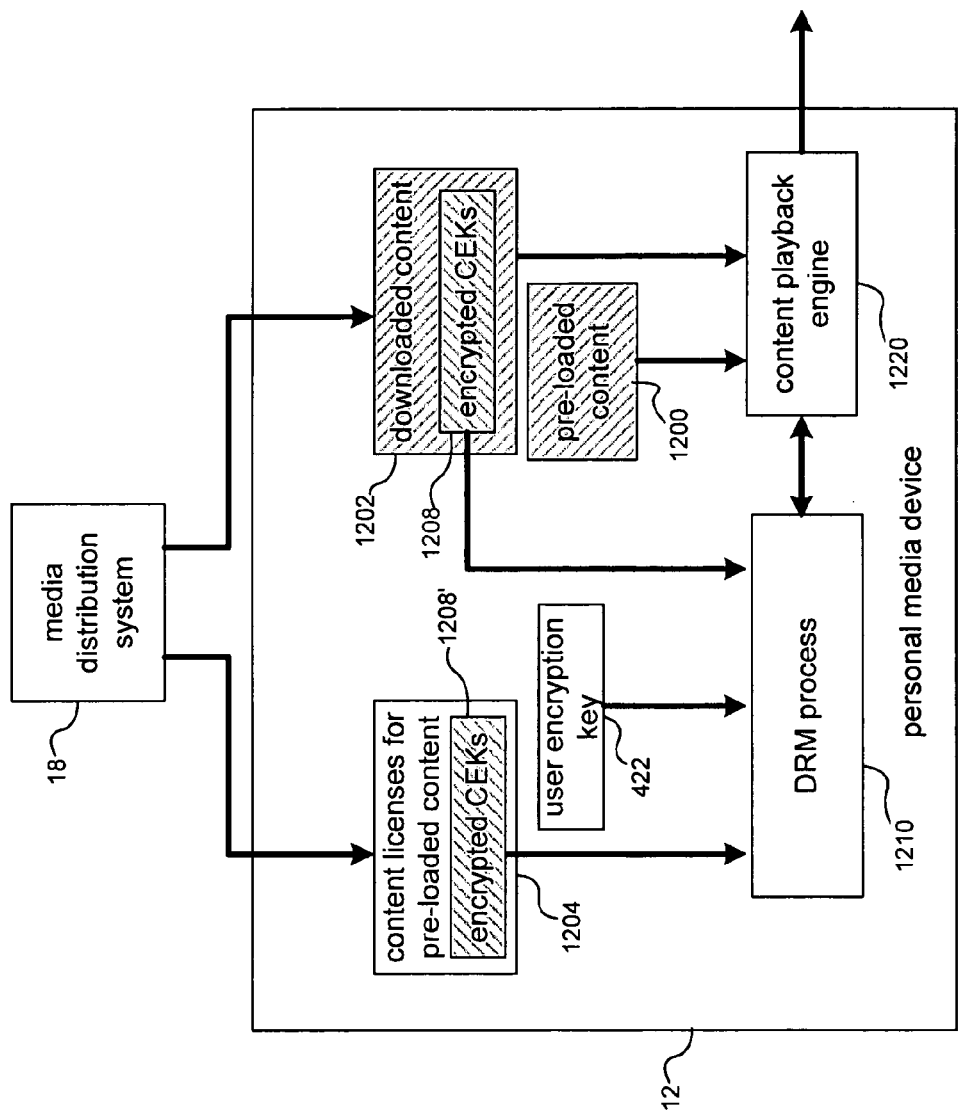
FIG. 18 is a diagrammatic view of a system for bulk licensing pre-loaded content on a personal media device.
Figure 20:
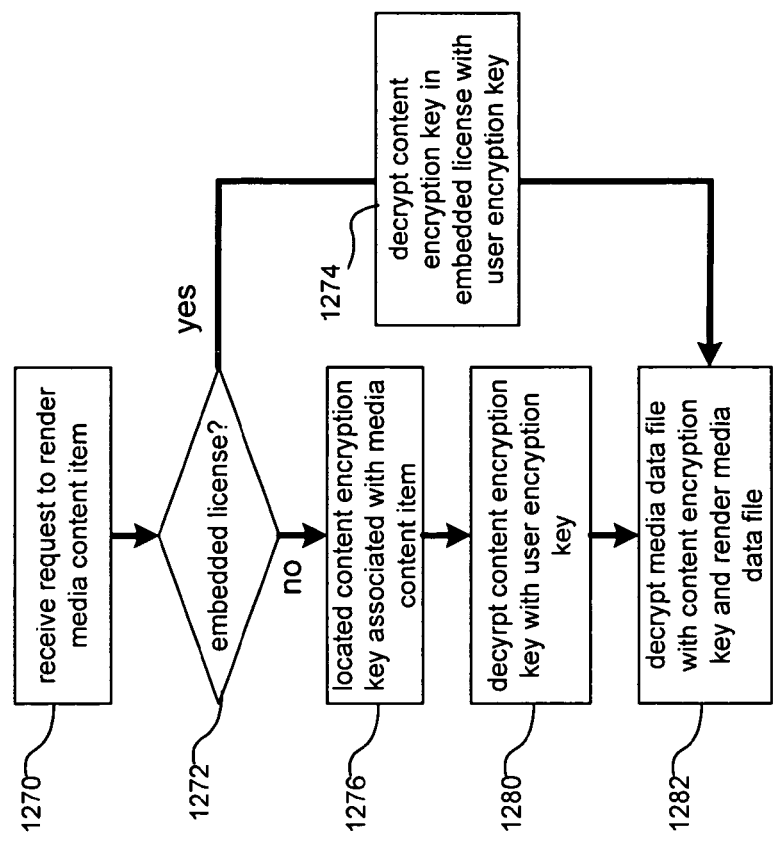
FIG. 20 is a flow chart illustrating a method of rendering pre-loaded content.
Figure 19:
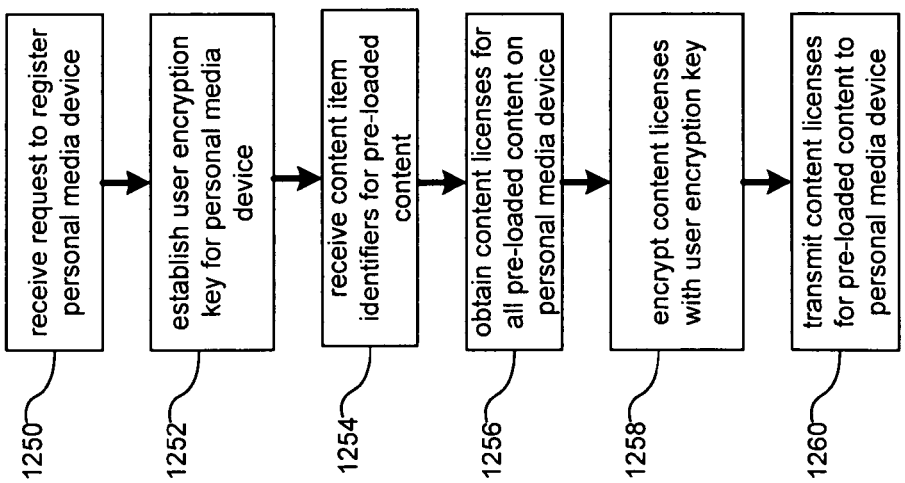
FIG. 19 is a flow chart illustrating a method of bulk licensing pre-loaded content.

Bulk Licensing Pre-Loaded Media Content:

Referring to FIGS. 18-20, there is shown a system and method for bulk licensing pre-loaded media content on a personal media device 12. Personal media device 12 may be pre-loaded with media content 1200 (e.g., on storage device 66 shown in FIG. 3), which may be licensed in bulk, for example, during device initialization. In general, pre-loaded content 1200 may be any content that is not downloaded to personal media device 12, for example, from media distribution system 18. Pre-loaded content 1200 may be pre-loaded by storing the content when personal media device 12 is manufactured, or may be pre-loaded by transferring the content from another storage medium provided with personal media device 12 (e.g., from a CD or DVD).

As described above, pre-loaded media content 1200 may include media data files such as audio files (e.g., music), video files, audio/video files, and multimedia content. Pre-loaded content 1200 may be arranged and presented as individual media content items (e.g., musical tracks) that may be individually and selectively rendered (e.g., subscription content) and/or as multiple content items that may only be rendered in a defined sequence in compliance with performance complement requirements and with limited or no user interaction (e.g., non-interactive content). Non-interactive content (also referred to as radio content), for example, may allow a user to start and stop rendering the sequence of content items and to skip a limited number of content items.

In one example, personal media device 12 may include about 5 to 10 gigabytes of pre-loaded content 1200 including content data for about 10 to 15 non-interactive content sequences (e.g., radio stations). Pre-loaded content 1200 may correspond to a particular type or category of media content to provide a "specialized" personal media device 12. For example, personal media device 12 may be pre-loaded with music of a particular genre, for example, to provide a Jazz personal media device or with music of a particular artist, for example, to provide an Elvis personal media device.

According to one embodiment, personal media device 12 renders media content if personal media device 12 is initialized and registered or licensed to a user, for example, under a user subscription to a media distribution system. Pre-loaded content 1200 may be pre-loaded before personal media device 12 is initialized and licensed to a user. In contrast, downloaded content 1202 may be downloaded to personal media device 12, for example, from media distribution system 18, after the user initializes and licenses the device. Thus, pre-loaded content 1200 may advantageously save download bandwidth. The personal media device 12 may also enable a limited time trial of pre-loaded content 1200 without having to subscribe to a media distribution system and download content 1202.

DRM process 1210 may be resident on and executed by personal media device 12 to perform the core functions and/or processes associated with digital rights management, for example, as described above. Content playback engine 1220 may be resident on and executed by personal media device 12 to perform the core functions or processes associated with rendering media content such as processing media data files. Although content playback engine 1220 and DRM process 1210 are shown as separate functional components, DRM process 1210 may be incorporated with content playback engine 1220. DRM process 1210 and content playback engine 1220 may be components of device application 64 (FIG. 1), for example, as an embedded feature, software plug-in, or stand-alone application. The instruction sets and subroutines of DRM process 1210 and content playback engine 1220 may be executed by one or more processors (not shown) and one or more memory architectures (not shown) incorporated into personal media device 12.

To prevent media content on personal media device 12 from being accessed or rendered without authorization, media content may be encrypted using content encryption keys (CEKs), as described above. Downloaded content 1202 may include embedded content licenses including CEKs 1208, which may used to decrypt the downloaded content 1202. Pre-loaded content 1200, on the other hand, may be pre-loaded without embedded content licenses and CEKs. Thus, the user initially may not render pre-loaded content 1200 on personal media device 12 because pre-loaded content 1200 is encrypted and the CEKs for decrypting the pre-loaded content 1200 are not pre-loaded. Content licenses 1204 including CEKs 1208' corresponding to the pre-loaded content 1210 may be downloaded in bulk, for example, when the personal media device 12 is activated. To bind media content to a subscriber or licensed user of personal media device 12, CEKs 1208, 1208' may be encrypted with user encryption key 422, for example, as described above. User encryption key 422 may then be used by the registered user or subscriber to decrypt CEKs 1208, 1208' needed to decrypt media content.

Individual media content items may be identified using content item identifiers, such as digital rights management (DRM) IDs used to uniquely identify content within media distribution system 18. In one embodiment, content licenses 1204 may be provided as a sorted or indexed database with content licenses 1204 indexed using content item identifiers corresponding to content item identifiers associated with content items in pre-loaded content 1200.

An exemplary method of bulk licensing pre-loaded content is illustrated in FIG. 19 and is described below. Personal media device 12 with pre-loaded content 1200 may establish communication with media distribution system 18, for example, to register and license personal media device 12 during the device initialization process described above. When communication is established, media distribution system 18 may receive 1250 a request to register and license personal media device 12 for use with media distribution system 18. Media distribution system 18 may then establish 1252 user encryption key 422 (in addition to other user credentials), for example, as described above.

As part of the process of registering and/or licensing personal media device 12, media distribution system 18 may receive 1254 an identification of pre-loaded content 1200 to be licensed. Personal media device 12, for example, may transmit to media distribution system 18 the content item identifiers corresponding to content items in pre-loaded content 1200. Media distribution system 18 may then obtain 1256 corresponding content licenses for pre-loaded content on personal media device 12. Media distribution system 18, for example, may generate a sorted or indexed pre-build database including content licenses 1204 (and CEKs 1208') associated with the content item identifiers provided by personal media device 12. Media distribution system 18 may encrypt CEKs 1208' in the content licenses 1204 with the user encryption key 422, for example, in the manner described above for encrypting CEKs embedded in downloaded content. Media distribution system 18 may then transmit 1260 to personal media device 12 the content licenses 1204 with encrypted CEKs 1208' for pre-loaded content 1200, which have been bound to user of personal media device 12.

An exemplary method of rendering pre-loaded content is illustrated in FIG. 20 and described below. When a request to render one or more media content items is received 1270, content playback engine 1220 may first attempt to access 1272 an embedded license, for example, in the header of the requested media data file. If the requested media data file includes an embedded license, a CEK in the embedded license may be decrypted 1274 with user encryption key 422. If the requested media data file does not include an embedded license, personal media device 12 may locate 1276 the CEK associated with the requested media data file and decrypt 1280 the associated CEK with user encryption key 422. DRM process 1210 and/or content playback engine 1220, for example, may use the content item identifier associated with the requested content item to locate the content license (and encrypted CEK) in a database of content licenses. Once the corresponding CEK is located and decrypted, the media content item may be decrypted 1282 with the CEK and the media data file may be rendered.

Accordingly, the system and method of bulk licensing enables pre-loaded content to be securely provided on a personal media device and then licensed to a user of the personal media device at a later time in an efficient manner.

Figure 21:
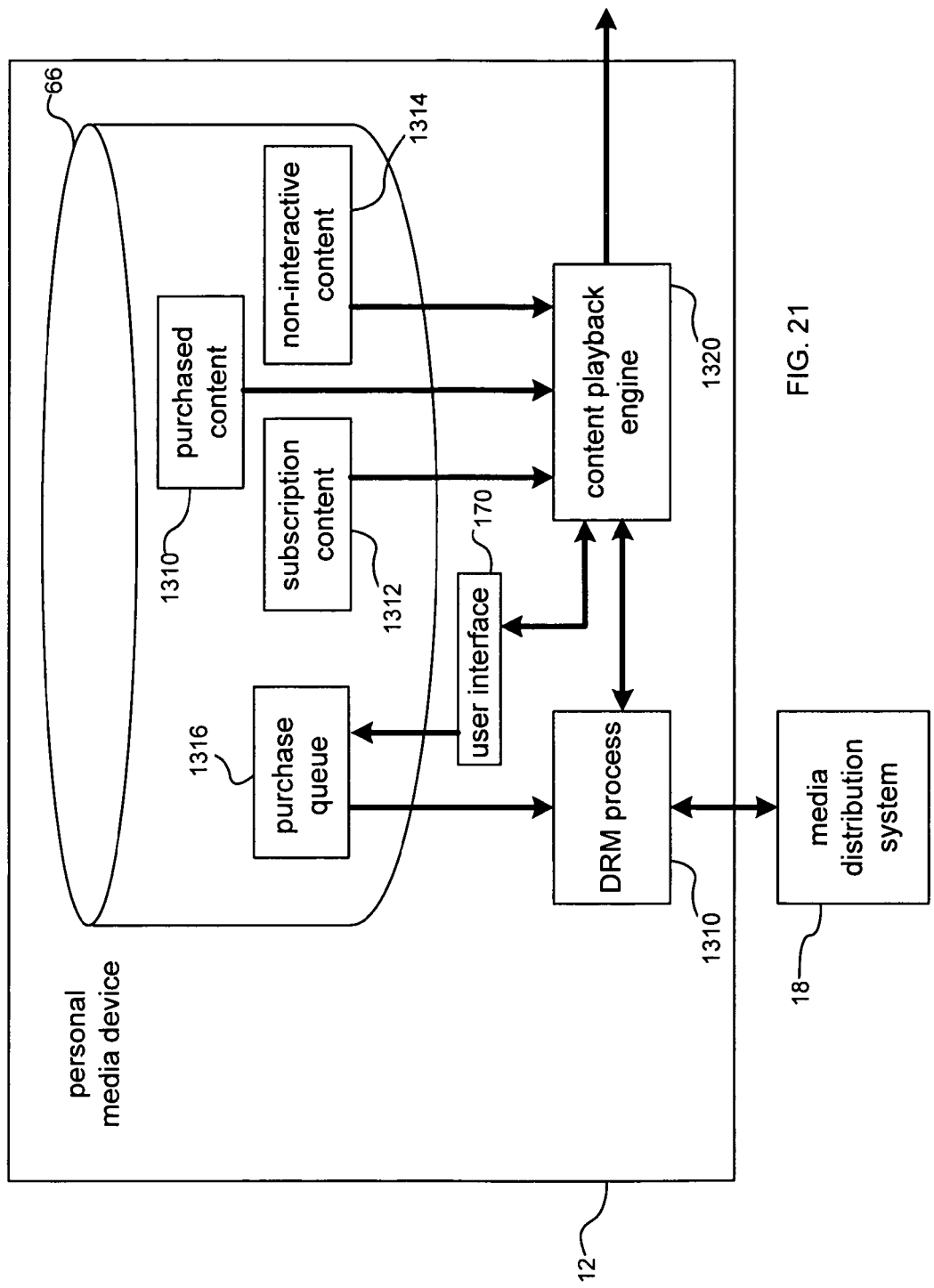
FIG. 21 is a diagrammatic view of a system for queuing media content items on a personal media device for future purchase.
Figures 22, 23:
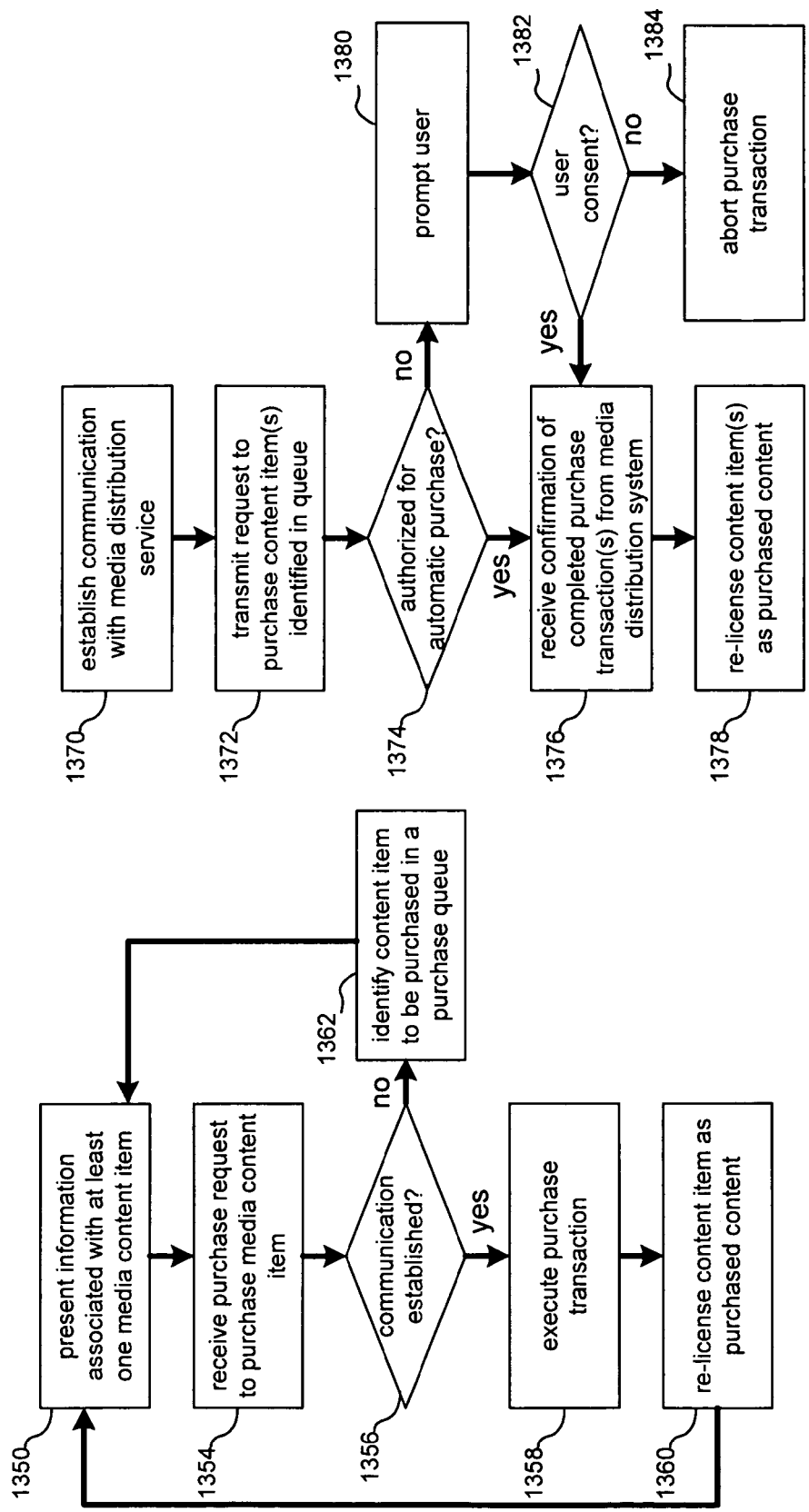
FIG. 22 is a flow chart illustrating a method of queuing media content items for future purchase.
FIG. 23 is a flow chart illustrating a method of purchasing media content items queued for future purchase.

Queuing Media Content for Future Purchase:

Referring to FIGS. 21-23, there is shown a system and method for queuing media content on personal media device 12 for future purchase from media distribution system 18. In general, when personal media device 12 is unable to complete a purchase transaction (e.g., when personal media device 12 is not communicating with media distribution system 18), media content may be queued for future purchase at a subsequent time when personal media device 12 is e.g., communicating with media distribution system 18.

Media content that may be queued for future purchase may include any media content purchasable from media distribution system 18. Media content may be identified in media distribution system 18 using a digital rights management (DRM) media content identifier. As described above, media content that may be purchased may include media data files such as audio files (e.g., music), video files, audio/video files, and multimedia content. Such media content may include subscription content 1312 stored on personal media device 12 and non-interactive content 1314 stored on personal media device 12. Subscription content 1312 may be arranged and presented as individual media content items that may be individually and selectively rendered. Non-interactive content 1314 may be arranged as multiple content items that may only be rendered in a defined sequence in compliance with performance complement requirements and with limited or no user interaction (e.g., radio content). Both subscription content 1312 and non-interactive content 1314 may only be rendered for a limited period of time under a valid subscription with media distribution system 18. In contrast, purchased media content 1310 may be rendered and/or transferred by the user indefinitely and independent of a subscription status.

Media content items to be purchased may also include media content items that are identified by personal media device 12 (e.g., in a playlist) but are not stored on personal media device 12. Content items to be purchased may further include content items that are not rendered by personal media device 12 (e.g., because there is no valid subscription).

DRM process 1310 may be resident on and executed by personal media device 12 to perform the core functions and/or processes associated with digital rights management (e.g., as described above). Content playback engine 1320 may be resident on and executed by personal media device 12 to perform the core functions and/or processes associated with rendering media content (e.g., processing media data files). Although content playback engine 1320 and DRM process 1310 are shown as separate functional components, DRM process 1310 may be incorporated with content playback engine 1320. DRM process 1310 and content playback engine 1320 may be components of device application 64 (FIG. 1) as e.g., an embedded feature, a software plug-in, or a stand-alone application. The instruction sets and subroutines of DRM process 1310 and content playback engine 1320 may be executed by one or more processors (not shown) and one or more memory architectures (not shown) incorporated into personal media device 12.

An exemplary method for queuing content items for future purchase is illustrated in FIG. 22 and described below. Personal media device 12 may present 1350 identifying information associated with one or more media content items. Personal media device 12 may present such identifying information, for example, when content playback engine 1320 renders the associated media data file. Alternatively, personal media device 12 may present such identifying information e.g., in a content library listing and/or a playlist including the associated media content item. Identifying information associated with the media content items may be obtained from media content metadata (not shown) stored on personal media device 12 and/or provided from media distribution system 18.

Personal media device 12 may receive 1354 a purchase request to purchase a media content item presented on personal media device 12. For example, user interface 170 (FIG. 3) may be used to enter the purchase request when the media content item is being rendered on personal media device 12. Alternatively, user interface 170 may be used to enter the purchase request for a media content item selected from a library listing and/or a playlist.

Upon receiving a purchase request, personal media device 12 may determine 1356 whether communication with media distribution system 18 is established. If communication is established, personal media device 12 and/or media distribution system 18 may execute 1358 a secure purchase transaction to complete the purchase of the selected media content item. A secure purchase transaction may be executed in accordance with techniques known to those skilled in the art.

If the purchased media content item is currently stored on personal media device 12 as either e.g., subscription content 1312 or non-interactive content 1314, the purchased media content item may then be re-licensed 1360 as purchased media content. DRM process 1310 on personal media device 12 may e.g., update and/or modify the content license associated with the purchased media content item (e.g., a content license embedded in the media data file or a content license in a separate content license database) to reflect the new status as purchased media content. If the purchased media content item is not currently stored on personal media device 12 (e.g., as either subscription content 1312 or non-interactive content 1314), the media data file for the purchased media content item may be downloaded from media distribution system 18 to personal media device 12 (e.g., as described above).

If communication is not active (e.g., personal media device 12 is not docked or communicating via WAP 52, FIG. 1), the content item selected for purchase (e.g., via user interface 170) may be identified 1362 in purchase queue 1316. In an exemplary embodiment, purchase queue 1316 may be implemented as a purchase queue log file stored on storage device 66 (FIG. 1) and DRM content item identifiers corresponding to the content items selected for purchase may be defined within the purchase queue log file. This purchase queue log file may be encrypted and/or authenticated to provide security for purchase transactions.

An exemplary method for automatically handling purchase transactions for content items queued for purchase is illustrated in FIG. 23 and is described below. Personal media device 12 may establish 1370 communication with media distribution system 18 after e.g., one or more media content items are identified in purchase queue 1316. For example, communication may be established whenever: personal media device 12 is docked and coupled to proxy computer 54; or personal media device 12 is located within range of WAP 52.

Upon establishing communication with media distribution system 18, personal media device 12 may transmit 1372 a queue purchase request to media distribution system 18 to purchase one or more media content items identified in purchase queue 1316. For example, DRM process 1310 on personal media device 12 may encrypt and/or authenticate (e.g., digitally sign) all or a portion of the above-described purchase queue log file (e.g., using encryption and/or authentication techniques such as those described above) to generate the above-described queue purchase request.

If the user is authorized 1374 for automatic purchase transactions from media distribution system 18, media distribution system 18 may process the queue purchase request and personal media device 12 may receive 1376 confirmation of completed purchase transactions. Authorization for automatic purchase may be indicated in user subscription data provided by the user (e.g., upon registering and/or modifying a subscription) and may be stored on personal media device 12 and/or media distribution system 18.

If the user is not authorized 1374 for automatic purchase transactions from media distribution system 18, the user may be prompted 1380 to provide consent 1382. If the user does not manually consent, the purchase transaction may be aborted 1384. When a purchase transaction is completed, the purchased content item may be re-licensed 1378 on personal media device 12 as purchased content 1310 (as opposed to subscription content 1312 or non-interactive content 1314). For example, DRM process 1310 on personal media device 12 may update and/or modify a content license associated with the purchased content item (e.g., a content license embedded within the media data file or a content license in a separate content license database) to reflect the new status as purchased content.

Accordingly, a user of a personal media device may request purchase of one or more media content items at any time during use of the personal media device, regardless of the communication status with media distribution system 18 or the status of the user's subscription.

Figure 24:
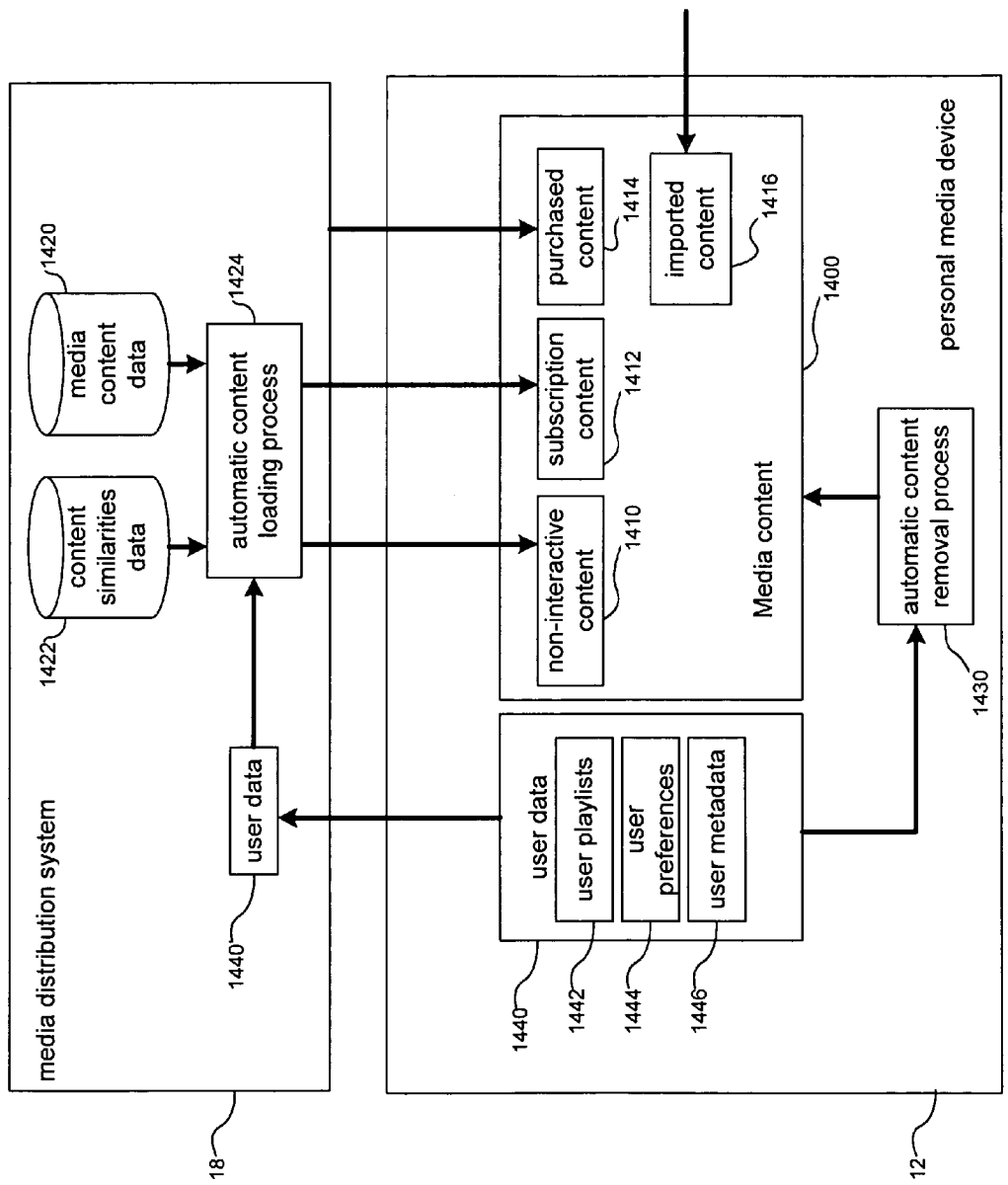
FIG. 24 is a diagrammatic view of a system for automatically managing media content on a personal media device.
Figure 26:
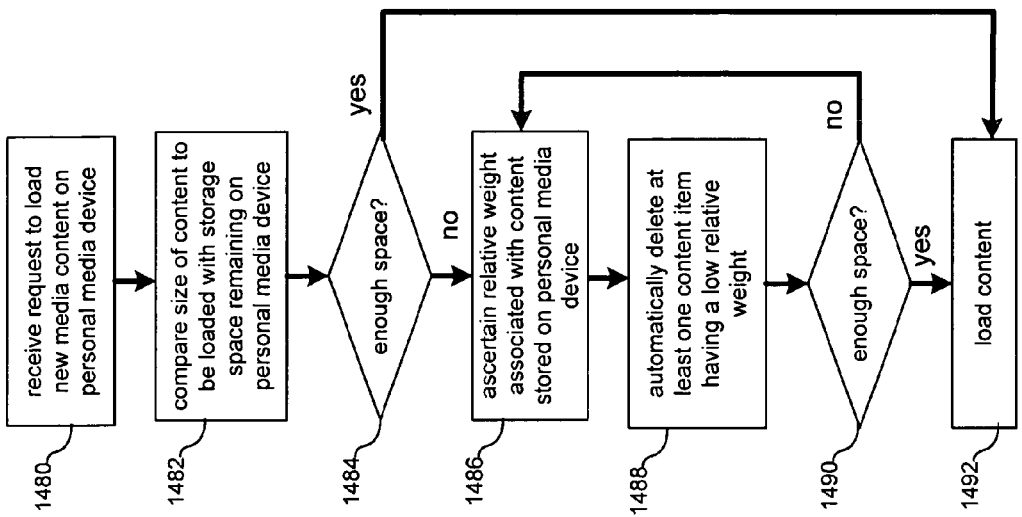
FIG. 26 is a flow chart illustrating a method of automatically removing media content.
Figure 25:
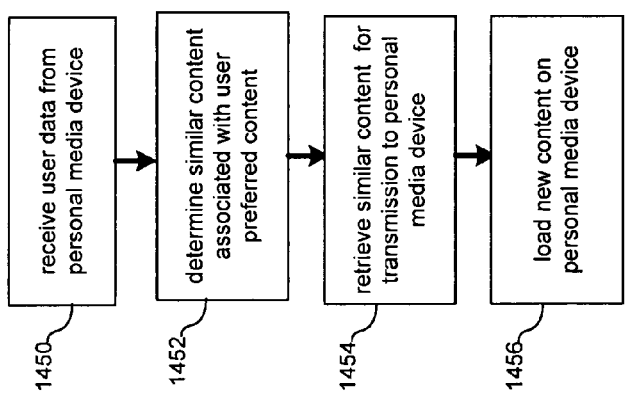
FIG. 25 is a flow chart illustrating a method of automatically loading media content.

Automatically Managing Media Content:

Referring to FIGS. 24-26, there is shown a system and method for automatically managing media content stored on personal media device 12. Media content 1400 may be automatically loaded onto personal media device 12 (e.g., on storage device 66, FIG. 1) and may be automatically removed/released from personal media device 12 to free up storage space for new media content to be loaded onto personal media device 12. Media content 1400 may include one or more media content items in the form of media data files (e.g., audio data files, video data files, audio/video data files, and multimedia data files) renderable on personal media device 12.

Media content 1400 stored on personal media device 12 may include: non-interactive media content 1410 including a plurality of media content items that may be rendered together in a defined sequence with little or no user interaction (e.g., radio content); subscription media content 1412 including individual media content items that may be selectively rendered as long as a user has a valid subscription; purchased media content 1414 including individual media content items purchased from e.g., media distribution system 18 to be rendered by the purchasing user without restrictions; and imported media content 1416 including media content items imported from another source (e.g., ripped from a CD).

As used herein, non-interactive is intended to mean not allowing a user to request a particular media content item for rendering. For example, non-interactive media content 1410 may include a plurality of media content items selected and arranged randomly (or pseudo-randomly) for rendering to a user (e.g., as a radio station). Non-interactive media content playback may allow some level of user control over playback. For example, a user may start and stop the playback and/or skip media content items within certain restrictions, as described in greater detail in U.S. Provisional Patent Application Ser. No. 60/705,764, entitled "Systems and Methods for Presenting Media Content", filed 5 Aug. 2005 and fully incorporated herein by reference. Non-interactive content may also allow some level of user input as to the nature of the content. For example, during non-interactive music content playback, a user may suggest a musical artist or a genre of music, which may form the basis for randomly (or pseudo-randomly) selecting media content items for playback.

Non-interactive media content 1410, subscription media content 1412, purchased media content 1414, and imported media content 1416 may be loaded onto personal media device 12 at the request of a user (i.e., user added media content). Further, non-interactive media content 1410 and subscription media content 1412 may also be automatically loaded onto personal media device 12 without being requested by a user (i.e., automatic media content). Automatic media content may be pre-loaded onto personal media device 12 before the user activates/initializes personal media device 12 or may be automatically loaded onto personal media device 12 after initialization e.g., based on user preferences, user activity and user ratings. Information associated with media content 1400 (e.g., whether media content was added by a user or added automatically) may be stored on personal media device 12 e.g., as metadata associated with media data files.

Personal media device 12 may also include user data 1440 associated with a user of personal media device 12, such as user playlists 1442, user preferences 1444, and user metadata 1446. User playlists 1442 may include a list of media content items (e.g., musical tracks) selected by the user to be rendered in sequence. User preferences 1444 may define the preferences of a user with respect to media content in general (as opposed to a specific media content item). User preferences 1444 may be based on user selections and/or recent listening activity and may include favorite genres, favorite artists, and favorite radio stations, for example. User metadata 1446 may include user activity data (e.g., play count, date added, last played) and user ratings associated with one or more of the media content items stored on personal media device 12.

Automatic content loading process 1424 may be resident on and executed by computer 28 and/or proxy computer 54. Automatic content loading process 1424 may associate other media content with media content preferred by the user of personal media device 12 and may load the associated content automatically. Automatic content loading process 1424 may be a component of media distribution system 18 or proxy application 98 (FIG. 1), for example, as an embedded feature, software plug-in, or stand-alone application. The instruction sets and subroutines of automatic content loading process 1424 may be executed by one or more processors (not shown) and one or more memory architectures (not shown) incorporated into computer 28 and/or proxy computer 54.

Automatic content removal process 1430 may be resident on and executed by personal media device 12 to perform the core functions and/or processes associated with the automatic removal of content based on the relative weighting of the content. Automatic content removal process 1430 may be a component of device application 64 (FIG. 1) as e.g., an embedded feature, a software plug-in, or a stand-alone application. The instruction sets and subroutines of automatic content removal process 1430 may be executed by one or more processors (not shown) and one or more memory architectures (not shown) incorporated into personal media device 12.

An exemplary method of automatically adding media content to personal media device 12 is illustrated in FIG. 25 and described below. Media distribution system 18 may receive 1450 user data 1440' from personal media device 12. User data 1440' may be provided from personal media device 12 to media distribution system 18 via e.g., proxy computer 54 (when personal media device 12 is docked) or WAP 52 (FIG. 1). Media distribution system 18 may also include content similarities data 1422 defining relationships or associations between various media content items. For example, in media distribution system 18, content similarities data 1422 may associate similar musical artists by defining, for each musical artist, artists who are influences, contemporaries or followers.

Based on user data 1440' and content similarities data 1422, media distribution system 18 may determine 1452 similar content associated with content preferred by the user. Automatic content loading process 1424 of media distribution system 18 may e.g., retrieve user data 1440' representing content preferred by the user (of personal media device 18) and may derive associations with other content from content similarities data 1422. If user data 1440' indicates that the user has rated certain media content items (e.g., musical tracks) highly, for example, automatic content loading process 1424 may determine (using content similarities data 1422) the artists associated with those highly rated media content items and may retrieve media content items from those associated artists (e.g., influences, contemporaries and followers). If user data 1440' indicates a favorite artist and/or genre, automatic content loading process 1424 may retrieve similar artists from that genre using content similarities data 1422.

Similar media content data 1420 may be retrieved 1454 for transmission to personal media device 12 and may be automatically loaded 1456 onto personal media device 12. Once user data 1440' is sent to media distribution system 18, the process of determining and retrieving similar content may occur while personal media device 12 is offline (i.e., not in communication with media distribution system 18). Media distribution system 18 may communicate with proxy computer 54, for example, and transmit similar content to proxy computer 54 for loading onto personal media device 12 during e.g., the next communication session.

Media content data 1420 may be automatically loaded as subscription media content or as non-interactive media content. Non-interactive media content 1410 may be constructed and loaded, for example, on proxy computer 54. Non-interactive media content 1410 may also be constructed automatically based on content similarities data 1422.

Media content may be automatically loaded or added to personal media device 12 until personal media device 12 reaches a predetermined storage limit. The predetermined storage limit may be less than the maximum storage capacity of personal media device 12, thus allow some additional storage space on personal media device 12 for user added media content (or other data). Alternatively, the predetermined storage limit may be set equal to the available space on e.g., storage device 66. If the predetermined storage limit has been reached, personal media device 12 may also attempt to automatically remove media content, as described below.

An exemplary method of automatically removing or releasing media content from personal media device 12 is illustrated in FIG. 26 and described below. When personal media device 12 receives 1480 a request to load new media content, personal media device 12 may compare 1482 the size of the new media content with the storage space remaining on personal media device 12 to determine 1484 if personal media device 12 has sufficient storage space. As discussed above, this determination may be made by e.g., determining if a predetermined storage limit has been reached or determining if there is physically enough storage space available to load the new media content. Media content may be added to personal media device 12 from media distribution system 18, from non-interactive media content 1410, from subscription media content 1412, from purchased media content 1414, from client computer 54 (e.g., as imported media content 1416), or from another personal media device (e.g., as "shared" subscription media content 1412), for example.

If personal media device 12 determines 1484 that enough space is available, the new media content may be loaded 1492 (e.g., by storing the content on storage device 66 shown in FIG. 3). If personal media device 12 determines that there is insufficient space for the new media content, personal media device 12 may ascertain (e.g., evaluate and/or determine) 1486 the relative weight associated with one or more media content items currently stored on personal media device 12.

The relative weight of a media content item generally corresponds to a likelihood that the media content item will be rendered on personal media device 12 when compared to the other media content items on personal media device 12. Automatic content removal process 1430 on personal media device 12 may e.g., evaluate media content items (to determine their relative weights) by examining user metadata 1446, user preferences 1444 and user playlists 1442 and may apply a series of algorithms to determine which media content item has a low relative weight.

Concerning the algorithms applied, automatic content removal process 1430 may consider e.g., whether a media content item was added by the user, rated by the user, played by the user, or associated with content rated or played by the user. In an exemplary embodiment, a media content item that was automatically added (e.g., non-interactive content 1410 or subscription content 1412), that has not been played or rated by the user, and is not associated with content played or rated by the user may be weighted lower. On the other hand, a user added media content item (especially, for example, purchased media content 1414 and imported media content 1416) may be weighted higher.

Automatic content removal process 1430 may also consider whether a media content item can no longer be rendered on personal media device 12 because e.g., the media content item has expired. For example, non-interactive media content 1410 may only be rendered once because of performance complement restrictions required by the Digital Millennium Copyright Act ("DMCA"). Accordingly, non-interactive media content items that have already been rendered may also be weighted lower.

When ascertaining the relative weight of automatic media content that has been played and/or rated by the user, automatic content removal process 1430 may become increasingly complex. If automatic content removal process 1430 must choose between automatic media content associated with e.g., two different artists, automatic content removal process 1430 may look to other factors such as user data 1440. If media content items have been played by a user but not rated, for example, automatic content removal process 1430 may determine which media content items have the lower weight by ascertaining which media content items have been played less frequently and/or which media content items are not associated with preferred artists or genres. In one embodiment, user added media content items may not be automatically removed, although it may be possible to automatically remove user added content, for example, by looking to user data (e.g., user ratings and preferences).

Automatic content removal process 1430 may automatically delete 1488 one or more media content items having a comparatively low relative weight. For example, automatic content removal process 1430 (on personal media device 12) may delete media data associated with media content item(s) identified as having a low relative weight. If personal media device 12 determines 1490 that sufficient space is still not available, the process of ascertaining 1486 relative weights and automatically deleting 1488 may be repeated. When sufficient storage space is available, the new media content items may be loaded 1492.

Accordingly, the system and method for automatically managing media content on personal media device 12 intelligently loads content appropriate for the user of personal media device 12 and intelligently releases content to make room for new content.

Figure 27:
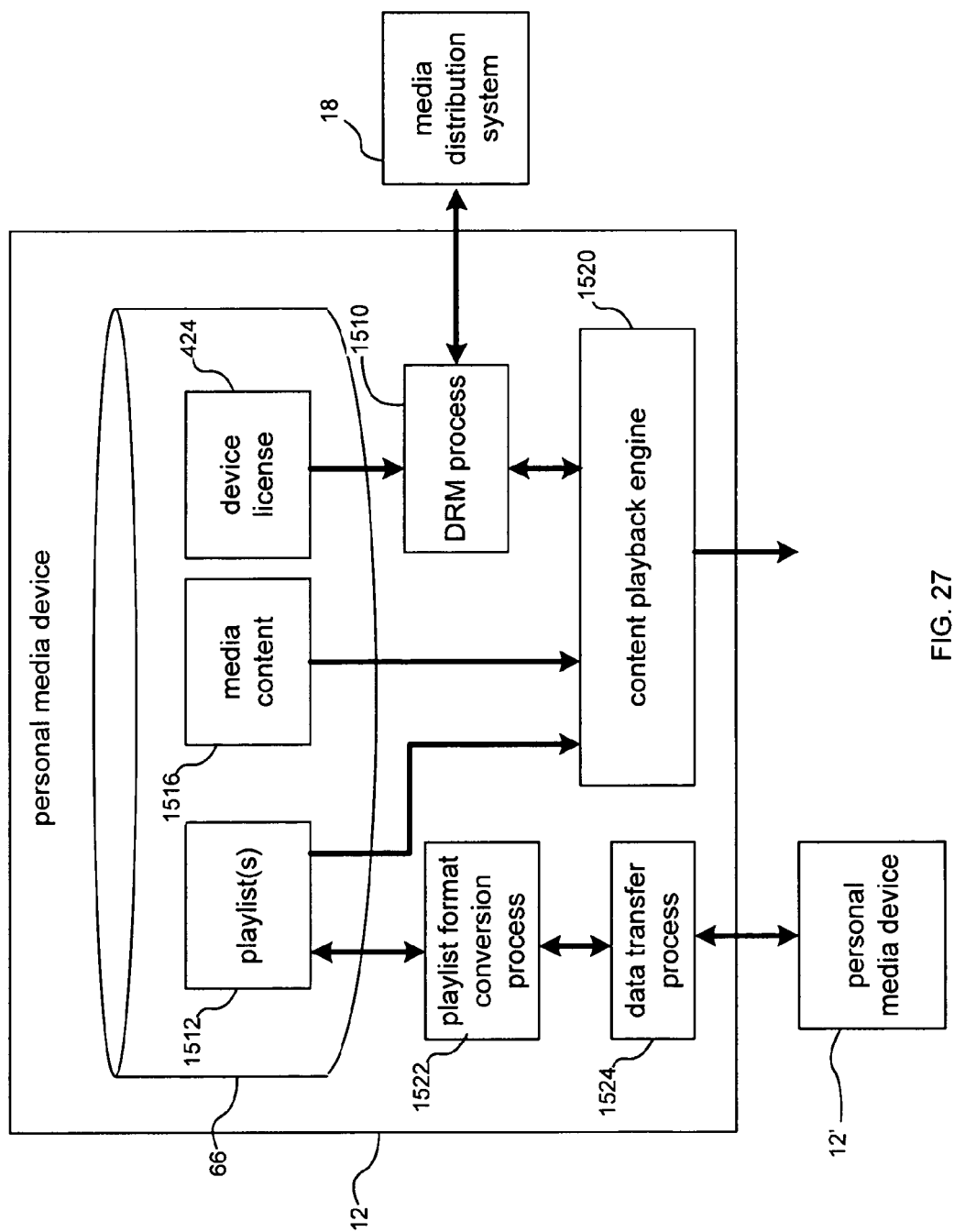
FIG. 27 is a diagrammatic view of a system for transferring playlists between personal media devices.
Figure 29:
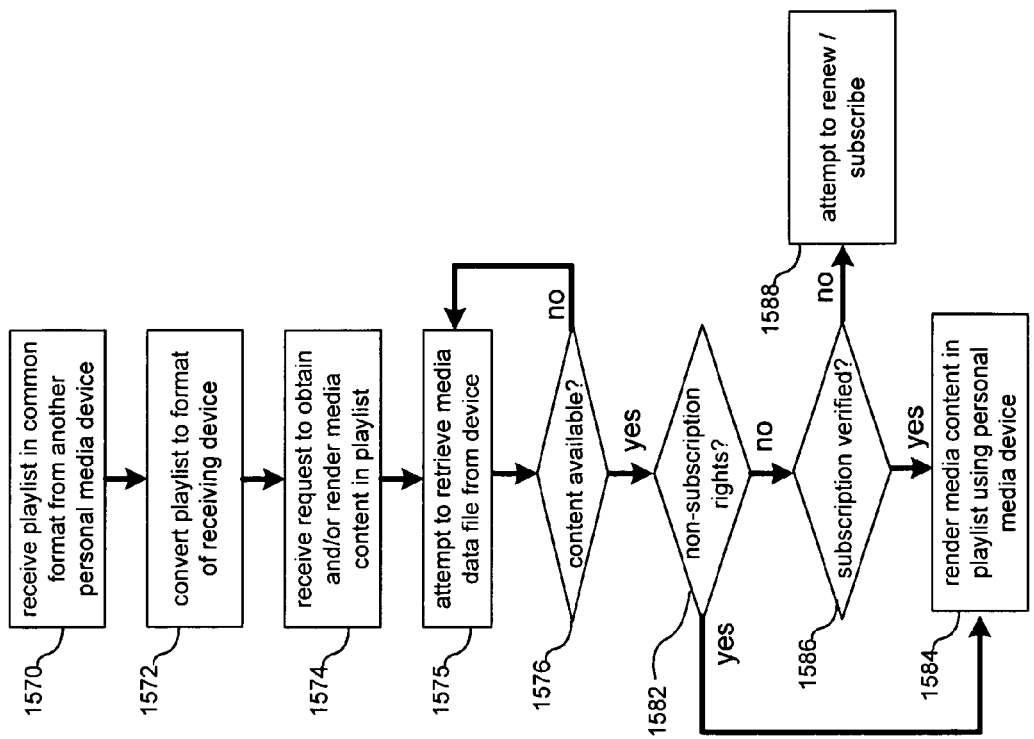
FIG. 29 is a flow chart illustrating a method of processing playlists transferred between personal media devices.
Figure 28:
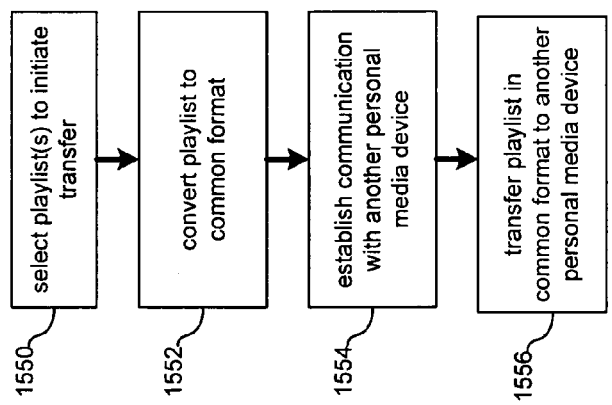
FIG. 28 is a flow chart illustrating a method of transferring playlists between personal media devices.

Transferring Media Content Playlists:

Referring to FIGS. 27-29, there is shown a system and method for transferring media content playlists between personal media devices 12, 12'. Playlists 1512 may be shared between personal media devices 12, 12' independent of the architectures, operating systems, and subscription status of the personal media devices 12, 12'. For example, a playlist generated on personal media device 12 that is used in connection with a first media distribution system (e.g., a media player used with the Rhapsody™ service) may be transferred to personal media device 12' that is used in connection with a second media distribution system (e.g., an iPod™ player used with the iTunes™ service).

Playlists 1512 may include a list of media content items (e.g., musical tracks and/or videos) presented to a user for rendering in sequence by e.g., personal media device 12. Media content items may be identified in playlists 1512 using identifying information associated with the media content items, such as track titles, artist names, various metadata, and/or content item identifiers used by a media distribution system to identify the media content items. Media content items identified in playlists 1512 may include media content 1516 (e.g., media data files) stored on personal media device 12 and/or media content (not shown) stored on media distribution system 18. Playlists 1512 may also identify media content items stored on neither personal media device 12 nor media distribution system 18 (e.g., local media content stored on proxy computer 54, FIG. 1 or on a different personal media device 12').

Playlists 1512 may be generated by a user, for example, by selecting each of the media content items (e.g., tracks) for inclusion in the playlist or by saving a media history file generated while rendering a series of media content items. Playlists 1512 may also be generated automatically (also referred to as instant playlists) from user data representing a user's listening activities and/or preferences with respect to media content. User data may include user metadata associated with specific media data files (e.g., a user rating, number of times played, last played) and/or general user preferences (e.g., favorite artist(s) and favorite genre(s)). A playlist compilation system and method is described in greater detail in U.S. patent application Ser. No. 11/112,441 entitled PLAYLIST COMPILATION SYSTEM AND METHOD, filed on 22 Apr. 2005, which is fully incorporated herein by reference.

DRM process 1510 may be resident on and executed by personal media device 12 to perform the core functions and/or processes associated with digital rights management (e.g., as described above). Content playback engine 1520 may be resident on and executed by personal media device 12 to perform the core functions or processes associated with rendering media content (e.g., processing media data files). Although content playback engine 1520 and DRM process 1510 are shown as separate functional components, DRM process 1510 may be incorporated with content playback engine 1520.

Playlist format conversion process 1522 may be resident on and executed by personal media device 12 to perform the core functions and/or processes associated with conversion of playlists to a common format for transmission to another personal media device 12'. Data transfer process 1524 may also be resident on and executed by personal media device 12 to perform the core functions and/or processes associated with the transfer of data between personal media devices 12, 12'.

DRM process 1510, content playback engine 1520, playlist format conversion process 1522 and data transfer process 1524 may be components of device application 64 (FIG. 1) as e.g., an embedded feature, software plug-in, or stand-alone application. The instruction sets and subroutines of DRM process 1510, content playback engine 1520, playlist format conversion process 1522, and data transfer process 1524 may be executed by one or more processors (not shown) and one or more memory architectures (not shown) incorporated into personal media device 12.

An exemplary method of transferring one or more playlists 1512 between personal media devices 12, 12' is illustrated in FIG. 28 and described below. To initiate a playlist transfer from a first personal media device 12 to a second personal media device 12', a user may select 1550 one or more playlists 1512 on personal media device 12. In an exemplary embodiment, personal media device 12 may display title(s) of playlists 1512 on display 90 and slider assembly 88 may be used to scroll through and select playlists (FIG. 2).

When a transfer is initiated, selected playlists 1512 may be converted 1552 into a common format. Alternatively, playlists 1512 may be converted 1552 into a common format at any time before transferring playlists 1512 (e.g., before or after the transfer is initiated). In an exemplary embodiment, playlist format conversion process 1522 on personal media device 12 may reformat identifying information and/or metadata (e.g., track titles, artist names, genre, and play time) associated with content items in selected playlists into a common format using a standard transport protocol. The common format may be any format capable of being processed by different architectures (e.g., an mp3 player, a cellular telephone, or a handheld device) and/or operating systems (e.g., Microsoft Windows CE™, Redhat Linux™, Palm OS™, or other device-specific operating systems).

To share playlists in the common format (once they are converted 1552), personal media device 12 may establish 1554 communication with another personal media device 12' and transfer 1556 one or more playlists 1512 in the common format to another personal media device 12'. Data transfer process 1524 on personal media device 12, for example, may transmit and/or receive the playlist metadata in the common format. Communication may be established upon initiation of a playlist transfer or may already be established when the playlist transfer is initiated.

Personal media devices 12, 12' may communicate directly through a wireless communication channel, for example, using IR communication assembly 186 (FIG. 3) and an infrared data communications protocol known to those skilled in the art, such as a protocol complying with a standard defined by the Infrared Data Association (IrDA). Personal media devices 12, 12' may also communicate directly through a physical coupling such as a wired connection or initiated by physical contact between personal media devices 12, 12' as disclosed in U.S. Provisional Patent Application Ser. No. 60/705,747, entitled "Personal Media Device", which was filed on 5 Aug. 2005 and is fully incorporated herein by reference. Alternatively, personal media devices 12, 12' may establish communication indirectly, for example, through proxy computer 54 and/or network(s) 30, 32 (FIG. 1). Transferring playlists between personal media devices 12, 12' may accompany a device-to-device media content transfer but may not require the security measures discussed above with respect to device-to-device media content transfers.

An exemplary method of receiving and processing a transferred playlist is illustrated in FIG. 29 and described below. Personal media device 12 may receive 1570 a transferred playlist in the common format, which has been transferred from another personal media device 12'. Personal media device 12 may then convert 1572 the playlist in the common format to a playlist 1512 in a format compatible with personal media device 12. For example, playlist format conversion process 1522 on personal media device 12 may re-format the identifying information and/or metadata associated with each of the media content items in the transferred playlist into a format that is recognizable and processable by personal media device 12. Playlist format conversion process 1522 may also add metadata, such as media content item identifiers, used by the media distribution system for which personal media device 12 is registered. For example, if a playlist generated in connection with the iTunes™ service is converted to a playlist for use in connection with the Rhapsody™ service, media content item identifiers unique to the Rhapsody™ service may be added to the metadata in the playlist.

After converting the transferred playlist metadata, a user may initiate playback of the transferred playlists 1512. Accordingly, personal media device 12 may receive 1574 a request to obtain and/or render media content identified in the transferred playlist. The user may initiate playback, on personal media device 12, of all of playlist 1512, a portion of playlist 1512, or a single media content item within playlist 1512. Playback may be initiated, for example, by selecting the playlist or media content item on display panel 90 (FIG. 2) and actuating play/pause switch 82 (FIG. 2). Upon receiving a request to obtain and/or render media content items in the transferred playlist, content playback engine 1520 on personal media device 12 may attempt 1575 to retrieve and render media data file(s) for the selected media content item(s).

Before content playback engine 1520 renders media content items identified in a transferred playlist, content playback engine 1520 may determine if the media data files are available 1576 (e.g., stored on personal media device 12). If a media data file is not available, content playback engine 1520 may attempt to retrieve 1575 another media data file for another content item identified in the transferred playlist. Alternatively, if media data files are not available on personal media device 12, personal media device 12 may attempt to obtain the unavailable media data files by e.g., establishing communication with media distribution system 18 (as described above). Personal media device 12 may also attempt to obtain media data files by establishing communication with proxy computer 54 (FIG. 1) and/or by initiating a device-to-device media content transfer with another personal media device 12' (e.g., as described above).

Before content playback engine 1520 renders media content items identified in the transferred playlist, content playback engine 1520 may also determine if personal media device 12 and/or the user has appropriate content rights to render each media content item. DRM process 1510 and/or content playback engine 1520, for example, may access content licenses associated with the media data files selected for playback to determine the content rights associated with the media data files. If the content rights indicate non-subscription rights 1582 (e.g., the content item has been purchased or imported), for example, content playback engine 1520 may retrieve and render 1584 the media data file without verifying a subscription.

If the content rights indicate subscription rights, personal media device 12 may attempt to verify 1586 a device license to determine if personal media device 12 has valid subscription rights for the media content item to be rendered. DRM process 1510, for example, may verify the device license and determine if a timeout has expired (e.g., as described above). If subscription rights are not available and/or cannot be verified, DRM process 1510 may attempt 1588 to subscribe and/or renew a subscription (e.g., as described above). If subscription rights are verified, content playback engine 1520 may retrieve and render the media data file. This process may be repeated for each media content item to be rendered in the transferred playlist.

Accordingly, the system and method enables playlists to be shared between personal media devices 12, 12' independent of device architectures, operating systems, and subscriptions.

Figure 30:
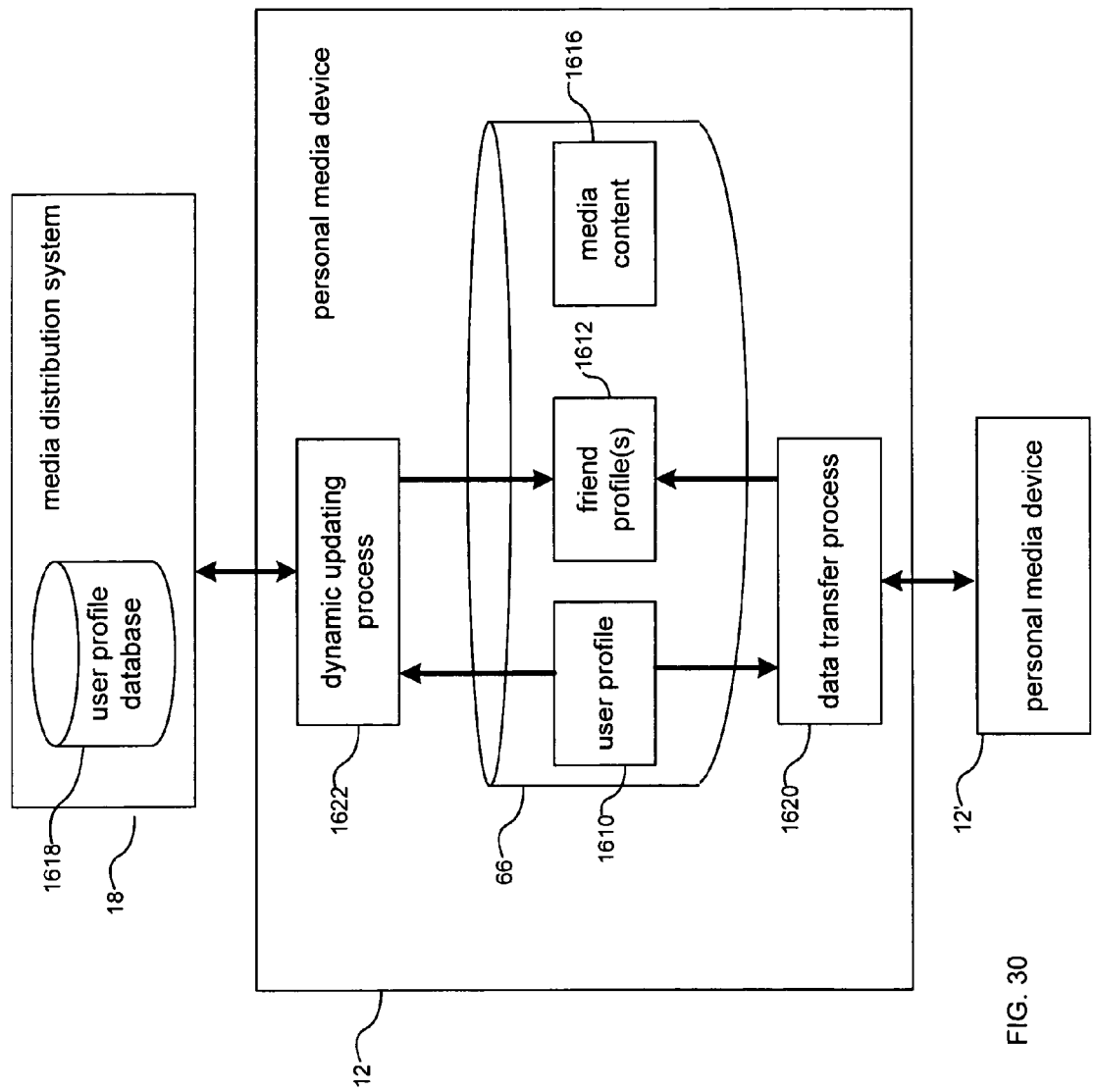
FIG. 30 is a diagrammatic view of a system for exchanging and dynamically updating user profiles on a personal media device.

Exchanging And Dynamically Updating User Profiles:

Referring to FIGS. 30-32, there is shown a system and method for exchanging user profiles between personal media devices 12, 12' and dynamically updating the exchanged user profiles. User profiles may be exchanged to and from personal media device 12 and then dynamically updated when personal media device 12 establishes communication with media distribution system 18. User profile 1610 may be stored on personal media device 12 (e.g., on storage device 66) and may include at least a user ID capable of identifying a user within media distribution system 18. User profile 1610 may also include other information associated with the user such as a user name, age, gender, contact information (e.g., email address, telephone number, instant messenger address) and other information associated with the user's media content activity and preferences.

Data transfer process 1620 may be resident on and executed by personal media device 12 and may perform the core functions and/or processes associated with data transfer between personal media device 12 and a second personal media device 12'. Data transfer process 1620 may be a component of device application 64 (FIG. 1), for example, as an embedded feature, software plug-in, or a stand-alone application.

Dynamic updating process 1622 may be resident on and executed by personal media device 12, proxy computer 54 (FIG. 1) or server computer 28 (FIG. 1) and may update user profiles in user profile database 1618. Dynamic updating process 1622 may be a component of device application 64 (FIG. 1), proxy application 98 (FIG. 1) or media distribution system 18, for example, as an embedded feature, software plug-in, or stand-alone application. The instruction sets and subroutines of data transfer process 1620 and dynamic updating process 1622 may be executed by one or more processors (not shown) and one or more memory architectures (not shown) incorporated into personal media device 12, proxy computer 54 and/or server computer 28.

An exemplary method of exchanging user profiles between personal media devices 12, 12' is illustrated in FIG. 31 and described below. Personal media device 12 may generate 1650 user profile 1610 associated with the registered user of personal media device 12. Typically, personal media device 12 has only one registered user, although multiple registered users and user profiles are possible. User profile 1610 may be generated, for example, during the device initialization process described above, and/or when media distribution system 18 establishes a unique user ID to identify the registered user of personal media device 12 with media distribution system 18. A user may also be prompted to enter any additional information to be included within user profile 1610. A user may also configure personal media device 12 by entering configuration settings that define the level or degree of sharing that is authorized for user profile 1610. For example, the user may authorize sharing of only a user ID without any other personal information. The user may also authorize sharing of user profile 1610 automatically with any other personal media device (e.g., second personal media device 12') without any user action. Alternatively, the user may authorize sharing of user profile 1610 only when initiated by the user or only to certain other personal media devices (e.g., devices with matching media content personas, as described below). Further, the user may configure personal media device 12 to disable sharing entirely.

Before transferring data, personal media device 12 may establish 1652 communication with second personal media device 12'. Personal media devices 12, 12' may communicate directly through a wireless communication channel, for example, using IR communication assembly 186 (FIG. 3) and an infrared data communications protocol known to those skilled in the art, such as a protocol complying with a standard defined by the Infrared Data Association (IrDA). Personal media devices 12, 12' may also communicate directly through a physical coupling such as a hard-wired connection. Communication may be initiated by physical contact between personal media devices 12, 12' as disclosed in U.S. Provisional Patent Application Ser. No. 60/705,747, entitled "Personal Media Device and Methods of Using Same", which was filed on 5 Aug. 2005 and is fully incorporated herein by reference. Alternatively, personal media devices 12, 12' may establish communication indirectly, for example, through proxy computer 54 (FIG. 1) and/or network(s) 30, 32 (FIG. 1).

Once communication has been established, one or both personal media devices 12, 12' may initiate 1654 a user profile exchange or transfer. A user profile exchange may occur when personal media devices 12, 12' are sharing other data e.g., a device-to-device media content transfer or a playlist transfer. Alternatively, a user profile exchange may occur independently (i.e., without transferring or sharing other data).

When a profile exchange or transfer is initiated by second personal media device 12', personal media device 12 may confirm 1656 that personal media device 12 is authorized to share profile 1610 (e.g., by checking user configuration settings and prompting the user if necessary). If authorized to share profile 1610, personal media device 12 may transmit 1660 user profile 1610 to personal media device 12' and/or may receive 1662 a user profile (e.g., a friend's user profile) from another personal media device (e.g., second personal media device 12').

Data transfer process 1620 on personal media device 12 may transmit and/or receive user profiles. User profiles received from other personal media devices may be stored by personal media device 12 as e.g., friend profile(s) 1612. As mentioned above, each friend profile 1612 may include at least a user ID associated with the user of the other personal media device. In one embodiment, user profiles exchanged between personal media devices 12, 12' may include only a user ID, and other user profile data may be obtained by establishing communication with media distribution system 18 (to be discussed below in greater detail).

An exemplary method of dynamically updating profiles is illustrated in FIG. 32 and is described below. Personal media device 12 may establish 1670 communication with media distribution system 18 (e.g., via proxy computer 54 or via a WAP 52). Media distribution system 18 may include user profile database 1618 that includes user profiles for registered users/subscribers of media distribution system 18. User profile database 1618 may include, in addition to user IDs, additional information associated with the user's media content activity and preferences. In an exemplary embodiment of media distribution system 18, user profiles may define playlists generated by the user, music genres selected by the user, artists selected by the user, and recent listening activities (e.g., tracks and/or artists) of the user.

Upon establishing communication with media distribution system 18; personal media device 12, media distribution system 18 and/or proxy computer 54 may determine if user profile 1610 in user profile database 1618 is up-to-date. This determination may be made by comparing the version of user profile 1610 stored within database 1618 to the version of user profile 1610 stored on personal media device 12. If the version of user profile 1610 stored within database 1618 needs to be updated, dynamic updating process 1622 may update 1672 database 1618 by uploading 1674 all or a portion of the version of user profile 1610 stored on personal media device 12 to user profile database 1618. Accordingly, dynamic updating process 1622 may synchronize the version of user profile 1610 stored on personal media device 12 and the version of user profile 1610 stored within database 1618. As discussed above, user profiles may define e.g., a user ID, a user name, age, gender, contact information (e.g., email address, telephone number, instant messenger address), playlists generated by the user, music genres selected by the user, artists selected by the user, and recent listening activities (e.g., tracks and/or artists) of the user, for example.

Upon establishing communication with media distribution system 18; personal media device 12, media distribution system 18 and/or proxy computer 54 may also determine if friend profile 1612 is up-to-date. This determination may be made by comparing the version of friend profile 1612 stored within database 1618 to the version of the friend profile 1612 stored on personal media device 12. If the version of friend profile 1612 stored on personal media device 12 needs to be updated, dynamic updating process 1622 may update 1676 personal media device 12 by downloading 1680 all or a portion of the version of friend profile 1612 stored within database 1618 to personal media device 12. Additionally/alternatively, the up-to-date friend profile may be presented to the user as e.g., a web page and may be accessed using personal media device 12 or proxy computer 54 (FIG. 1), for example When a friend profile 1612 on personal media device 12 includes only a user ID, the user ID in friend profile 1612 may provide a link to a more complete friend profile in user profile database 1618, which may be downloaded to personal media device 12 (as described above) or presented to the user as e.g., a webpage (as described above).

The user of personal media device 12 may continue to obtain updated information associated with friend profile 1612 that was transferred from another personal media device (e.g., second personal media device 12') to user profile database 1618. Once completed, the profile updating process may be stopped 1682.

Accordingly, a system and method for exchanging and dynamically updating profiles allows users of personal media devices 12, 12' to establish relationships.

Figure 33:
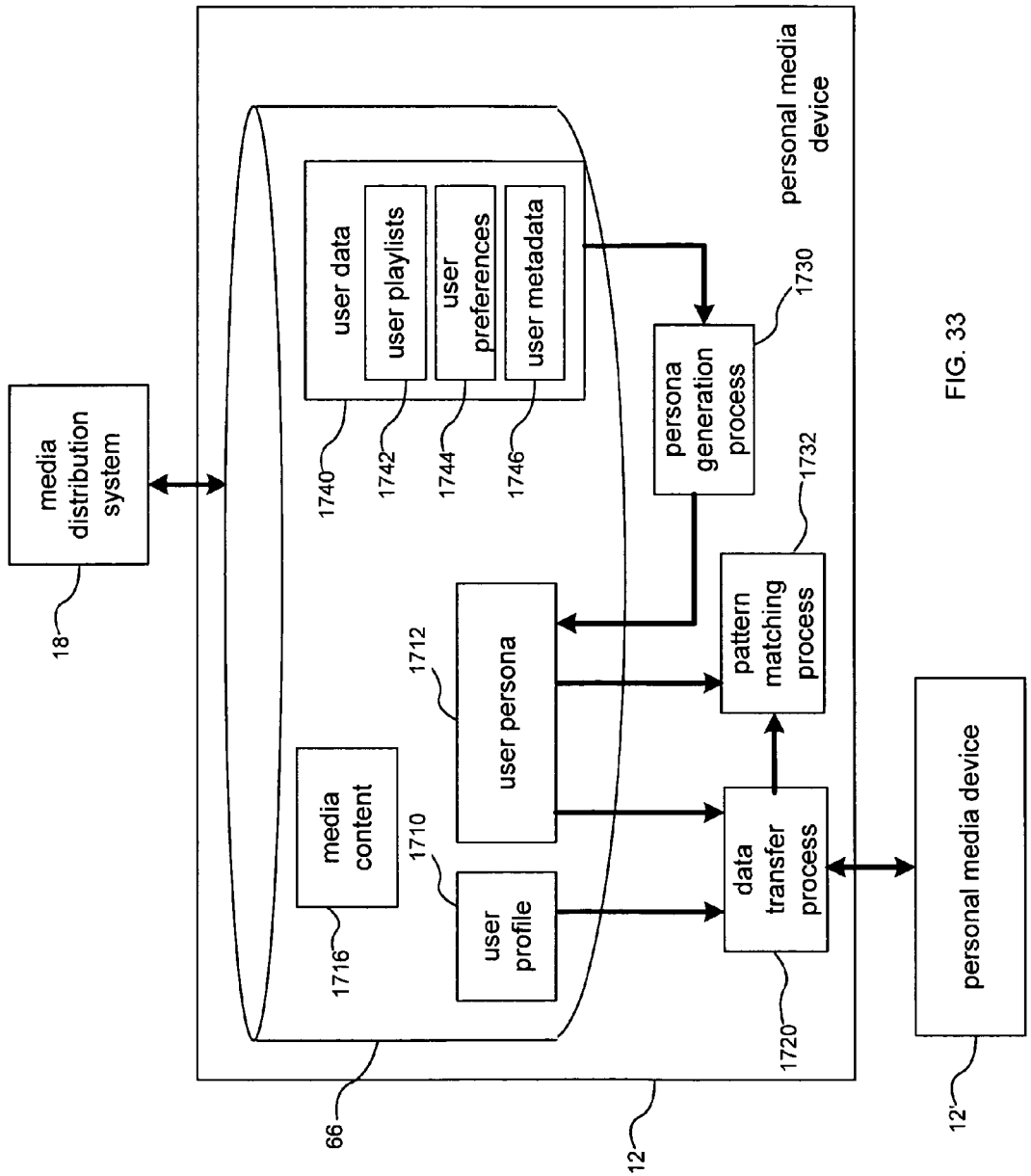
FIG. 33 is a diagrammatic view of a system for comparing user media personas on a personal media device.

Comparing User Media Personas:

Referring to FIGS. 33 and 34, there is shown a system and method for comparing user media personas on personal media devices 12, 12'. The system and method may compare user media personas associated with users of personal media devices 12, 12' within proximity of each other to determine if the users have similar interests or patterns in media content (e.g., similar music interests or patterns).

User profile 1710 may be stored on personal media device 12 and may include at least a user ID capable of identifying a user within media distribution system 18 (e.g., as described above). User profile 1710 may also include other information associated with a user such as a user name, age, gender, contact information (e.g., email address, telephone number, instant messenger address). User persona 1712 may also be stored on personal media device 12 and may include other information associated with the user's media content activity and preferences. For example, for a music distribution system, a user persona may include data representing the music that the user has listened to, the type of music playlists the user has generated, and the type of artists and/or genres the user prefers.

Data transfer process 1720 may be resident on and executed by personal media device 12 and may perform the core functions and/or processes associated with the transfer of data to and from personal media devices 12, 12'. Persona generation process 1730 may be resident on and executed by personal media device 12 to generate a user persona based on user preferences and user activities.

Pattern matching process 1732 may be resident on and executed by personal media device 12 to match multiple personas to determine similarities in user preferences and user activities. Data transfer process 1720, persona generation process 1730 and pattern matching process 1732 may be components of device application 64 (FIG. 1), for example, as an embedded feature, a software plug-in, or a stand-alone application. The instruction sets and subroutines of data transfer process 1720, persona generation process 1730, and pattern matching process 1732 may be executed by one or more processors (not shown) and one or more memory architectures (not shown) incorporated into personal media device 12.

An exemplary embodiment of exchanging and comparing user media personas is illustrated in FIG. 34 and is described below. Personal media device 12 may generate 1750 user media persona 1712 from user data 1740 stored on personal media device 12. Persona generation process 1730 on personal media device 12, for example, may compile data representing user media persona 1712 from user playlists 1742 generated by the user, general user preferences 1744 entered by the user (e.g., favorite genres and artists), and user metadata 1744 associated with specific content items (e.g., user ratings, number of times played, last played). User media persona 1712 may include, for example, data identifying tracks that have been highly rated, listened to frequently, listened to recently, and/or added to playlists; data identifying favorite artists; and data identifying favorite genres. Persona generation process 1730 may then store the data representing user media persona 1712 as a file or data structure on personal media device 12.

Personal media devices 12, 12' may establish 1752 communication, for example, using a wireless protocol. Personal media devices 12, 12' may initiate wireless communication with other personal media devices within the wireless communication range of personal media devices 12, 12' (e.g., in a round robin fashion). Alternatively, personal media devices 12, 12' may establish communication using an IR data communications protocol or using a physical coupling (e.g., a cable), as described above. Communication may be established as part of another data transfer (e.g., a device-to-device transfer, a user profile transfer, or playlist transfer).

Once communication is established, one personal media device 12 may receive 1754 a user media persona transferred by the data transfer process 1720 of another personal media device 12'. For example, personal media device 12 may receive the user media persona for the user of personal media device 12'. In particular, personal media device 12' may act as a master device and push a user media persona (defining the likes/interests of the user of personal media device 12') to personal media device 12 (which acts as a slave device). A user may configure personal media device 12 to transmit/receive media personas only to/from certain other users or to disable the process of transmitting and/or receiving media personas from other personal media devices.

Personal media device 12 (i.e., the slave device) may then compare 1756 the received user media persona (which defines the likes/interests of the user of personal media device 12') with user media persona 1712 (which defines the likes/interests of the user of personal media device 12). Pattern matching process 1732 on personal media device 12, for example, may compare the data included within the user media personas to determine 1758 if there is any matching data (e.g., artists, genres, tracks) between the two personas. A user may configure pattern matching process 1732 to define what constitutes matching data. The matching degree may be set, for example, to require an exact match of all user media persona data (e.g., all artists, genres, and tracks), a match of most user media persona data (e.g., 51% of all artists, genres, and tracks), or a match of any user media persona data (e.g., any artist, genre, or track).

Upon determining a matching pattern, personal media device 12 (i.e., the slave device) may generate 1760 a matching persona notification notifying the user of personal media device 12 (i.e., the slave device) and/or the user of personal media device 12' (i.e., the master device) that a user with similar interests and patterns has been located.

The notification may provide additional information such as the physical distance of the other personal media device having the matching persona and/or a summary of the matching data. Upon notification of a match, personal media devices 12, 12' may also exchange personal information such as a name and contact information (e.g., email address, instant messenger address, and/or telephone number) to allow the users to communicate. Personal media devices 12, 12' may also exchange user profiles 1710 (e.g., as described above). Personal information and/or user profile 1710 may be transmitted automatically upon receiving notification of matching user persona data, or may be transmitted in response to the authorization of the user. The user may also configure personal media device 12 to suppress the transmission of personal information and/or user profiles. Upon notification of a match, users of personal media devices 12, 12' may also initiate a device-to-device media content transfer, as described above.

Accordingly, a system and method of comparing user media personas may allow a user to identify and locate other users with similar media content interests and patterns (e.g., similar music interests and listening patterns).

A number of implementations have been described. Nevertheless, it will be understood that various modifications may be made. Accordingly, other implementations are within the scope of the following claims.

What is claimed is:

1. At least one electronic device capable of wirelessly communicating with a server system and also of being used in association with at least one other electronic device, the at least one electronic device comprising:

storage capable of storing at least one media content list generated by the at least one other electronic device and provided to the at least one electronic device via wireless communication;

the at least one media content list identifying at least one media content item stored at the server system;

the at least one electronic device being capable of, in response to at least one request, wirelessly requesting the at least one media content item from the server system;

wherein the at least one media content list is associated with a user identification and also wherein the user identification is associated with a subscription;

also wherein the at least one electronic device is capable of providing a prompt for user consent to purchase at least one other media content item previously selected for future purchase from the server system, the prompt to be provided after the at least one electronic device has received user request to identify the at least one other media content item for the future purchase.

2. The at least one electronic device of claim 1, wherein: prior to the requesting of the at least one media content item, the at least one media content item is not stored at the at least one electronic device.

3. The at least one electronic device of claim 1, wherein: the at least one electronic device comprises at least one of:
   a cellular telephone;
   a handheld computing device; and
   a laptop computing device.

4. The at least one electronic device of claim 1, wherein: the electronic device includes:
   an interface to permit the at least one electronic device to be coupled to a Universal Serial Bus of a computer, the computer to communicate with the server system via the Internet;
   a wireless communication interface;
   internal speakers;
   a user interface; and
   a display to display a title and artist associated with the at least one media content item.

5. The at least one electronic device of claim 1, wherein: the at least one media content item comprises at least one song.

6. The at least one electronic device of claim 1, wherein: the storage comprises flash storage.

7. The at least one electronic device of claim 1, wherein: in response to the requesting, the at least one media content item is to be provided to the at least one electronic device via one of streaming and downloading from the server system.

8. At least one computer readable memory storing instructions that when executed by at least one machine result in performance of operations comprising:
   storing, by storage of at least one electronic device, at least one media content list generated by at least one other electronic device and provided to the at least one electronic device via wireless communication;
   the at least one media content list identifying at least one media content item stored at a server system;
   the at least one electronic device being capable of, in response to at least one request, wirelessly requesting the at least one media content item from the server system;
   wherein the at least one media content list is associated with a user identification and also wherein the user identification is associated with a subscription;
   also wherein the at least one electronic device is capable of providing a prompt for user consent to purchase at least one other media content item previously selected for future purchase from the server system, the prompt to be provided after the at least one electronic device has received user request to identify the at least one other media content item for the future purchase.

9. The at least one computer readable memory of claim 8, wherein:
   prior to the requesting of the at least one media content item, the at least one media content item is not stored at the at least one electronic device.

10. The at least one computer readable memory of claim 8, wherein:
   the at least one electronic device comprises at least one of:
      a cellular telephone;
      a handheld computing device; and
      a laptop computing device.

11. The at least one computer readable memory of claim 8, wherein:
   the electronic device includes:
      an interface to permit the at least one electronic device to be coupled to a Universal Serial Bus of a computer, the computer to communicate with the server system via the Internet;
      a wireless communication interface;
      internal speakers;
      a user interface; and
      a display to display a title and artist associated with the at least one media content item.

12. The at least one computer readable memory of claim 8, wherein:
   the at least one media content item comprises at least one song.

13. The at least one computer readable memory of claim 8, wherein:
   the storage comprises flash storage.

14. The at least one computer readable memory of claim 8, wherein:
   in response to the requesting, the at least one media content item is to be provided to the at least one electronic device via one of streaming and downloading from the server system.

* * * * *